(12) United States Patent
DeLorme et al.

(10) Patent No.: US 6,321,158 B1
(45) Date of Patent: Nov. 20, 2001

(54) INTEGRATED ROUTING/MAPPING INFORMATION

(75) Inventors: David M. DeLorme; Keith A. Gray, both of Yarmouth; Gordon Autry, Standish; Keith A. Moulton, Portland, all of ME (US)

(73) Assignee: DeLorme Publishing Company, Yarmouth, ME (US)

( * ) Notice: Subject to any disclaimer, the term of this patent is extended or adjusted under 35 U.S.C. 154(b) by 0 days.

(21) Appl. No.: 09/144,836

(22) Filed: Aug. 31, 1998

Related U.S. Application Data

(63) Continuation-in-part of application No. 08/661,600, filed on Jun. 11, 1996, now Pat. No. 5,802,492, which is a continuation-in-part of application No. 08/381,214, filed on Jan. 31, 1995, now Pat. No. 5,559,707, which is a continuation-in-part of application No. 08/265,327, filed on Jun. 24, 1994, now abandoned.

(51) Int. Cl.[7] ................................................ G01C 21/30
(52) U.S. Cl. ......................... 701/201; 701/209; 701/211; 340/995; 342/357.09
(58) Field of Search .................................. 701/201, 200, 701/202, 208, 209, 211, 210, 212, 213; 340/988, 990, 995; 342/357.06, 357.07, 357.09, 357.13, 357.1

(56) References Cited

U.S. PATENT DOCUMENTS

| | | | | |
|---|---|---|---|---|
| 4,819,174 | * | 4/1989 | Furuno et al. ........................ | 701/201 |
| 4,954,958 | * | 9/1990 | Savage et al. ........................ | 701/201 |
| 5,172,321 | * | 12/1992 | Ghaem et al. ......................... | 701/201 |
| 5,223,844 | * | 6/1993 | Mansell et al. ....................... | 342/357 |
| 5,334,974 | * | 8/1994 | Simms et al. .......................... | 340/990 |
| 5,471,392 | * | 11/1995 | Yamashita ............................. | 701/200 |
| 5,543,789 | * | 8/1996 | Behr et al. ............................. | 340/995 |
| 5,648,768 | * | 7/1997 | Bouve .................................... | 340/988 |
| 5,699,255 | * | 12/1997 | Ellis et al. ............................. | 701/212 |

* cited by examiner

Primary Examiner—Tan Nguyen
(74) Attorney, Agent, or Firm—Peirce Atwood; Chris A. Caseiro; Patrick R. Scanlan

(57) ABSTRACT

An Integrated Routing/Mapping Information System (IRMIS) links desktop personal computer cartographic applications to one or more handheld organizer, personal digital assistant (PDA) or "palmtop" devices. Such devices may be optionally equipped with, or connected to, portable Global Positioning System (GPS) or equivalent position sensing device. Desktop application facilitates user selection of areas, starts, stops, destinations, maps and/or point and/or route information. It optionally includes supplemental online information, preferably for transfer to the PDA or equivalent device. Users' options include route information, area, and route maps. Maps and related route information are configured with differential detail and levels of magnitude. Used in the field, in conjunction with GPS receiver, the PDA device is configured to display directions, text and map formats, the user's current position, heading, speed, elevation, and so forth. Audible signals identifying the next turn along the user's planned route are also provided. The user can pan across maps and zoom between two or more map scales, levels of detail, or magnitudes. The IRMIS also provides for "automatic zooming," e.g., to show greater detail or closer detail as the user approaches a destination, or to larger scale and lower resolution to show the user's overall planned route between points of interest. The IRMIS also enables the user to mark or record specific locations and/or log actual travel routes, using GPS position information. These annotated location marks and/or "breadcrumb" or GPS log data can be saved, uploaded, displayed, or otherwise processed on the user's desktop geographic information or cartographic system. The IRMIS application and data may be distributed online and/or in tangible media in limited and advanced manipulation formats.

28 Claims, 51 Drawing Sheets

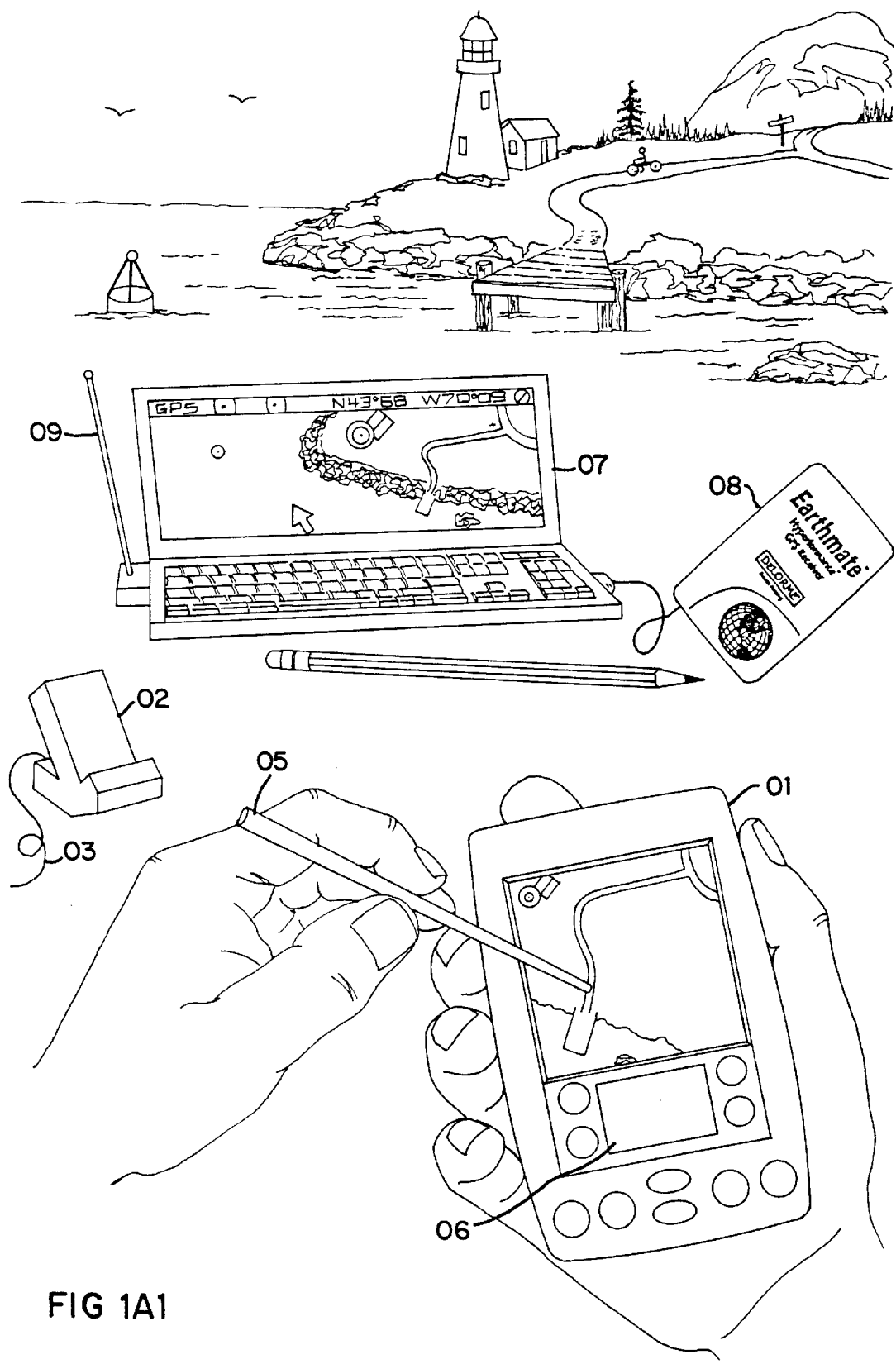
FIG 1A1

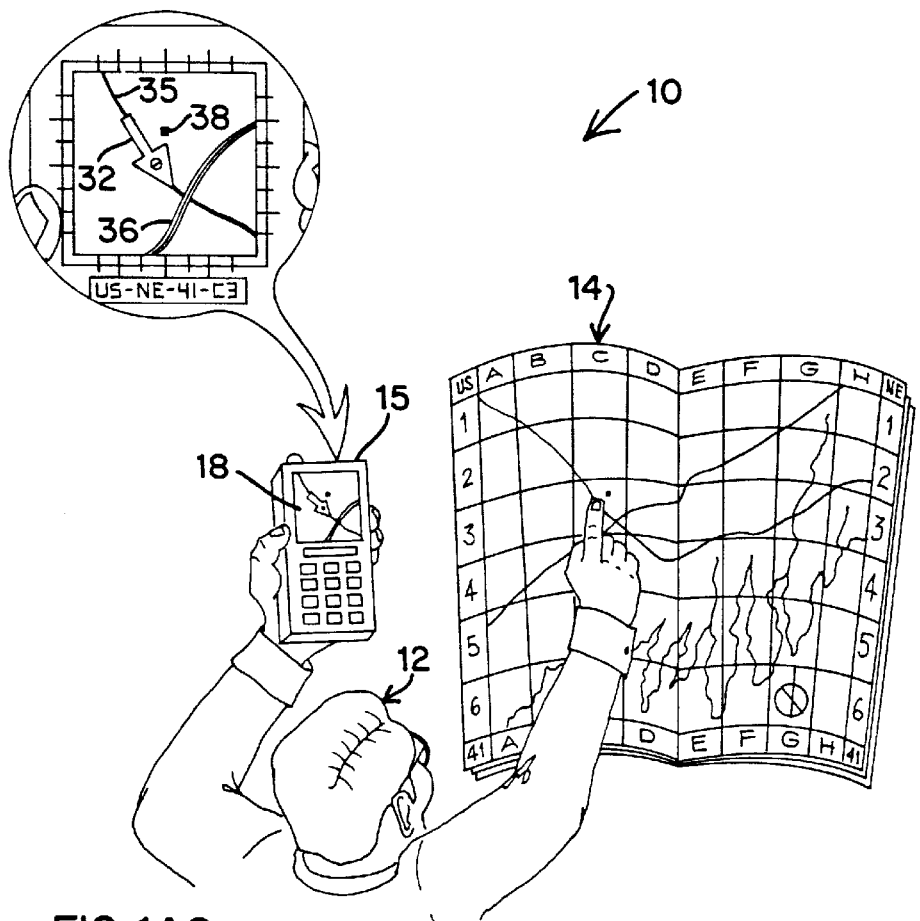
FIG 1A2
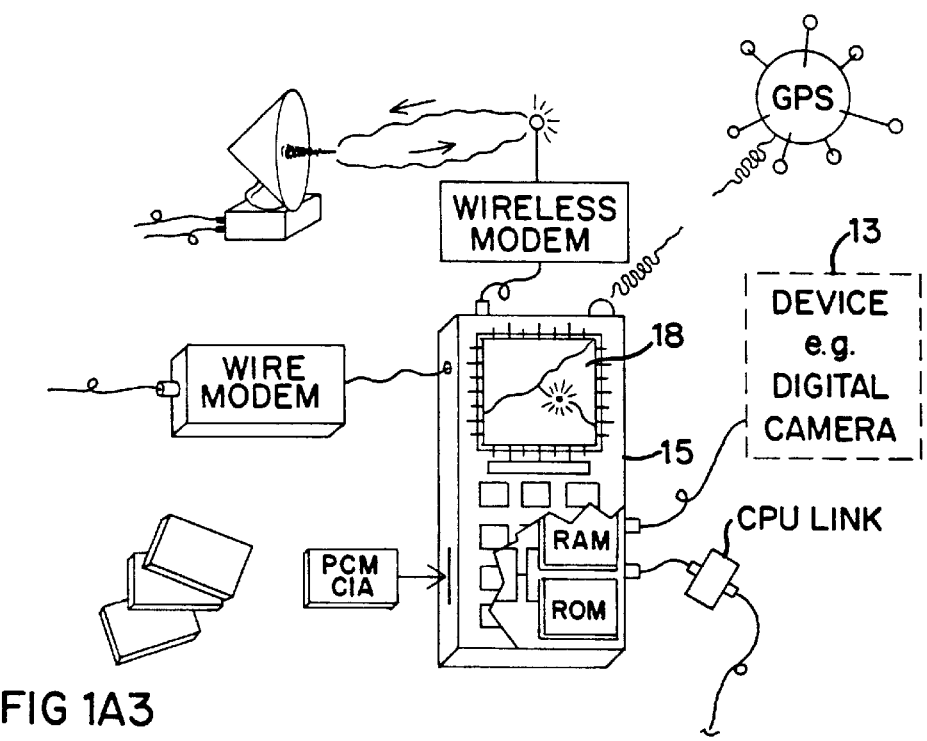
FIG 1A3 a

| DIRECTIONS | ⊘ |
|---|---|

● EXIT I-95 EXIT 11
  US1 (BLUE MEM.)
  0:00, 0.0 MI, NE
● I-95 EXIT 17 MI
  11 (US1 (BLUE MEM.))
  . 0:02, 2.5 MI, SW
  : JUNIPER DR.
  . 0:02, 2.8 MI, N

| ▼ TIME TO NEXT | ▼ DIST. TO NEXT |
|---|---|
| 0:19 | 0.3 MI | b

| NAVIGATE | ⊘ |
|---|---|

GO SW ON US1
(BLUE MEM.)

| ▼ TIME TO NEXT | ▼ DIST. TO NEXT |
|---|---|
| 0:19 | 0.3 MI |
| ▼ TIME TO FINISH | ▼ DIST. TO FINISH |
| 5:43 | 2.8 MI | c

| POSITION | ⊘ |
|---|---|

LAT  N43° 48.600
LONG W070° 09.599

| ▼ SPEED | ▼ ELEV. |
|---|---|
| 18 MPH | 211 FT. |
| ▼ HEADING | ▼ TIME |
| N (000) | 1:12 |

(MARK)  (STOP)

d

| MODE | TOOLS | ⊘ |
|---|---|---|
| POSITION | SELECT MAP | |
| MAP | SELECT | |
| NAVIGATE | DIRECTIONS | |
| DIRECTIONS | MARKS | |
| INITIALIZE | PREFERENCES | |
| | HELP | |
| | ABOUT | | e

| MARK LIST | ⊘ |
|---|---|
| DELORME MAP STORE | |

⇕

TEXT DELORME MAP STORE
LAT  43.80800
LONG 70.16400
DEV  DIGITAL CAMERA (DELETE) (NEXT) (OK)

FIG 1A4 f

| INITIALIZE | ⊘ |
|---|---|
| DEVICE | DELORME GPS TRIPMATE |
| | DELORME EARTHMATE |

STATE  [LOST]  ☐ DST
       [MAP]
       AL  ↓

GMT OFFSET  -5
LAT         48.81
LONG       -70.16

(OK)

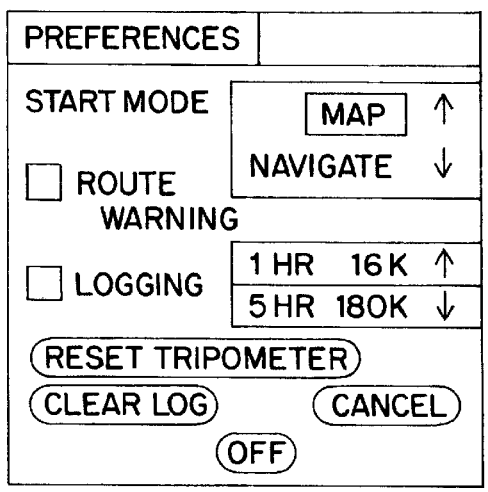
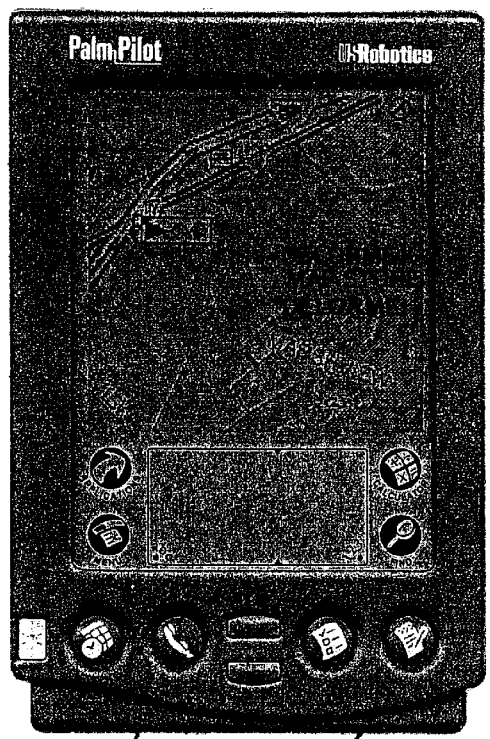
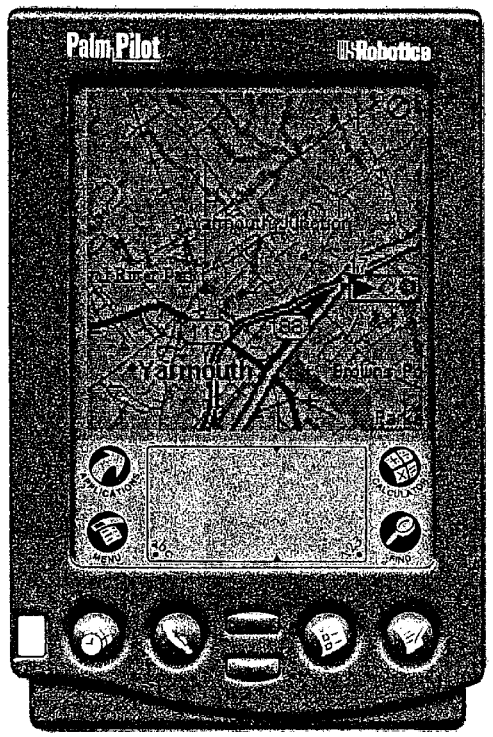
FIG 1A5

Handheld Computer Support

You can send your maps and Route Directions from Topo USA to a handheld computer to take with you as you travel. The same maps and directions that appear in Topo USA will be displayed on your handheld computer In DeLorme's Solus™ Pro.

You can also combine DeLorme's GPS receiver with your handheld computer to monitor your position, heading, speed and elevation as you travel. You can follow your Route Directions as you travel and your handheld computer will beep 60 seconds before your next turn. And the maps ensure that you'll never get lost again.

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

Solus Pro

Solus™ Pro is a separate application that allows you to integrate features of Topo USA with a handheld computer. You can send your maps and Route Directions from Topo USA to a handheld computer to take with you as you travel. The same maps and directions that appear in Topo USA will be displayed on your handheld computer.

You can also combine DeLorme's GPS receiver with your handheld computer to monitor your position, heading, speed and elevation as you travel. You can follow the map or Route Directions as you travel and your handheld computer will beep 60 seconds before your next turn.

Installing Solus Pro on Your Handheld Computer

During the Topo USA installation, you were asked if you wanted to install the Solus™ Pro application. If you can't remember whether you chose to have Solus Pro installed, choose Start... Settings... Control Panel... Add/Remove Programs to see if Solus Pro is installed on your computer. If the application is not listed, follow the directions below to install Solus Pro.

To Install Solus Pro:
1. Insert any Topo USA CD into your CD-ROM drive.
2. Choose Start... Run from the task bar, browse to the CD, open the *Solus Pro* folder found in the *Utilities* and select either the 3Com Palm Computing or Windows CE folder. Double-click *Setup.exe* to install Solus Pro to your hard drive. Click OK.
3. Follow the screen directions to complete installation.
4. Transfer the Solus Pro application to your handheld computer according to the protocol outlined in its user's guide.

FIG 1A6-1

Sending to a Handheld Computer

You can send your maps and Route Directions from Topo USA to a 3Com®, Palm Computing® or Windows® CE handheld computer to take with you as you travel. The same maps and directions that appear in Topo USA will be displayed on your handheld computer in DeLorme's Solus™ Pro application.

To send a route:

1. Be sure that the Solus Pro application is installed on both your desktop computer and your handheld computer.
2. Create your route in Topo USA.
3. Click the Send Route button in the Advanced Routing dialog box.
4. The Send Route dialog box appears.
5. Select the desired options (i.e., current map view, route map and Route Directions) and the type of platform.
6. Click the Preferences... button to set your preferences for the individual devices.
7. Click OK.
8. Topo USA creates the appropriate files and displays a message box telling you where they were saved. The default location is C:\DeLorme Mobile Maps.
9. Transfer the files to your handheld computer according to the protocol outlined in its user's guide.
10. When the transfer is complete, open the Solus Pro application on your handheld computer by tapping its icon.

NOTE: You can send the current map view without creating a route. Adjust the map view to the desired location and click the Send Route tool.

NOTE: If you open a previously saved route to send to a handheld computer, you must be using the appropriate CD for the region containing the route.

FIG. 1A6-2

Send Route Preferences

You can set your preferences for both Palm Computing and Windows CE devices when sending maps and routes to a handheld computer.

To set your preferences:

1. Click the Send Route tool (to send the current map view) or click the Send Route button in the Route tab of the Advanced Routing dialog box.
2. In the Send Route dialog box click the Preferences... button.
3. In the Preferences dialog box select the applicable handheld computer from the Device drop-down list (i.e., Palm Computing Platform or Windows CE).

For Windows CE:

Move the Memory Use Level slider to select your desired map size. Sliding to the right (Max) gives you a larger map area; sliding to the left (Min) gives you a smaller map area.
Click the Save In... button to save the maps and Route Directions in a directory other than the default of C:\ *DeLorme Mobile Maps*.
Click OK.

For Palm Computing:

Move the Memory Use Level slider to select your desired map size. Sliding to the right (Max) gives you a larger map area; sliding to the left (Min) gives you a smaller map area.
Click the Save In... button to save the maps and Route Directions in a directory other than the default of C:\*DeLorme Mobile Maps.*
Select the Use Compression option if you want to compress the files so that they take up less space on your organizer. This is helpful if you want to have several maps on your organizer at once.
Select the HotSync GPS Log File option if you want to transfer the GPS log file from your organizer back to Topo USA the next time you HotSync.
Select the HotSync Mark File option if you want to transfer the Mark file from your organizer back to Topo USA the next time you HotSync.
Click OK.

FIG.1A6-3

Solus Pro Help In a Palm Computing Organizer

After you've installed Solus™ Pro to your 3Com® Palm Computing®, organizer, you can access the Solus Pro Help to learn how to use the program.

To open Help:
1. Tap the Solus icon to open the program.
2. Tap the Menu button. The Solus Pro menus appear at the top of the screen.
3. Tap the Tools menu and then tap the Help option. A Help topic specific to the current mode appears.

Viewing the Route Directions in Your Palm Computing Organizer

Downloaded to a Palm Computing® organizer, you can take your Topo USA maps and Route Directions with you when you travel. Your entire route is spelled out in the palm of your hand with DeLorme's Solus™ Pro.

To view your Route Directions:

1. After you have sent your route to the Palm Computing organizer, turn it on and tap the Applications button on the screen to access the application picker.
2. Tap the Solus icon to open the application.
3. Tap the Menu button. The Solus Pro menus appear at the top of the screen.
4. Tap the Tools menu and then tap the Select Route option.
5. Tap the desired route to select it and then tap OK.
6. The Directions mode displays the Route Directions that you created in Topo USA.

The Directions include your Start, the road name and type for each leg of your journey, the cumulative elapsed time and distance after each leg, the general heading for each leg, any Stops you have added, and your Finish. Tap the scrollbar arrows on the right to move up and down through the Directions or use the organizer's scroll buttons.

Symbols appear along the left side of the Directions. Solid circles represent your Start, Stops and Finish. A dotted single line indicates a local road or ferry; a solid double line indicates a US highway or interstate; a single solid, thick line indicates a state route or major connector; a single solid, thin line indicates a forest road; and a solid double line with a dollar sign indicates a toll road.

When tracking with a GPS receiver, Solus Pro highlights the next leg in your Directions list and beeps 60 seconds before your next turn or route change. Use the arrows in the output boxes to select from a variety of options that you can display in the Directions mode while tracking (average speed, battery voltage, bearing, course, distance to Finish, etc.).

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

FIG. 1A6-4

Viewing Maps in Your Palm Computing Organizer

Downloaded to a Palm Computing® organizer, you can take your Topo USA maps and Route Directions with you when you travel. Your entire route is spelled out in the palm of your hand with DeLorme's Solus™ Pro.

To view your map:

1. After you have sent your route to the Palm Computing organizer, turn it on and tap the Applications button on the screen to access the application picker.
2. Tap the Solus icon to open the application.
3. Tap the Menu button. The Solus Pro menus appear at the top of the screen.
4. Tap the Tools menu and then tap the Select Map option.
5. Tap the desired map to select it and then tap OK
6. The Map mode displays the map that you created in Topo USA. Tap the map to pan around.

There are two types of maps that you can send from Topo USA--map views and route maps.

The map view is a black-and-white map of what was displayed in Topo USA on your desktop computer's screen. The rectangle on the map represents your map view and contains greater detail than the outlying map area. When centered within the rectangle, you can use the organizer's scroll buttons to zoom in and out for greater or lesser detail. Tap the map to pan in different directions.

The route map provides a bird's-eye overview of your route from your Start to your Finish. On the map, you'll notice two rectangles--one around the area of your Start and one around the area of your Finish. These rectangles provide street-level detail. When the map is centered within either of these rectangles, you can use the organizer's scroll buttons to zoom in and out for greater or lesser detail. You cannot zoom outside of the rectangles.

When connected to a GPS receiver, your position appears as a gray crosshair on the map and updates as you travel. When your position is within either of the rectangles, use the organizer's scroll buttons to zoom in for greater detail. When your position reaches the edge of a rectangle, use the organizer's scroll buttons to zoom out. The black dot within the crosshair indicates the direction of your current heading.

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

FIG. 1A6-5

Configuring Solus Pro in a Palm Computing Organizer

Solus™ Pro allows you to select the information displayed in the output boxes in the Directions, Navigate and Position modes. Tap the arrows in each box and select the desired option (described below).

Average Speed --when tracking, displays your average speed
Battery Voltage --displays the current voltage of your organizer's batteries
Bearing --when tracking, displays the direction of travel between your next waypoint and your current position, relative to true North
Course --when tracking, displays the direction of travel between your next waypoint and the previous waypoint, relative to true North
Date --when connected to DeLorme's GPS receiver, displays the current date
Dist to Finish --when tracking, displays the distance from your current position to your Finish
Dist to Next Turn --when tracking, displays the distance from your current position to your next turn or route change Elevation --when tracking, displays your current elevation (Due to Selective Availability, this can vary as much as 512 feet (156 meters); however, 95 percent of the time you can generally expect much greater accuracy.)
Heading --when tracking, displays your current direction of travel, relative to true North
Maximum Speed --when tracking, displays your maximum speed
PDOP --when tracking, displays the Position Dilution of Precision, the effect of the combined errors of latitude, longitude and elevation in determining a position
Speed --when tracking, displays your speed as you travel
Time --when connected to DeLorme's GPS receiver, displays the Greenwich Mean Time
Time to Finish --when tracking, displays the time from your current position to your Finish
Time to Next Turn --when tracking, displays the time from your current position to your next turn or route change
Tripometer --when tracking, displays the mileage traveled (Select Tools... Preferences... Reset Tripometer to reset the value to zero.)

Choose Tools... Preferences... from the Solus Pro menu to access the Preferences mode. You can choose which mode to display when the program starts, whether or not you want Solus Pro to beep 60 seconds before your next turn and whether or not you want Solus Pro to log your trip as you travel. You can also reset the Tripometer and clear the Log file.

FIG. 1A6-6

Initializing DeLorme's GPS Receiver with a Palm Computing Organizer
Connected to DeLorme's GPS receiver, you can use your Palm Computing® organizer to monitor your position, heading, speed and elevation as you travel. Follow along on the map or with the Route Directions as you travel and Solus™ Pro will beep 60 seconds before your next turn.

To initialize DeLorme's GPS receiver:
1. Connect your organizer to DeLorme's GPS receiver with DeLorme's Palm Computing adapter cable (available separately from DeLorme).
2. After you have sent your route to the handheld, turn on your organizer and tap the Applications button on the screen to access the application picker.
3. Tap the Solus icon to open the application.
4. Tap the Menu button. The Solus Pro menus appear at the top of the screen.
5. Tap the Mode menu option and then tap Initialize to access the Initialization mode.
6. Tap the Device drop-down list and use the up and down arrows to select your GPS receiver.
7. Tap the State drop-down list and use the up and down arrows to select your current location. You can also use the organizer's scroll buttons to move through the state list.

NOTE: After the first initialization, the State drop-down list defaults to Last (representing your last location or fix). If you are within the same vicinity as your last fixed position, you should use the Last option to speed up the initialization process. If you have a map loaded in Solus, you can select the Map Center option to use the map's center coordinates to initialize.

8. A stream of data at the bottom indicates that you are receiving satellite information. The symbol in the upper right corner indicates your GPS status. A circle with a line through it means that DeLorme's GPS receiver has not been detected or you are not receiving enough information to determine a fix. The transmitting symbol indicates that DeLorme's GPS receiver is acquiring satellite information, but is not yet receiving sufficient satellite data to determine your position. This message is displayed while DeLorme's GPS receiver is acquiring satellite data and can take several minutes. "2-D" indicates that you are receiving data, but it is not sufficient to determine your elevation. "3-D" indicates that you are receiving ample data and have a good fix.
9. Tap the DST option if daylight saving time is currently in effect where you are. The second line displays the offset for your time zone from the Greenwich Mean Time.
10. A stream of data at the bottom of the screen indicates that you are receiving signals from satellites.
11. When the status is "3-D", tap the OK button to close out of the Initialization mode.
12. Tap the Menu button on your organizer. The Solus Pro menus appear at the top of the screen.
13. Tap the Mode menu option and select which mode (i.e., Directions, Position, Navigate or Map) you want to view.
14. When you want to stop tracking, tap the Stop button in the Position mode (this will help save your organizer's batteries). A solid circle in the upper right corner indicates that you are not tracking. You can tap the Start button in the Position mode to resume tracking.

NOTE: In order to conserve batteries, be sure to disconnect the adapter cable when not using DeLorme's GPS receiver with your organizer.

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

FIG. 1A6-7

Tracking with a Palm Computing Organizer

Combining your Palm Computing® organizer with DeLorme's GPS receiver gives you dynamic maps and Route Directions that you can follow as you travel. As you progress from your Start to Finish, your position is indicated on the map and the next road you'll be traveling is highlighted in the Directions list. In addition, Solus™ Pro displays your next route change and indicates how far away it is in distance and time - your organizer will even beep 60 seconds before your next turn.

To track:
1. Connect your organizer to DeLorme's GPS receiver with DeLorme's Palm Computing adapter cable (available separately from DeLorme).
2. After you have sent your route to the organizer, turn it on and tap the Applications button on the screen to access the application picker.
3. Tap the Solus icon to open the application.
4. Tap the Menu button. The Solus Pro menus appear at the top of the screen.
5. Tap the Mode menu and then tap the Initialize option to initialize DeLorme's GPS receiver
6. If you want to track using your Route Directions, tap the Directions menu option to view the route that you created in Topo USA. As you travel, Solus Pro highlights the next road you will use and beeps 60 seconds before your next route change.
   The Directions include your Start, the road name and type for each leg of your journey, the cumulative elapsed time and distance after each leg, the general heading for each leg, any Stops you have added, and your Finish. Tap the scrollbar arrows on the right to move up and down through the Directions or use the organizer's scroll buttons.
   Symbols appear along the left side of the Directions. Solid circles represent your Start, Stops and Finish. A dotted single line indicates a local road or ferry, a solid double line indicates a US highway or interstate, a single solid, thick line indicates a state route or major connector, a single solid, thin line indicates a forest road, and a solid double line with a dollar sign indicates a toll road.
   Your GPS status is displayed in the upper right corner. A circle with a line through it means that DeLorme's GPS receiver has not been detected or you are not receiving enough information to determine a fix. The transmitting symbol indicates that DeLorme's GPS receiver is acquiring satellite information, but is not yet receiving sufficient satellite data to determine your position. This message is displayed while DeLorme's GPS receiver is acquiring satellite data and can take several minutes. "2-D" indicates that you are receiving data, but it is not sufficient to determine your elevation. "3-D" indicates that you are receiving ample data and have a good fix.
7. You can also track in the Navigate mode. Tap the Navigate menu option to view your current route status. The instructions for your next route change appear at the top of the screen and update as you travel. Use the arrows in the output boxes to select from a variety of options that you can display in the Navigate screen.
8. Tap the Map menu option to view your current position on the map.

---

NOTE: In order to conserve batteries, be sure to disconnect the adapter cable when not using DeLorme's GPS receiver with your organizer.

---

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

FIG. 1A6-8

Logging with a Palm Computing Organizer

While tracking in Solus™ Pro, you can log your travels and then HotSync™ them to Topo USA to play back on topographical maps.

To log a route:
1. Connect your organizer to DeLorme's GPS receiver with DeLorme's Palm Computing adapter cable (available separately from DeLorme).
2. Turn on the organizer and tap the Applications button on the screen to access the application picker.
3. Tap the Solus icon to open the application.
4. Tap the Menu button. The Solus Pro menus appear at the top of the screen.
5. Tap the Initialize menu option and initialize your GPS receiver.
6. Tap the Menu button and select Tools... Preferences to open the Preferences window.
7. Tap the Logging option and then select the desired length of time you want to track from the drop-down list. The approximate amount of memory required is indicated beside each time option.
   Tap the Clear Log button to clear any previous logs.
8. Tap the OK button.

Using Marks in a Palm Computing Organizer

While tracking, Solus™ Pro lets you add Marks to indicate specific places along your route. These Marks can then be HotSynced to Topo USA to indicate their locations on topographical maps.

To add a Mark:
1. Connect your organizer to DeLorme's GPS receiver with DeLorme's Palm Computing adapter cable (available separately from DeLorme).
2. Turn on the organizer and tap the Applications button on the screen to access the application picker.
3. Tap the Solus icon to open the application.
4. Tap the Menu button. The Solus Pro menus appear at the top of the screen.
5. Tap the Initialize menu option and initialize your GPS receiver.
6. Solus Pro switches to the Position mode.
7. When you are at the desired spot, tap the Mark button. The Mark List opens and your position is added as a new Mark. The latitude/longitude of the Mark is displayed. You can change the name of the Mark in the text field.
   Tap the New button to add a new Mark. Select a Mark and tap the Delete button to delete the selected item.
8. Tap the OK button when you are done adding Marks.

Fig. 1A6-9

Solus Pro Help In a Windows CE Device

After you've installed Solus™ Pro to your Windows® CE handheld computer, you can access the Solus Pro Help to learn how to use the program.

To open Help:
1. Tap the Solus Pro icon on the desktop to open the program.
2. Tap the Help icon (question mark) in the upper right corner of the title bar.
3. Tap a topic to open it.
You can press ALT+H on your keyboard to access the Solus Pro Help at any time.

Viewing Your Route Directions In a Windows CE Device

Downloaded to a Windows® CE device, you can take your Topo USA Directions with you when you travel. Your entire route is spelled out in the palm of your hand with Solus™ Pro.

To view your Route Directions:
1. After you have sent your route to the H/PC, tap the Solus Pro icon on the desktop to open the program.
2. Tap the Route Directions tool on the command bar. The Route Directions dialog box appears on the screen.
3. Tap the Select button to select the desired route (that you calculated in Topo USA and downloaded). Solus Pro route files for Windows CE have .*ITN* extensions and are saved in the *DeLorme* folder by default.

The Directions include your Start, the road name and type for each leg of your journey, the distance of each leg, the cumulative elapsed time and distance, the general heading for each leg, any Stops you have added, and your Finish. Tap the scrollbar arrows on the right to move up and down through the Directions.
Symbols appear along the left side of the Directions. Solid circles represent your Start, Stops and Finish. A dotted, single line indicates a local road or ferry, a solid double line indicates a US highway or interstate, a single solid, thick line indicates a state route or major connector, a single solid, thin line indicates a forest road, and a solid double line with a dollar sign indicates a toll road.

Select the Track Directions option to follow along in the Directions as you travel.

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

FIG.1A6-10

Viewing Maps in a Windows CE Device

Downloaded to a Windows® CE device, you can take your Topo USA maps and Route Directions with you when you travel. Your entire route is spelled out in the palm of your hand with DeLorme's Solus™ Pro.

To view a map:
 I. After you have sent your maps to the H/PC, tap the Solus Pro icon on the desktop to open the program.
 2. Tap the Map tool and select the desired map. Solus Pro map files have .Rl extensions and are saved in the *DeLorme* folder by default.
 3. The map appears in the main window.
 4. The latitude and longitude of the map's center are displayed on the command bar, along with the magnitude of the map.

There are two types of maps that you can send from Topo USA--map views and route maps.

The map view is a black-and-white map of what was displayed in Topo USA on your desktop computer's screen. The rectangle on the map represents your map view and contains greater detail than the outlying map area. Press ALT+PAGE DOWN/PAGE UP respectively to zoom in and out for greater or lesser detail. Tap the map (or use the arrow keys) to pan/recenter to different areas.

The route map provides a bird's-eye overview of your route from your Start to your Finish. On the map, you'll notice two rectangles---one around the area of your Start and one around the area of your Finish. These rectangles provide street-level detail. Press ALT+PAGE DOWN/PAGE UP to zoom in and out for greater or lesser detail.

When connected to a GPS receiver, your current position appears as a white arrow on the map as you travel and your GPS status appears on the right of the command bar. When your position is within either of the rectangles, Solus Pro automatically zooms in for greater detail. When your position reaches the edge of a rectangle, Solus Pro zooms out.

Press the X key to recenter the map on your current position. Press the K key on your keyboard to add a Mark at the map center. See Solus Pro Shortcutsfor additional shortcuts and functions.

FIG.1A6-11

Initializing DeLorme's GPS Receiver with a Windows® CE Device

Connected to DeLorme's GPS receiver, you can use your Windows® CE device (H/PC) to monitor your position, heading, speed and elevation as you travel. You can also follow along on a map or with the Route Directions as you travel and Solus™ Pro will beep 60 seconds before your next turn.

To Initialize:
1. Connect your H/PC to DeLorme's GPS receiver with DeLorme's Windows CE adapter cable (available separately from DeLorme).
2. After you have sent your route to the H/PC, tap the Solus Pro icon on the desktop to open the program.
3. Tap the GPS button and select Initialize... to access the Initialize GPS dialog box.
4. Tap the State drop-down list and use the up and down arrows to select your current location. For the first initialization of your receiver, select the state/province where you are located from the State drop-down list. The latitude and longitude are automatically entered. After your first initialization, the State drop-down list defaults to Last Location and indicates the latitude and longitude of your last fixed position. Unless your position has changed more than a few miles, you should use Last Location in order to decrease the amount of time it takes for your receiver to acquire a fix on your position.
   If the area in which you are located is not listed or if you need more precise coordinates, enter the exact latitude and longitude of your location in the appropriate text boxes. Knowing your initial coordinates decreases the amount of time it takes for your receiver to acquire a fix on your position. If you have a map downloaded, you can use its coordinates to initialize. After selecting the desired map, select the Map Center option from the State drop-down list.
5. From the Device drop-down list, select the type of GPS receiver you are using. If your device is not listed, select NMEA183. (Use the keyboard arrow keys to scroll through the options.)
6. From the Port drop-down list, select the communications port that you are using to attach the GPS receiver to your computer (see your computer manual for further information).
7. The GPS Status box on the right indicates whether or not you are receiving satellite information. "No Fix" means that the GPS receiver has not been detected or you are not receiving enough information to determine a fix. "Acquiring Satellites" indicates that the GPS receiver is acquiring satellite information, but is not yet receiving sufficient satellite data to determine your position. This message is displayed while the receiver is acquiring satellite data and can take several minutes. "2-D Nav" indicates that you are receiving data, but it is not sufficient to determine your elevation. "3-D Nav" indicates that you are receiving ample data and have a good fix.
8. A stream of data in the center of the screen indicates that you are receiving signals from satellites.
9. Select the Log option if you want to log your GPS route as you track.
10. Use the slider to change the GPS log rate (2-10 seconds). This determines the rate at which the satellite information is updated in the program.
11. Tap the OK button to close out of the Initialize GPS dialog box.

> NOTE: In order to conserve batteries, be sure to disconnect the adapter cable when not using DeLorme's GPS receiver with your H/PC.

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

FIG. 1A6-12

Tracking with a Windows CE Device

Combining your Windows® CE device (H/PC) with DeLorme's GPS receiver gives you dynamic Directions that you can follow as you travel. The next road you'll be traveling is highlighted on the screen as you progress from your Start to Finish. In addition, Solus Pro displays your next route change and indicates how far away it is in distance and time - your H/PC will even beep 60 seconds before your next turn. Add a map and you're ensured of always knowing where you are and where you're going.

To track:
1. Connect your H/PC to DeLorme's GPS receiver with DeLorme's Windows CE adapter cable (available separately from DeLorme).
2. After you have sent your route to the H/PC, tap the Solus Pro icon on the desktop to open the program.
3. Tap the Connect tool on the command bar or choose GPS... Connect... to begin communication between Solus Pro and your GPS receiver. A message appears at the top of the screen indicating the status of your GPS connection.
   "Connecting" indicates that Solus Pro is attempting to communicate with the GPS receiver.
   "Acquiring Satellites" indicates that the GPS receiver is acquiring satellite information, but is not yet receiving sufficient satellite data to determine your position. This message is displayed while the receiver is acquiring satellite data and can take several minutes.
   "2-D Nav" indicates that you are receiving data, but it is not sufficient to determine your elevation.
   "3-D Nav" indicates that you are receiving ample data and have a good fix.
4. After achieving 3-D Nav status, you have three tracking options:
   If you want to track using your Directions, tap the Route Directions tool to view the Directions that you calculated in Topo USA. As you travel, Solus Pro highlights the next road you will use and beeps 60 seconds before your next route change.
   If you want to track using a map, tap the Map tool to view the map that you created in Topo USA. Your position is indicated on the map by crosshair as you travel.
   You can also track in the Navigate mode. Tap the Navigate tool to view your current route status. The instructions for your next route change appear at the bottom of the screen and update as you travel. The time and distance to your Finish appear above.
5. Choose GPS... Disconnect to stop displaying your route on the screen.

> NOTE: In order to conserve batteries, be sure to disconnect the adapter cable when not using DeLorme's GPS receiver with your H/PC.

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

FIG. 1A6-13

Monitoring Your GPS Status in a Windows CE Device

Solus™ Pro lets you monitor the status of the satellites in the sky as you are receiving data,

**To monitor the
satellite status**:
1. Tap the Solus Pro icon on the desktop to open the program.
2. Tap the Satellites tool on the command bar.
3. The Monitor Satellite Status dialog appears listing the satellites that are currently visible in the sky.
4. As the GPS receiver acquires data from the satellites, information appears in the columns. Each satellite's ID number, elevation, azimuth and sound-to-noise ratio are displayed on the left. The right window displays the GPS receiver's channels, the corresponding satellite ID and the status of the signal. "T" indicates the number of satellites in the receiver's track or view of the sky, "E" indicates the acquisition of ephemeris data and "N" indicates the number of satellites being used by your receiver for navigation.
5. The GPS Status box on the right indicates whether or not you are receiving satellite information. "No Fix" means that the GPS receiver has not been detected or you are not receiving enough information to determine a fix. "Acquiring Satellites" indicates that the GPS receiver is acquiring satellite information, but is not yet receiving sufficient satellite data to determine your position. This message is displayed while the receiver is acquiring satellite data and can take several minutes. "2-D Nav" indicates that you are receiving data, but it is not sufficient to determine your elevation. "3-D Nav" indicates that you are receiving ample data and have a good fix.
6. Use the slider to change the update rate of the satellite status display.

Tap the Sky View button to open the Satellite Sky View dialog box to see the current positions of the satellites.

Monitoring Your GPS Position in a Windows CE Device

Connected to DeLorme's GPS receiver, you can use your Windows® CE device (H/PC) to monitor your position, heading, speed and elevation as you travel.

To monitor your position:

1. Tap the Solus Pro icon on the desktop to open the program.
2. Tap the Position tool to open the Position dialog box.
3. Your current latitude/longitude, the time and date, your current heading, the GPS status, and your current speed are displayed.
4. Tap the Close button to close the Position dialog box.

FIG. 1A6-14

Satellite Sky View in a Windows CE Device

When tracking with a GPS receiver, you can monitor the positions of the satellites.

To monitor the sky view:
1. Tap the Solus Pro icon on the desktop to open the program.
2. Tap the Sky View tool. The sky view diagram indicates the locations of visible satellites in the sky relative to your current position. White symbols show the satellites' positions in the sky.
A black symbol indicates that your GPS receiver is tracking the satellite, ephemeris data is available and the satellite is being used for navigation. When using DeLorme's GPS receiver, a gray symbol indicates that your GPS receiver is tracking the satellite and ephemeris data is available, but the satellite is not being used for navigation. Two pound symbols indicate that your GPS receiver is tracking the satellite, but it is not receiving data from it.
3. The GPS Status box on the right indicates whether or not you are receiving satellite information. "No Fix" means that the GPS receiver has not been detected or you are not receiving enough information to determine a fix. "Acquiring Satellites" indicates that the GPS receiver is acquiring satellite information, but is not yet receiving sufficient satellite data to determine your position. This message is displayed while the receiver is acquiring satellite data and can take several minutes. "2-D Nav" indicates that you are receiving data, but it is not sufficient to determine your elevation. "3-D Nav" indicates that you are receiving ample data and have a good fix.
4. Tap Close to exit from the dialog box and continue tracking

Logging in a Windows CE Device

Once you begin tracking with your GPS receiver, Solus™ Pro automatically logs your route as you travel. When you stop tracking, Solus Pro prompts you for a filename and path in which to save this information. Log files have .*gpl* extensions and are saved to the *DeLorme* directory by default.

Choose GPS... Disconnect to discontinue tracking and logging your route.

FIG. 1A6-15

Using Marks in a Windows CE Device

As you are tracking, Solus™ Pro lets you indicate specific positions on your maps by using Marks.

To add a Mark:
1. Connect your GPS receiver, open Solus Pro and begin tracking.
2. Tap the Map tool and select the desired map.
3. When at the desired location, press the K key on your keyboard to place a Mark on the map.

To manage Marks:
1. Tap the Marks tool to open the Marks dialog box.
2. Your current Marks are displayed in the list box along with the latitude/longitude of each.
3. Tap a Mark to select it.
   Tap it again to rename it.
   Tap the Go To button to find the selected Mark on the map.
   Tap the Delete button to delete the selected Mark from the Marks list and the map.
4. Tap OK to close the Marks dialog box.

Solus Pro Shortcuts In Windows CE

When in the Map mode you can access other dialog boxes by clicking the appropriate tools or through the following keyboard shortcuts:

Arrow keys

Pan the map in the corresponding direction (i.e., up, down, left and right)
| | |
|---|---|
| ALT+PG UP | Zooms out from the map |
| ALT+PG DN | Zooms In on the map |
| K key | When tracking, adds a Mark at the map center |
| X key | When tracking, recenters the map on your current position |
| ALT+H | Opens the Help system |
| CTRL+K | Opens Marks dialog box |
| CTRL+L | Opens Locate dialog box |
| CTRL+N | Opens Navigate dialog box |
| CTRL+P | Opens the Position dialog box |
| CTRL+R | Opens the Route Directions dialog box |
| CTRL+S | Opens the Monitor Satellite Status dialog box |
| CTRL+V | Opens the Sky View dialog box |

When in any mode other than the map mode, you can access the map by pressing ALT+M.

FIG. 1A6-16

Locate Zip Code

1. Type zip code here and click Search button:

`980`

2. Click on desired entry from this list:

| | |
|---|---|
| 98003 Federal Way | WA |
| 98003 Auburn | WA |
| 98004 Hunts Point | WA |
| 98004 Yarrow Point | WA |
| 98004 Beaux Arts | WA |
| 98004 Bellevue | WA |
| 98004 Clyde Hill | WA |
| 98005 Bellevue | WA |

Selected Item: 98004 Bellevue, WA

3. Click Locate/Select button:

[Search]  [Locate]  [Cancel]  [Prev]  [Next]

Examples: 04032  040

Two-letter state abbreviations are used for US states

Mexico = MX  Canada = CN  Caribbean = CB

FIG 1E

Locate Area Code and Exchange

1. Type area code and exchange here and click Search button:

`205`

2. Click on desired entry from this list:

| | |
|---|---|
| 206 - 201 Bellingham | WA |
| 206 - 203 Renton | WA |
| 206 - 212 Vancouver | WA |
| 206 - 214 Seattle | WA |
| 206 - 215 Seattle | WA |
| 206 - 217 Seattle | WA |
| 206 - 218 Seattle | WA |
| 206 - 219 Tacoma | WA |

Selected Item: 206 - 215 Seattle, WA

3. Click Locate/Select button:

[Search]  [Locate]  [Cancel]  [Prev]  [Next]  [Help]

Examples: (207)-865  207-865  207865

FIG 1F

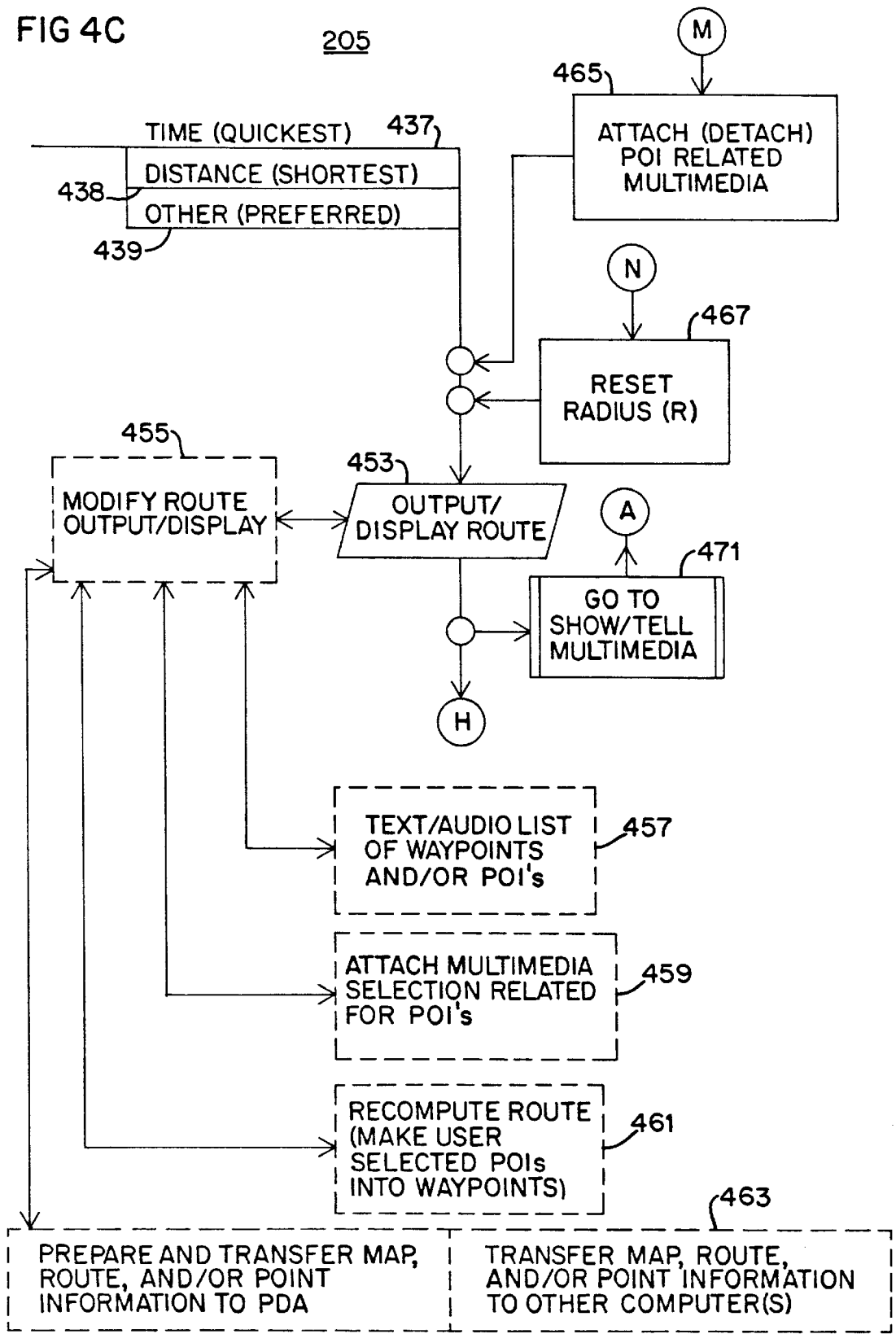

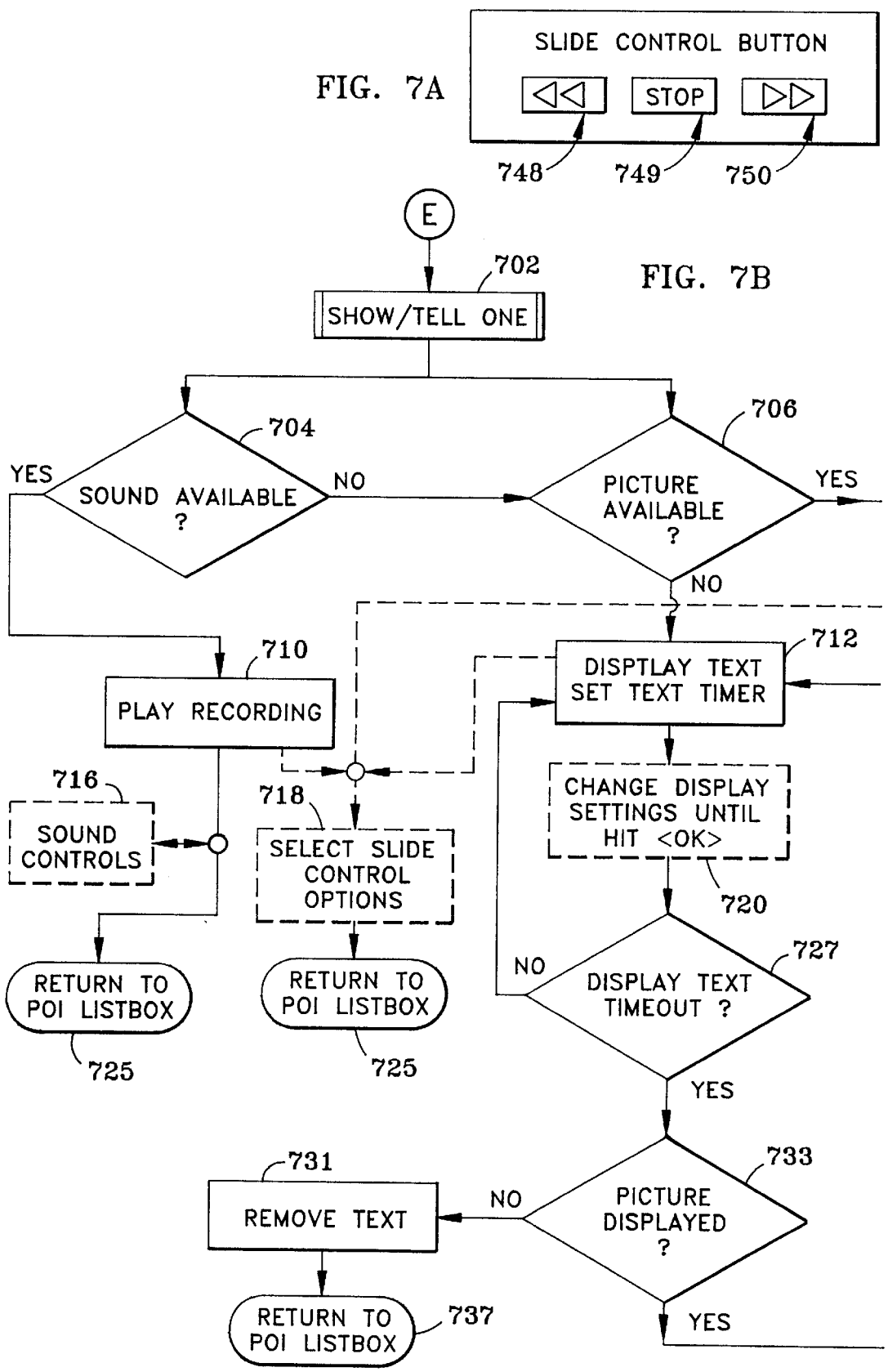

INTEGRATED ROUTING/MAPPING INFORMATION

CROSS REFERENCE TO RELATED PATENT APPLICATION

This patent application is a continuation-in-part (CIP) of the David M. DeLorme et al U.S. patent application Ser. No. 08/661,600 filed Jun. 11, 1996, for COMPUTER AIDED ROUTING AND POSITIONING SYSTEM, now U.S. Pat. No. 5,802,492, issued Sep. 1, 1998, which is a CIP of U.S. patent application Ser. No. 08/381,214 filed Jan. 31, 1995 for COMPUTER AIDED ROUTING SYSTEM, now U.S. Pat. No. 5,559,707, issued Sep. 24, 1996, which is a CIP of the David M. DeLorme et al U.S. patent application Ser. No. 08/265,327 filed Jun. 24, 1994 for COMPUTER AIDED MAP LOCATION SYSTEM, now abandoned, and the contents of these related patent applications are incorporated herein by reference.

TECHNICAL FIELD

This invention relates to a new Integrated Routing/Mapping Information System (IRMIS) for travel planning, travel guidance, and recording travel locations and paths during business or recreational use, particularly in regard to the linkage of small, memory-limited computing systems with personal and/or mainframe computers. The invention may include the capability to provide an interactive computer travel-planning guide for determining a route between a user selected travel origin and travel destination following user selected intermediate waypoints along the way. System software determines the preferred travel route within user selected constraints. The user can also select among a plurality of types of geographically locatable points of interest (POIs) within a user-defined region of interest along the travel route. A database enables the incorporation of travel information such as graphics, photos, videos, animations, audio and text information about the user selectable POIs along the way as well as about transportation routes and waypoints. From the user selected and user-defined transportation routes, waypoints, and POIs along the travel route, the software constructs a user customized multimedia travelog for preview on a computer display of the user-defined travel route. Based on the user-customized previews, the travel route including transportation routes, waypoints, and points of interest can be updated or changed according to the user preferences and choices. Modified travel routes can be previewed with further multimedia travelogs until a satisfactory travel route is achieved. The user can output a travel plan, i.e.; downloading waypoints electronically and/or printing out maps with route indications and text travel directions.

The IRMIS is applicable for use with the Global Positioning System (GPS), radio location systems, dead reckoning location systems, and hybrid location systems. For example, the GPS satellite system is used with a GPS receiver for displaying waypoint data and limited routing data of the IRMIS user on the computer display for correlation of location with surface features or mappable features. Data generated by the GPS receiver may be used for "real time position updates" in the IRMIS computer display or may be recorded by the GPS receiver in the field for subsequent downloading to IRMIS software and IRMIS computer display. As well, IRMIS-generated data may be used within the GPS receiver by an IRMIS user for guidance in the field apart from a desktop IRMIS platform. The user can follow the IRMIS generated route using just a GPS device alone, or with the further aid of other IRMIS output such as printed maps. The user can accomplish this visually and intuitively between human readable forms of a map without the necessity of a users physical determination of latitude and longitude and without requiring any mathematical calculations. Text and voice or audio outputs can be provided to facilitate use and reading of the printed maps and/or GPS devices. The invention also adds a communications dimension to the maps for adding and updating the latest spatially related data, for providing software tools for map analysis and reading, and generally for communications between computer systems and devices and between users in a variety of combinations.

The present invention is particularly applicable to small computers identified as personal digital assistants, palm computers, and any other sort of hand-held computer, defined generally herein as PDA computers. In particular, a PDA may be linked to a GPS receiver in a PDA/GPS format to log information associated with a travel route for subsequent processing through a standard personal computer or other relatively larger computer. It is to be noted that PDA travel logs and routing may include the association with a digital map display thereon with a paper map. However, given the ease of handling associated with a PDA, it is understandable that the PDA may act as a substitute for the paper map. Additionally, the PDA-related IRMIS, as implied above, involves the communication between a PDA and a desktop computer that has the storage and processing capability to provide a large array of digital maps with user-defined travel routes. Such communication is generally through hardwiring; however, it may be wireless as well.

BACKGROUND ART

A variety of computer hardware and software travel planning aids is currently available on the market primarily for vacation and recreational travel planning. A number of the travel guide software packages focus on National Parks of the United States or recreational tours and activities with prepared travelogs or prepared assemblages of multimedia travel information on the different recreational geographical locations or recreational activities. Such travel software programs are exemplified for example by the America NavigaTour (TM) MediAlive (TM) multimedia travel guide produced by CD Technology, Inc.; the Great Vacations (TM) Family Travel Guide by Positive Software Solutions; the Adventures (TM) CDROM Program for worldwide adventure travel by Deep River Publishing, Inc.; and National Parks of America, a CDROM product of Multicom Publishing, Inc. which contains a directory of all National Parks in the United States.

Rand McNally produces a software travel planning product under the trademark TRIPMAKER (TM) for planning a trip by car in the United States, Canada, and Mexico. The Rand McNally Tripmaker (TM) software also calculates quickest, shortest, and preferred scenic routes for the trip planner. While the Rand McNally product incorporates a database of many points of interest, the multimedia travelog information appears limited to preplanned scenic tours.

Similarly the American Automobile Association in cooperation with Compton's NewMedia also provides travel planning from starting point to destination point with stopping points in between. The CDROM product contains a database of travel information. However the multimedia information available from the database appears limited to "suggested routes of travel" again limiting user choice.

In each case it appears that travel information from multimedia sources is preassembled by editors so that the user or trip planner is limited to "canned" or prepared multimedia travelogs of prescribed, suggested, or pre-planned tours. Or the user is limited to information fragments about this or that particular object of interest or this or that particular place. There is no opportunity or user capability and selectivity in constructing a user-customized travelog of assembled multimedia information for previewing a particular user determined route of travel. The user is relegated to travelogs and multimedia assemblages prepared for routes and tours proposed by other editors. The first release in July 1994 of Map'n'Go (TM) Atlas of North America on CD-ROM by DeLorme Mapping Freeport Me. 04032 includes a version of IRMIS that limits the nodes or routable waypoints to specified intersections of selected roads and highways, and car ferry terminals.

Relatedly, there are a variety of mapping and positioning systems. One such system is a hand-held personal GPS navigation tool that has been developed by the Garmin Corporation of Lenexa, Kans. under the tradename Garmin GPS 45. The Garmin navigation tool incorporates a GPS receiver and a limited character display screen for displaying position information in alphanumeric and graphic characters. Another such system is a hand-held personal GPS navigation tool that has been developed by Trimble Navigation of Austin, Tex., under the trademark Scout GPS (TM). The Trimble navigation tool incorporates a GPS receiver and a four-line character display for displaying position information in alphanumeric characters. This handheld GPS system can apparently display alphanumeric position information in a latitude/longitude coordinate system or a Universal Transverse Mercator (UTM) coordinate system. The Trimble navigation tool can apparently also display proprietary coordinate system information for locating the position of a user on a standard topographic map. The Trimble GPS navigation tool displays in alphanumeric characters the horizontal and vertical coordinate distances of the user from the southeast corner or southeast reference point of any standard topographic map.

A disadvantage of the Trimble GPS navigation tool is that it provides a display of coordinate system data only in alphanumeric characters on a multiline LCD display. The user must then perform mathematical measurements and operations to determine the user location on a particular topographic map. While the incorporation of GPS technology provides an improvement over dead reckoning and position estimation from topography, it necessarily requires user reference to quantitative measurements and calculations. Furthermore, the Trimble navigation device does not provide communications access to other geographical information databases for updated information on geographical objects in the spatial area of interest or communications access to other software tools for map analysis and reading. More generally, the Trimble navigation device does not provide a communications dimension for the map reading system.

Silva Sweden AB and Rockwell International USA have developed a hand-held GPS compass navigator for use on any standard map. The GPS compass navigator incorporates a GPS receiver for locating the user on any standard map. A built-in "compass" gives range and bearing from the known user position to a specified destination. This information is updated on the GPS compass navigator as the user progresses toward the destination. The GPS navigator is described as being in the form of a guiding "puck" that apparently rides or is moved over the standard map at the user location. It cannot display multiple geographical objects at the same time and cannot communicate with other sources of spatially related map information.

In the increasingly important field of PDAs and handheld organizers, mapping technology that resolves the desire for well-defined maps and user-selectable maps with the memory limitations associated with PDAs is becoming increasingly important. The desktop computers provide the user with the capability to select geographic areas, travel origins and destinations, points of interest along the travel route, levels of map detail for maps covering wider geographical areas, and linkage to even greater computing capability by way of on-line access. The desktop mapping available today also provides for GPS linkage for travel marking as well as the means to provide audio and textual directional information. PDA cannot to date provide such capacity. Prior attempts at enabling PDA usage in regard to selectable travel routes has been limited to single-route textual itineraries. It is therefore desirable to provide in a PDA user-selectable mapping information similar to that provided through desktop computers.

OBJECTS OF THE INVENTION

It is an object of the present invention to provide a new integrated routing/mapping information system (IRMIS) capable of enabling the mating and cooperation between desktop and handheld devices, including the automatic updating of related databases whenever the desktop PC and handheld PDA link together. The PDA or handheld personal organizer may be optionally linked to a GPS receiver. It is also an object of the present invention to provide the means to take advantage of the strengths of the desktop or home-base application which provides wider geographical coverage and a fully implemented map/route/point-of-interest (poi) cartographic system, which desktop enables user selectivity or customization of map and route information—optionally tapping into online information. It is another object of the present invention to create data-cutting alternatives such that certain user selections of geographic area, start, finish, POIs, levels of detail or map magnitudes may be effectively downloaded to the PDA/GPS that produce compact map and/or route information "packages" comprising black-white bitmaps, text directions lists, point information organized in differential magnitude configurations which e.g. provide more detail and particular kinds of information around waypoints, less detail and perhaps more major road driving information along the routes between waypoints. It is a further object of the present invention to provide a means to enable a PDA to display text directions and maps (without GPS), serving similar functions to map/itinerary travel plan printouts and to facilitate in a PDA/GPS combination a map display of user's current position, and/or prompting and beeped warnings relative to text directions, as well as heading, distance, speed and other real time GPS data. The present invention is further designed to facilitate in a PDA/GPS configuration location marking and breadcrumb or GPS log functions which can be displayed on the PDA and/or uploaded, displayed, and otherwise processed back at the home-base desktop. Yet a further object of the present invention is the development of a PDA/GPS application can include programming whereby the GPS output controls map/point/route information content and levels of detail—as illustrated by "automatic zoom" upon arrival at area mapped at lesser/greater level of detail or, when a GPS receiving system "senses" that the vehicle has slowed down or stopped, map and point information displays automatically refocus or "look about" to see about restaurants, lodgings or other area attractions.

As with the prior CARPS invention described in the referenced parent application, another object of the invention is to provide a database of geographically locatable objects or points of interest (POIs) organized into a plurality of types for selection by the user. The database also incorporates travel information selected from a range of multimedia sources about the transportation routes, waypoints, and geographically locatable objects of interest along the travel route. A feature of the invention is that the objects of interest are encompassed within a user-defined region of interest of user specified dimensions along the travel route.

A further object of the invention is to provide an IRMIS for use with radio location systems, dead reckoning location systems, and hybrid location systems for displaying user location. For example, the GPS satellite system can be used for displaying the location, direction of travel, route, speed, and other travel data of an IRMIS user on a generalized grid quadrangle for correlation of user location on a coinciding printed map. Such is accomplished by direct sensory, visual, and intuitive methods. As well, the GPS satellite system may be used in the field for recording waypoint data and limited routing data of an IRMIS user for later data transfer and IRMIS computer display. Additionally, the GPS satellite system may be used in the field for updating waypoint data and limited routing data of an IRMIS user for immediate data transfer via wireless data communications from a remote field location to an IRMIS desktop platform.

The present invention is an improvement over the prior art of simple PDA operations in that the IRMIS technology enables advanced map displays, rather than simple textual information. It permits current-position displays when linked with GPS. Moreover, the developed PDA system of the present invention can act as a personal organizer as well as a "hotsynch" link between truly portable devices and desktop devices.

An additional feature of the invention is that the trip planner is no longer relegated to the prescribed or suggested routes and tours of other editors for previewing travel routes. Nor is the trip planner limited to ad hoc or fragmented multimedia information about this or that object of interest. Rather, the user constructs a user-defined travel route including transportation routes, waypoints, and POIs within a region of interest along the travel route.

Another advantage is that IRMIS users in the field may simultaneously navigate a travel route generated by IRMIS software while recording or tracking locations or sequences of locations. Such locations may be designated by the user as new POIs and sequences of locations may be transferred from the GPS receiver to the IRMIS desktop platform as an ordered waypoint list that designates a new travel route. Further, fast and accurate surveying is enabled from GPS receiver location recording data made by the user in the field when transferred to the IRMIS desktop platform for computerized data mapping by the IRMIS software.

DISCLOSURE OF THE INVENTION

In order to accomplish these results the present invention provides IRMIS for use with a PDA with display, a digital desktop computer with display, and a detachable handheld GPS receiver device which provides waypoint list management tools and compass bearing, distance, speed of travel, estimated time until arrival, and other information in relation to the next waypoint on an overall route. A variety of other peripheral equipment is also provided as hereafter described. The PDA is preferably a 3COM PALM™ or handheld computer with WIN CE™ operating system. A set of electronic maps is provided for presentation on the desktop computer display. The electronic maps depict transportation routes having route intersections and identified waypoints at geographical locations along the transportation routes. The route intersections and identified waypoints depicted on the electronic maps are identified in the desktop computer by coordinate locations of a selected geographical coordinate system.

An IRMIS database contains geographically locatable objects (loc/objects) also referred to as points of interest (POIs) identified by coordinate locations in the geographical coordinate system. The POIs are organized into a plurality of types for user selection of loc/objects or POIs individually and by type. The loc/object or POI types constitute electronic overlays of the database for display over the electronic maps on the computer display. As used in this specification and claims, the phrase points of interest or POIs is generally used to refer to loc/objects for which multimedia information is available for describing the POIs and presenting the points of interest in a multimedia travelog as hereafter described. It is to be noted that in the context of PDA linkage, multimedia displays are optional rather than the focus of the present IRMIS invention.

Typically, the IRMIS database is a geographical information system or GIS. Such a GIS manages data in the GIS database in relation to the geographical coordinate locations of the selected geographical coordinate system. Thus, the IRMIS database manager relates points of interest and any other loc/objects of the database with particular locations on or near the surface of the earth in terms of coordinate locations such as latitude and longitude. The multimedia information hereafter described is similarly identified with the coordinate location of the subject POIs.

IRMIS software is constructed for user travel planning using the electronic maps presented on the desktop computer display. The IRMIS software permits user selection of a travel origin, travel destination, and desired waypoints between the travel origin and travel destination. The IRMIS software calculates, delineates and displays a travel route between the travel origin and the travel destination via the selected waypoints. The travel route is calculated according to user choice of the shortest travel route, quickest travel route, or user determined preferred travel route. As used in the specification and claims, waypoints refers to the origin and destination of a possible route and intermediate points or places along the way including major road and highway intersections, joints or turning points at connected short line segments of major roads and highways, place names situated on major roads and highways, and as hereafter described, POIs near the major roads and highways.

The IRMIS software permits user selection of a particular map, area, or a point of interest. The IRMIS software further enables routing and the extraction or cutting of a route as well as area maps for downloading to the PDA. The IRMIS route map that is developed is essentially a larger scale map encompassing a start and a finish of the route. Included is at least one map of more detailed, greater resolution and/or higher magnitude maps of the start, the finish, and, possibly, other waypoints or POIs. That is, the present invention permits the user to select an area or route on the desktop computer-displayed maps and create PDA maps that are cut in accordance with that selection. This is an advantage over the prior art which was limited to pre-cut, one-size-fits-all maps for specific regions, areas, or cities.

The electronic maps, IRMIS database, and IRMIS software are typically stored on a CDROM and the digital computer incorporates a CDROM drive. The IRMIS software may include a replace function for updating the electronic maps and IRMIS database on the CDROM with replacement or supplemental information from another memory device. Additionally, the IRMIS database may be accessed via the Internet and other online sources.

Other features of the system and method are set forth in further detail in the following specification and accompanying drawings.

BRIEF DESCRIPTION OF THE DRAWINGS

FIG. 1A1 is a schematic representation of the IRMIS of the present invention in context using a PDA with cradle in combination with a GPS receiver and a computer device.

FIG. 1A2 is a schematic representation of the IRMIS of the present invention showing a PDA used in conjunction with a paper map.

FIG. 1A3 is a schematic representation of the IRMIS of the present invention showing a GPS receiver device in relation to the database, a GPS, and peripheral wired and wireless communication systems.

FIGS. 1A4(a)–1A5(j) illustrative the observation interfaces for the PDA/GPS in relation to use of the IRMIS of the present invention.

FIGS. 1A6(1)–1A5(16) illustrate PDA output and interface displays and screens in regard to use of the IRMIS of the present invention.

FIGS. 1B–1M, 1O and 1P illustrate example desktop screen displays and user interfaces for IRMIS while

FIG. 2 is an overall block diagram of the interactive IRMIS system combining routing and travel operations with multimedia information operations.

FIG. 3 is a flow chart showing the operational steps and user options available to multimedia users of IRMIS.

FIGS. 4A, 4B, and 4C are assembled to form a flow chart showing the operational steps and user options available to travel planning and routing users of IRMIS. The flow chart assembled by FIGS. 4A, 4B, and 4C is referred to in the specification as FIG. 4.

FIGS. 7A, 7B, and 7C are assembled to form the flow chart referred to in the specification as FIG. 7 showing the user controls and commands made available to the multimedia user of IRMIS.

DESCRIPTION OF PREFERRED EXAMPLE EMBODIMENTS AND BEST MODE OF THE INVENTION

Figure 1A:
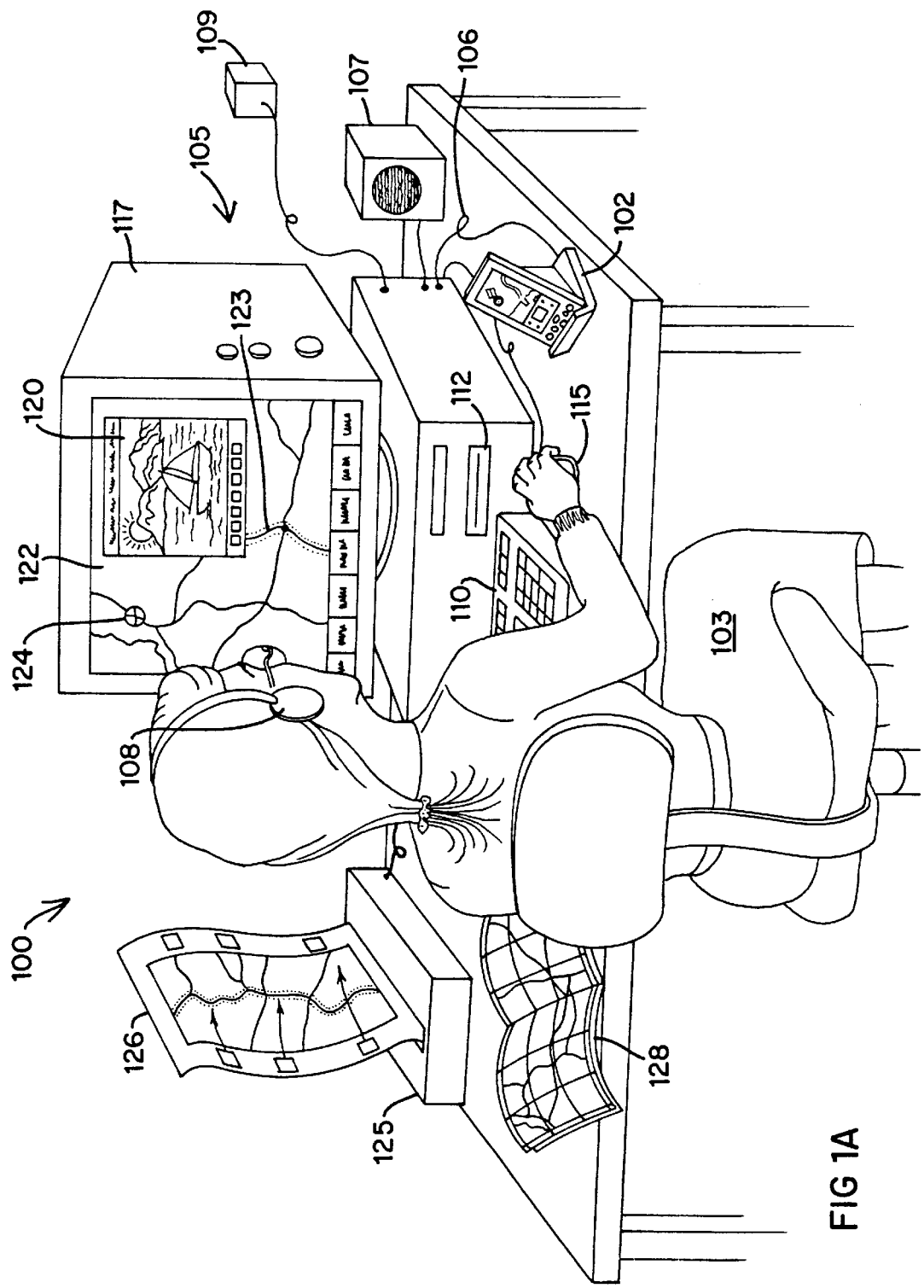
FIG. 1A presents a diagrammatic perspective view of home-based desktop IRMIS of the present invention linked to a PDA for downloading/uploading route, map, point-of-interest, and other information.

An IRMIS 100 according to the present invention is illustrated by way of example in FIG. 1A. A user 103 operates the software system 100, provided on CD-ROM, utilizing a desktop personal computer equipped for multimedia. In the preferred embodiment, illustrated in FIG. 1A, the desktop computer system 105 includes a 286, 386, 486, or Pentium (TM) Intel (TM) processor or equivalent, with typical memory devices, associated circuitry and peripheral devices including a monitor or cathode ray tube (CRT) 117, a speaker or audio system 107, a printer 125, a CD-ROM player 112, a mouse 115 or similar pointing device, and keyboard 110. Alternatively, the software for the desktop system 105 can be provided on diskette, run from a hard drive or central server (e.g., a local area network internally linked to a mainframe or externally linked to the Internet as shown at 109).

Included for use with IRMIS 100, the desktop computer 105 is integrated with a handheld or palmtop personal organizer PC, also known as a personal digital assistant or PDA, as shown at 102, in a cradle facilitating connection 106 with the desktop. This PDA, at 102, is detachable for portable use, typically in conjunction with a GPS or equivalent position information device as described hereafter. The "home-base" desktop personal computer system 105 and the detachable PDA communicate at 106 in FIG. 1A via plug-in wiring. The desktop/PDA interface 106 can be any means which facilitates data transfer including wireless infra-red, diverse kinds of wireless and other modems, and data transfer by various intermediate memory storage devices e.g. diskettes, PCMCIA cards and so forth. This communication interface between the portable PDA and home-base desktop facilitate transfer of a wide range of geographic data—including map, route, or point information—and other information. For example, maps of an area of interest to the user can be selected on the desktop and downloaded to the PDA for portable use. Information recorded on the detached PDA 102 at remote locations, including annotated location marks and recorded "breadcrumbs" or points along an actual path of travel for example, can be brought back to and then transferred into the desktop 105 via the data transfer interface 106.

Alternative embodiments could include other input devices e.g. voice recognition system, joystick, touchscreen, scanner for printed map input, simplified keypad, etc., not represented here. FIG. 1A discloses IRMIS 100 implemented on a single, stand-alone, desktop style, personal computer. The software technology, which facilitates interactivity between routing and multimedia, also works on a more portable laptop or notebook computer, a handheld personal digital assistant (PDA), embedded in a travel planning appliance or an in-vehicle navigation system, as well as on mainframes of various kinds, distributed work stations, or networked systems. Alternatively, users can also operate IRMIS 100 from a remote interface through wireless or hard-wire links connecting with a distant computer system or a central service bureau as shown at 109.

FIG. 1A shows a map book or set of printed maps typically on paper media 128 corresponding to the electronic or digital map 122 displayed on the screen or monitor 117. The printed maps 128 can be consulted as an aid in using the corresponding electronic or digital maps 122 displayed on screen, and the hardcopy travel plan printouts 126 derived from interactivity between the routing and multimedia elements of the invention. It is expected that users will printout such hardcopy travel plans 126 to guide and direct their journeys on foot, in vehicles, or by other means of travel. Alternatively, the IRMIS invention provides portable PDA/GPS capability to guide users and record information at remote locations as described hereafter.

The hardcopy travel plan 126 illustrated in FIG. 1A consists of a strip map noting points of interest, travel directions and critical turning points along the recommended route, described in more detail hereafter. Such hardcopy travel plans, typically printed on paper, comprise a portable and compact form of output from the system, useful and easily read in field situations, without the expense or burden of carrying even a small computer device. A variety of other forms of digital and printed media output can result from the combination of the software routing and multimedia processes, as described hereafter.

The user 103, in FIG. 1A, is operating both the routing and related multimedia elements of the invention. The monitor 117 screen is filled with an electronic analog map (or digital map) display 122 on which departure points, destinations and other waypoints can be entered or deleted and the shortest, fastest or otherwise optimized routes calculated, as described in more detail below. At the same time, in a multimedia window 120 superimposed upon the map display, the user 103 is engaged in viewing, hearing, or responding to a selectable, multimedia presentation related to points of interest and locations displayed on the underlying map screen 122.

For purposes of this specification the term multimedia embraces all manner of graphics, text, alphanumeric data, video, moving or animated images, as well as still images, photographs and other audio or visual information in digital or analog formats. Multimedia also includes audio output options, voice, music, natural and artificial sound, conveyed to users through a speaker system 107 or earphones 108. As detailed hereafter, the invention stores, manages and retrieves a database of multimedia information in relation to specific places on or near the surface of the earth, referred to herein as points of interest (POIs), or geographical sites or locations. These are geographically locatable objects (loc/objects) for which multimedia information is available in the IRMIS database. Generally, POIs can be represented in both digital and print media cartography and are situated or described by standard geographic coordinates such as latitude and longitude, UTM, State Plane, or equivalent map location systems.

From the digital map and routing function shown in FIG. 1A at 122, the user 103 can select one or more particular geographic locations, or points of interest (POIs), in order to view, hear or manipulate related information in the multimedia dimension of the invention. FIG. 1A shows the multimedia element of the invention as an episode in a multimedia presentation comprised of graphics or text, shown in an on screen window 120, or audio output conveyed to the user 103 via a speaker 107 or earphones 108. For example, in the multimedia window 120, the user 103 can view and selectively respond to color photographic or video images or related textual information about a specific location, or group of locations. Locations are chosen by the user working within the underlying digital map and routing dimension of invention, illustrated at 122.

More specifically, FIG. 1A shows a scenario in which the user 103 has selected a particular lakeside location 124 on the underlying digital map, or in conjunction with a route or a waypoint along a route. The specific lakeside location 124 is shown as an "X" in a circle 124 on the simplified drawing of a typical digital map screen 122. The user 103 picked this point of interest located by a lake by means such as a mouse clicking operation at the location or placename as depicted on the digital map 122. The location can also be identified by words or symbols along a displayed route on the underlying digital map screen 122, by selection from a list of place names or from a list of types of locations, or by other routine or state of the art inputs.

The user's choice of a particular location prompts a multimedia presentation 120 of information related to the selected place e.g. stills or video pictures of the lake, local events, places to stay or eat, attractions and recreational opportunities, related text or audio narrative, local history, lore, even complex or extensive data on topographic, environmental, demographic, real estate or marketing information, etc. The multimedia presentation is illustrated by the graphic image of a view of the lake, sailboat and mountains on the far shore, in the window 120, accompanied by related audio output 107 or 108. IRMIS 100 enables a user to prompt a multimedia presentation 120 on a location 124, or group of locations, selected from within a digital or electronic mapping system 122, equipped to do routing functions and displays 123.

FIG. 1A additionally illustrates procedures whereby users can modify waypoints and other route parameters from within the multimedia element of the software invention. Typically, routes or waypoints are displayed as highlighted line segments or points 123 on the digital or electronic map 122. Routes and waypoints may also take the form of map symbols and annotations, or of ordered lists of place names, travel directions, geographic coordinates or various other location identifiers, as described hereinafter. IRMIS 100 combines routing and multimedia elements by enabling the user 103, to add, delete or insert one or more particular geographic locations or points of interest. This is achieved based upon the presentation of multimedia information about those locations, as new or modified input for additional processing of the route.

In FIG. 1A, the lakeside location 124 and the route 123 on the desktop digital map screen 122 could also include one or more points marked and/or actual travel routes recorded with the IRMIS portable PDA/GPS unit described hereafter. Thus, map, route, or point information recorded and/or recorded at remote locations on the PDA/GPS component of IRMIS can be displayed, incorporated and otherwise processed by the more fully articulated desktop GIS, or computerized geographic information system 105.

For example, in FIG. 1A, mouse manipulatable buttons along the bottom of the multimedia window 120 enable the user 103 to command IRMIS 100 to include the lakeside location 124, based on the multimedia presentation 120, as new input for routing. IRMIS 100 facilitates entry or deletion of locations, reviewed in multimedia subject matter, as new starting places, destinations, intermediate waypoints, or points of interest along the way as part of the user-selected route. FIG. 1A represents how user interactions with multimedia about locations can be used to change the route.

FIG. 1A further illustrates output from IRMIS 100, a hardcopy printout 126, typically a customized or individualized travel plan in the shape of a strip map annotated with travel directions and related information. Output from IRMIS 100 is produced by combined interaction between the routing functions and user responses to the multimedia information about particular geographic locations. Thus, for one example, the hardcopy travel plan 126 exhibits attached points of interest, typically in the form of annotations connected with graphic arrows or pointers to particular geographic locations which fall within a predetermined distance from a displayed route. The user attaches such points of interest to a digital map route display from a multimedia presentation on those locations. Alternative forms of digital, audio, text, graphical, hardcopy or multimedia output from IRMIS 100 are detailed later in this disclosure.

Output from the invention can result from a single, simple interaction between routing and multimedia elements. FIG. 1A illustrates a scenario whereby the user-selected only one point of interest, a place by a lake 124, close to a route 123 highlighted upon an electronic or digital map display 122. Next the user prompted the presentation of multimedia information in a window 120 concerning the lakeside point of interest. Prompted by the multimedia presentation, the user then pushed the "Attach" button in the command bar across the window bottom, or otherwise prompted IRMIS to include the lakeside location as an annotated point of interest within a specified distance from the highlighted route displayed upon the map screen or printed on a hardcopy travel plan.

In FIG. 1A, the hardcopy travel plan 126 output actually contains arrows or pointers from three annotation boxes to three corresponding points of interest attached to the strip route map output. Moreover, the highlighted route running up the center of the strip map format may reflect waypoints added or deleted over the course of a sequence of interactions between the multimedia and routing elements of the invention. Users can utilize the invention to attach multiple points of interest, or make many modifications of actual waypoints and highlighted routes, working interactively between the multimedia database and the routing function. The system, as described hereafter, is flexible, selective and capable of series of multiple interactions and repeated iterations in order for the user to develop, alter and refine an individualized or customized travel plan through varied operational cycles, combining routing and utilization of the multimedia database on locations.

Figure 1B:
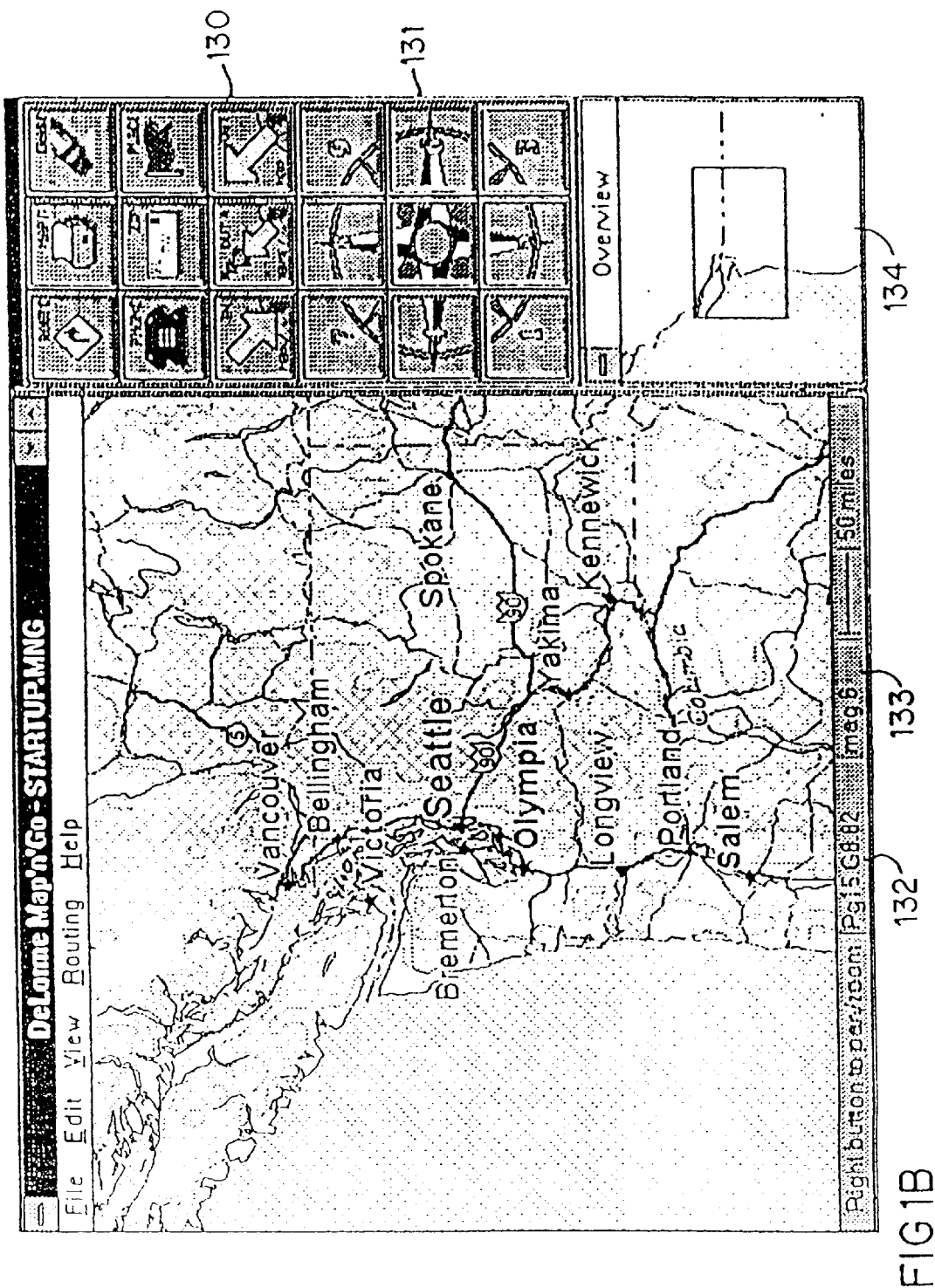
Figure 1C:
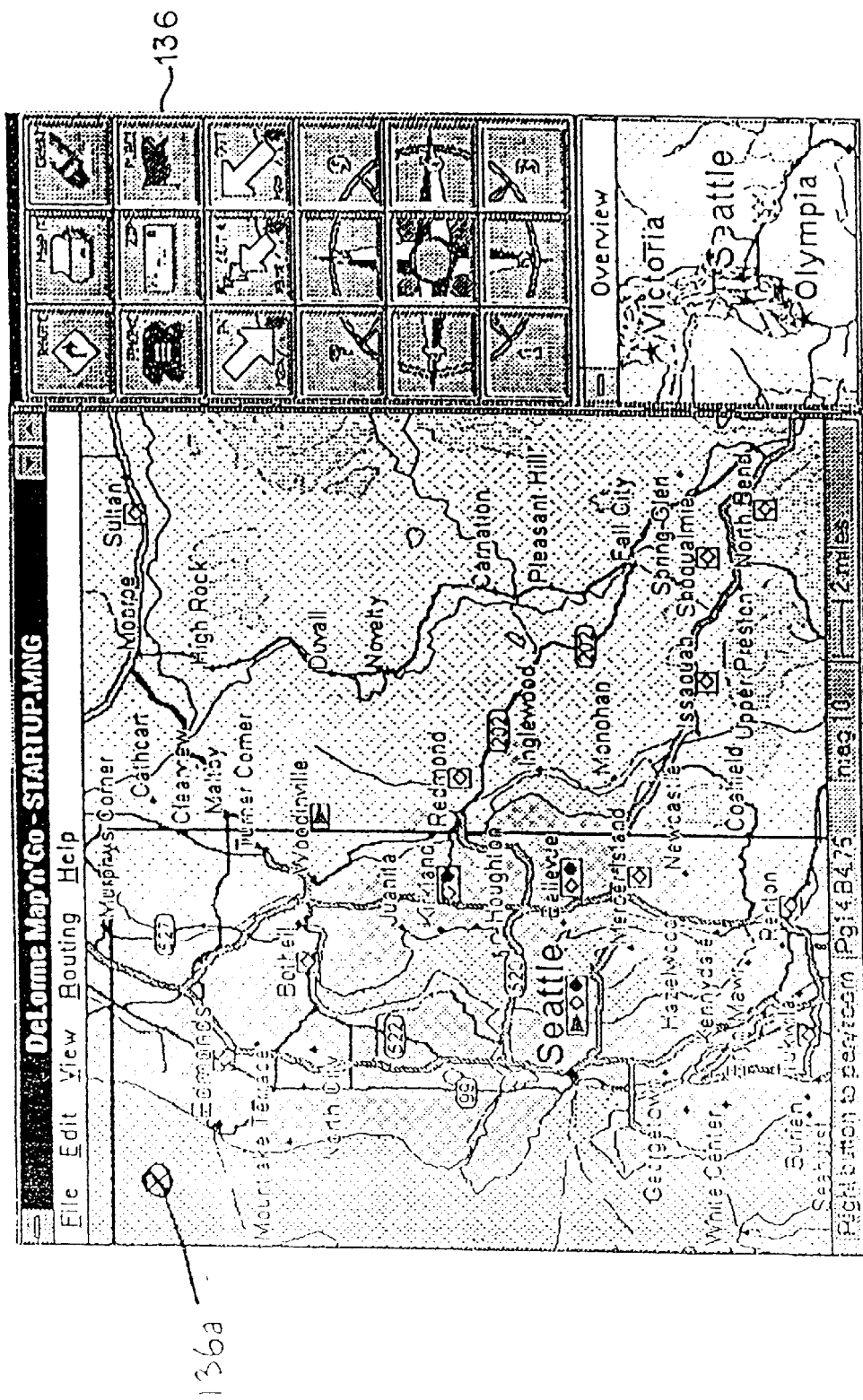
Figure 1D:
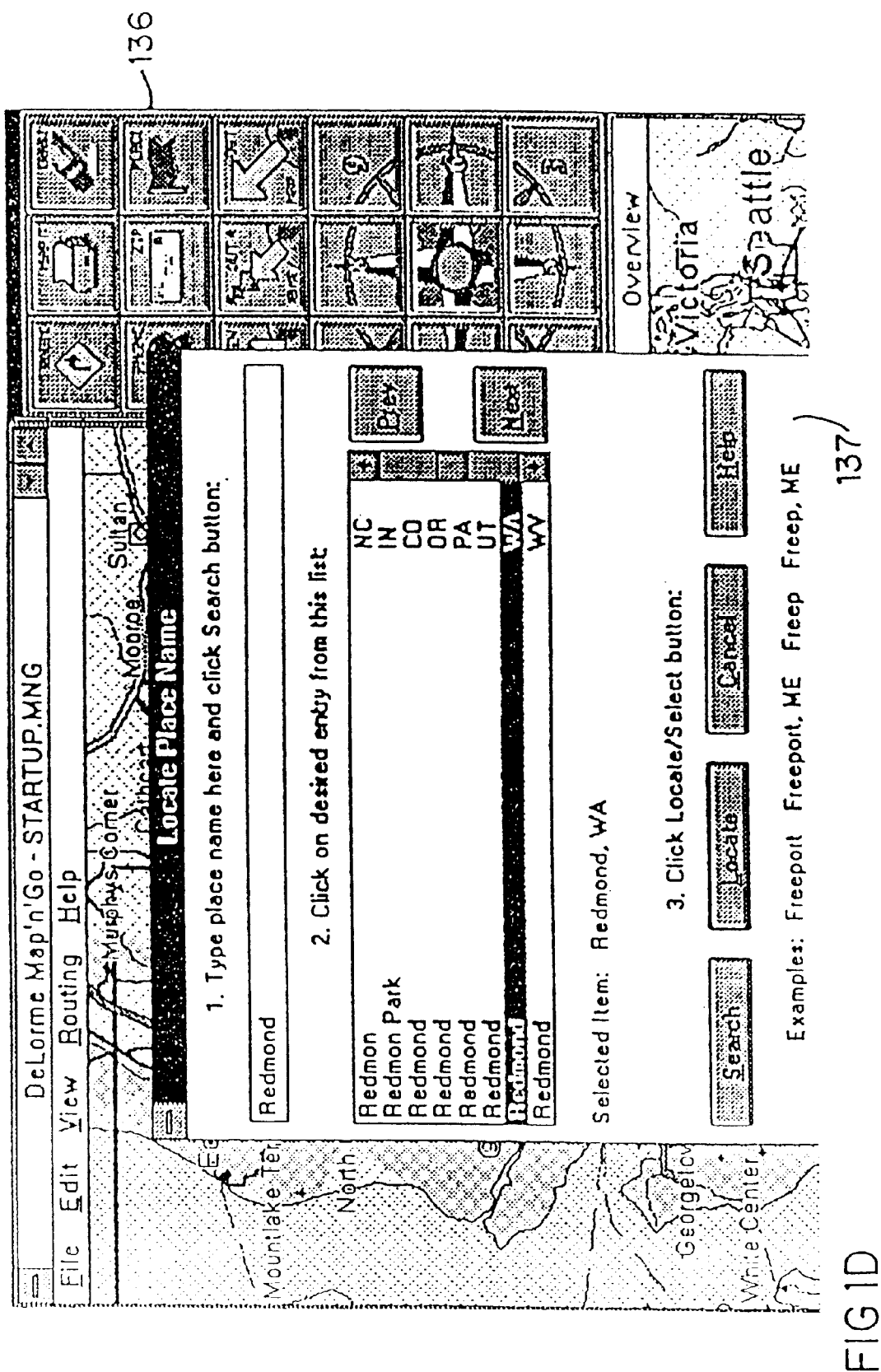
Figure 1G:
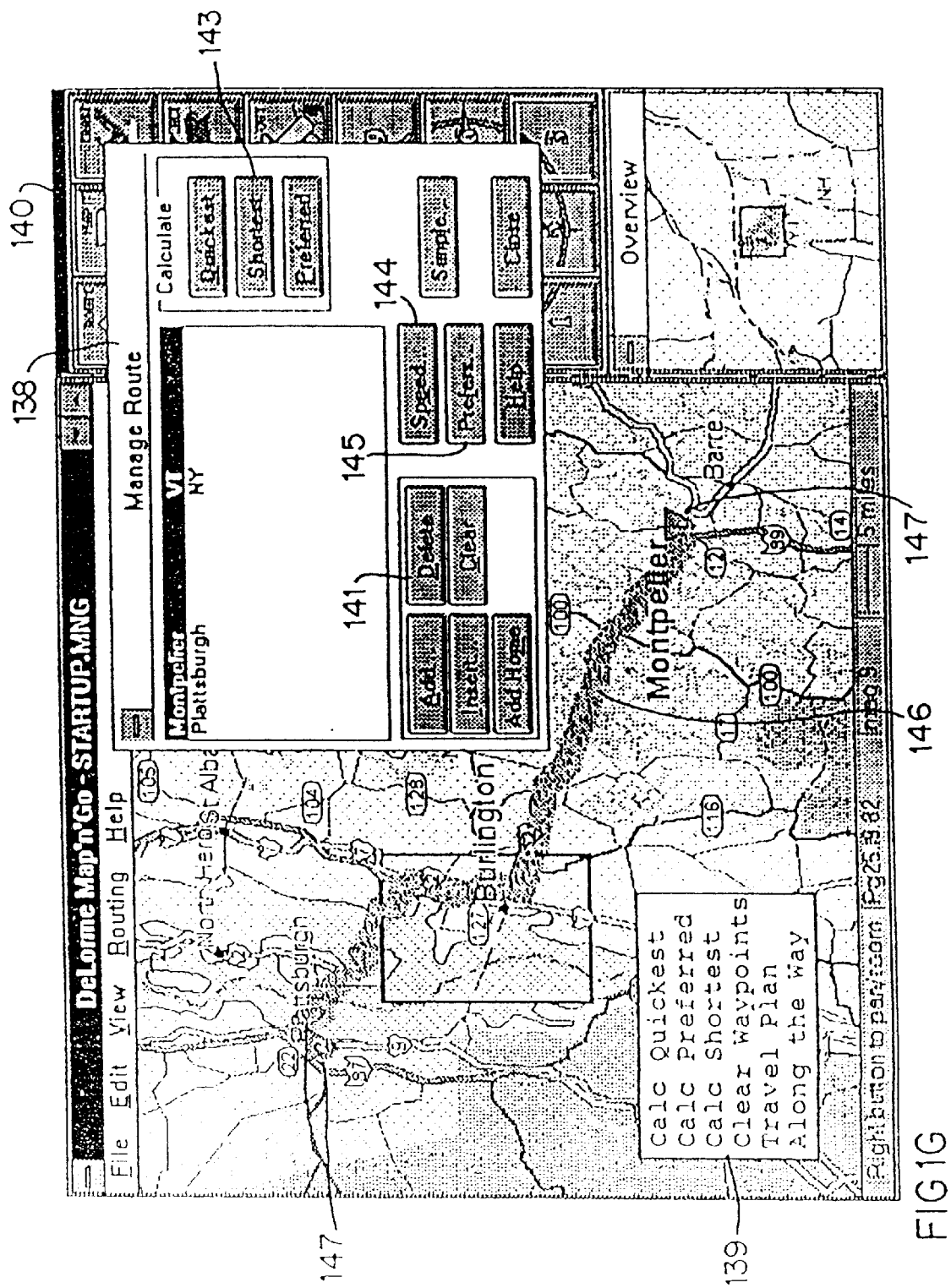
Figure 1I:
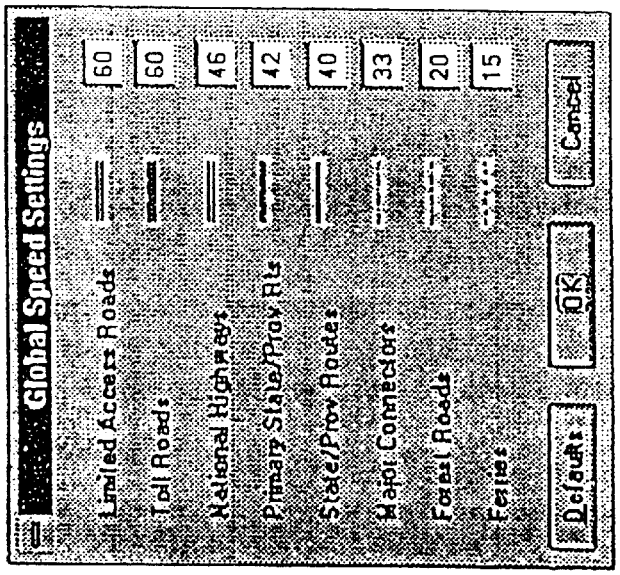
Figure 1H:
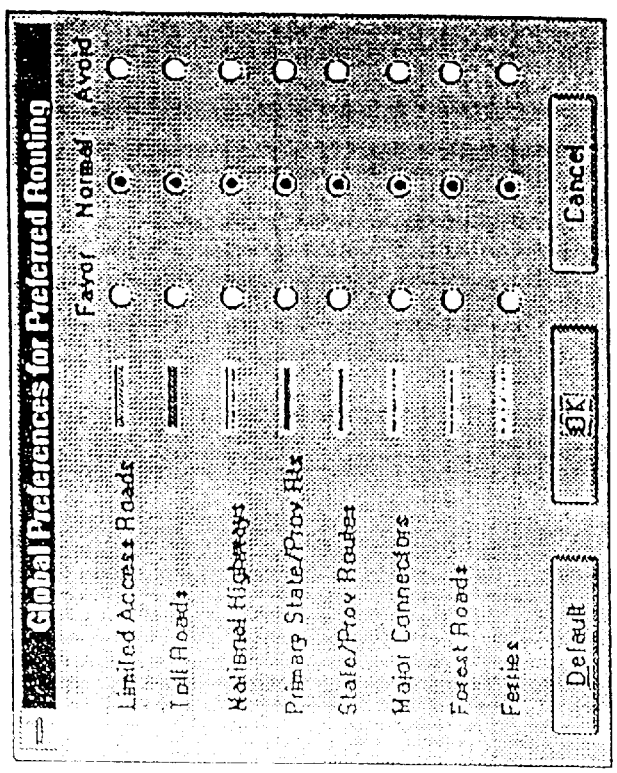
Figure 1J:
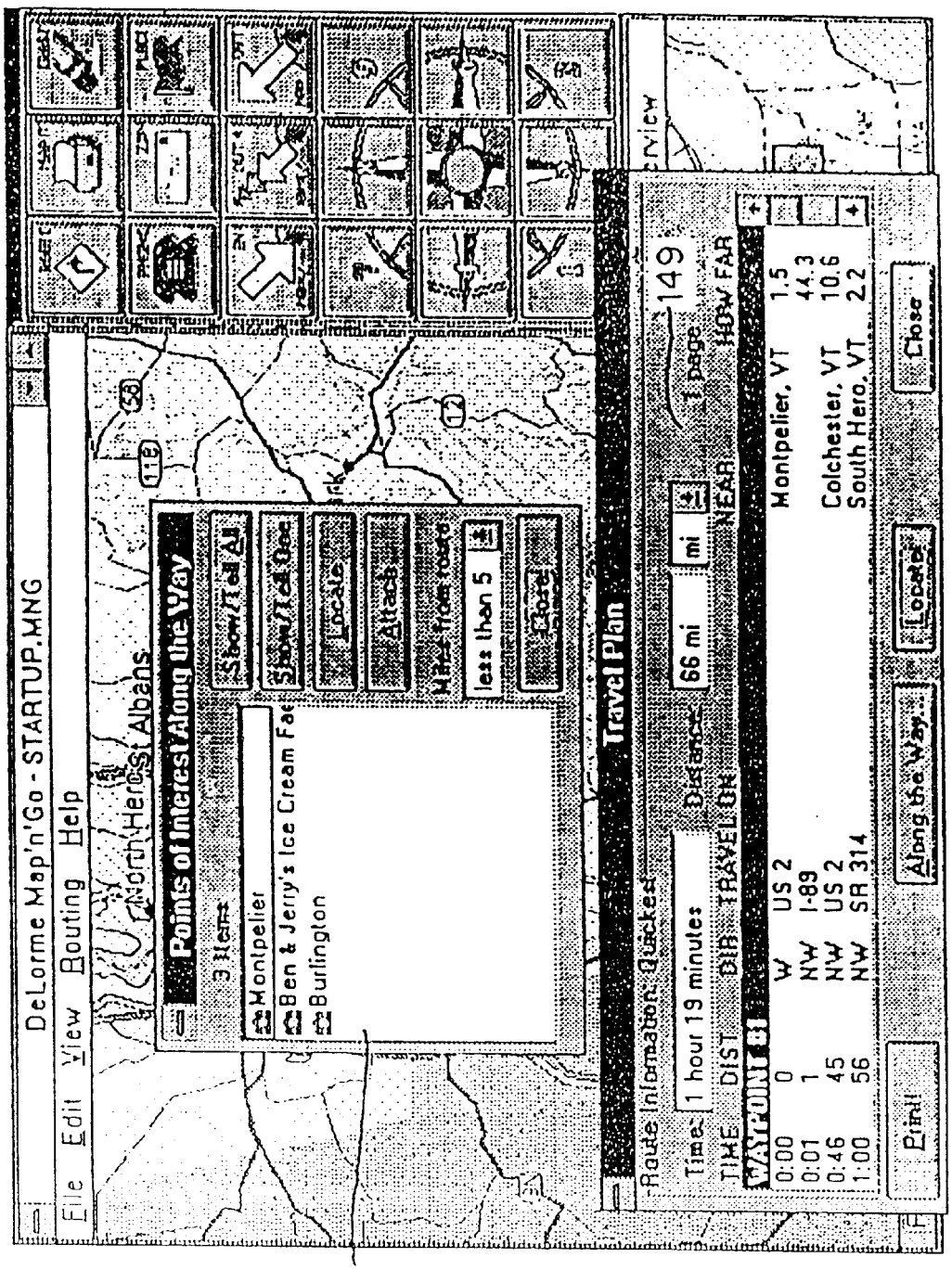
Figure 1K:
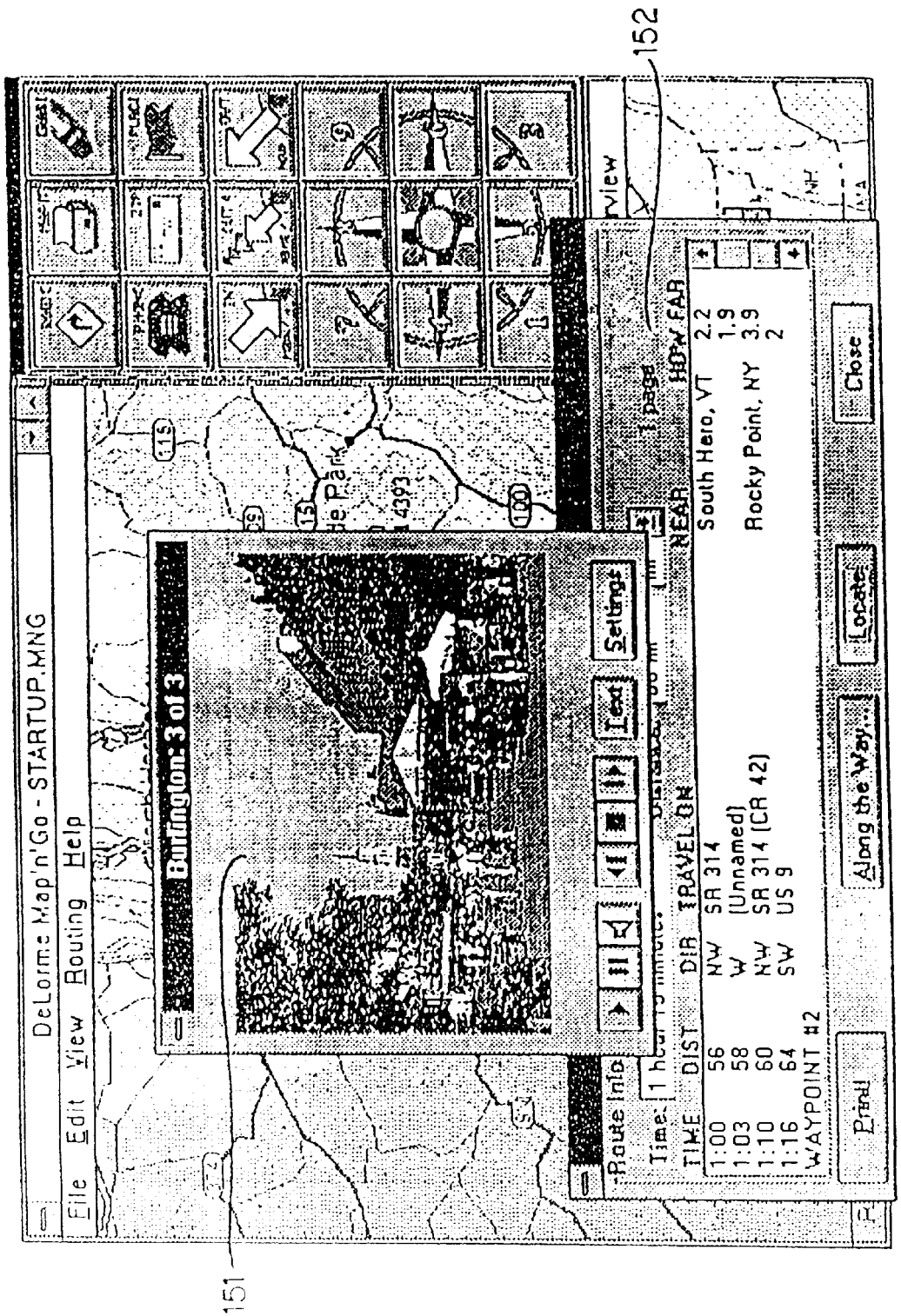
Figure 1L:
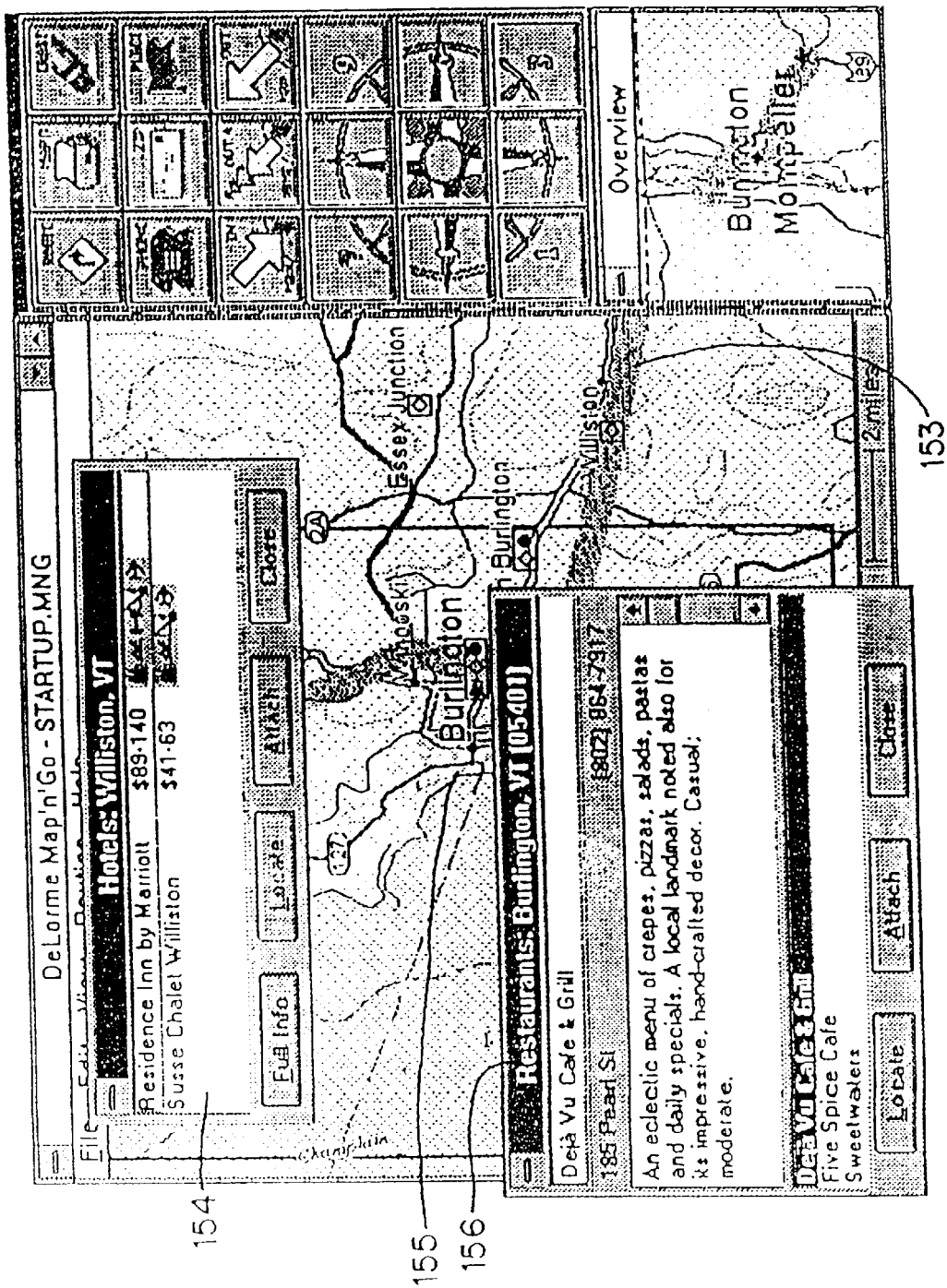
Figure 1M:
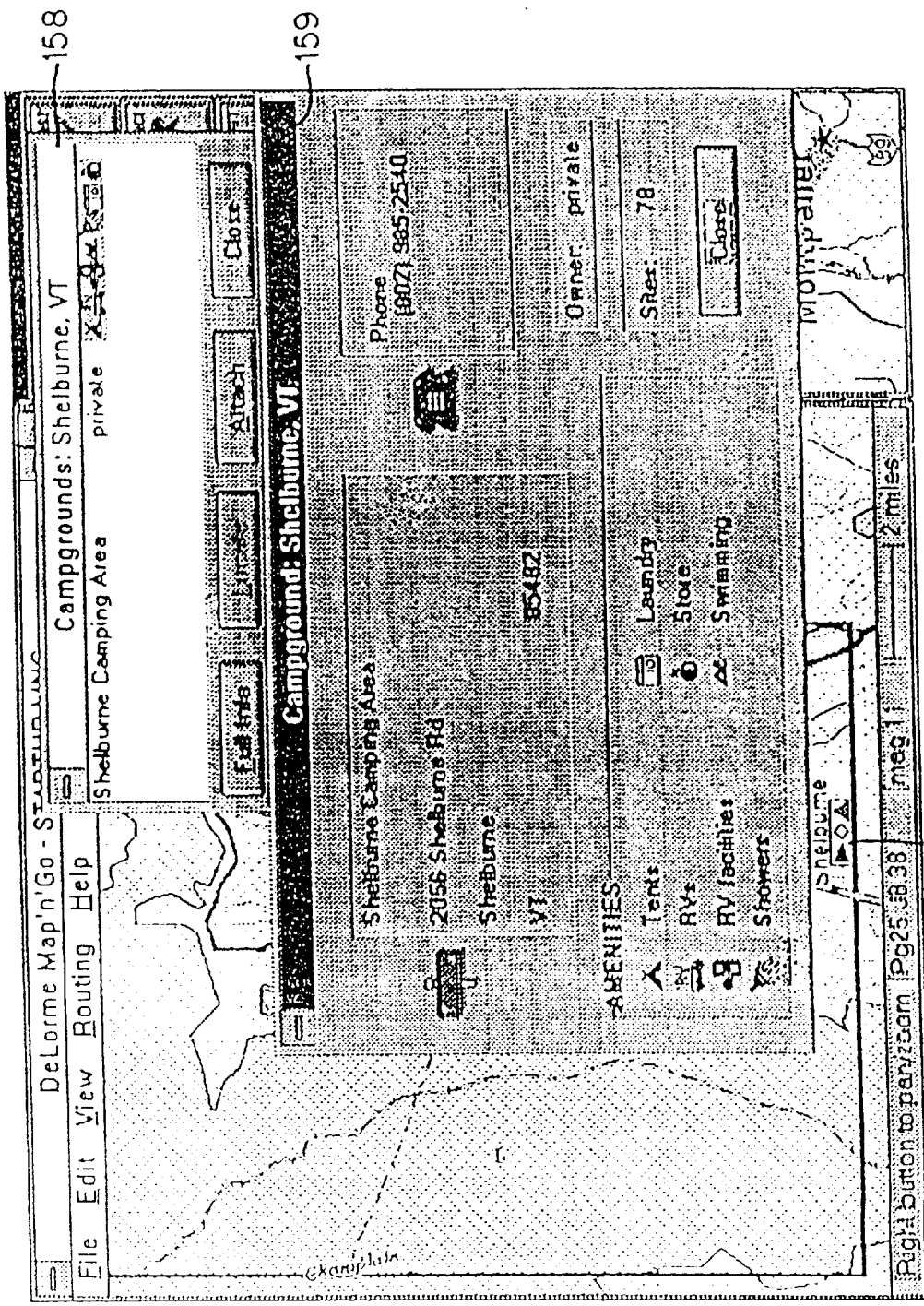
Figure 1N:
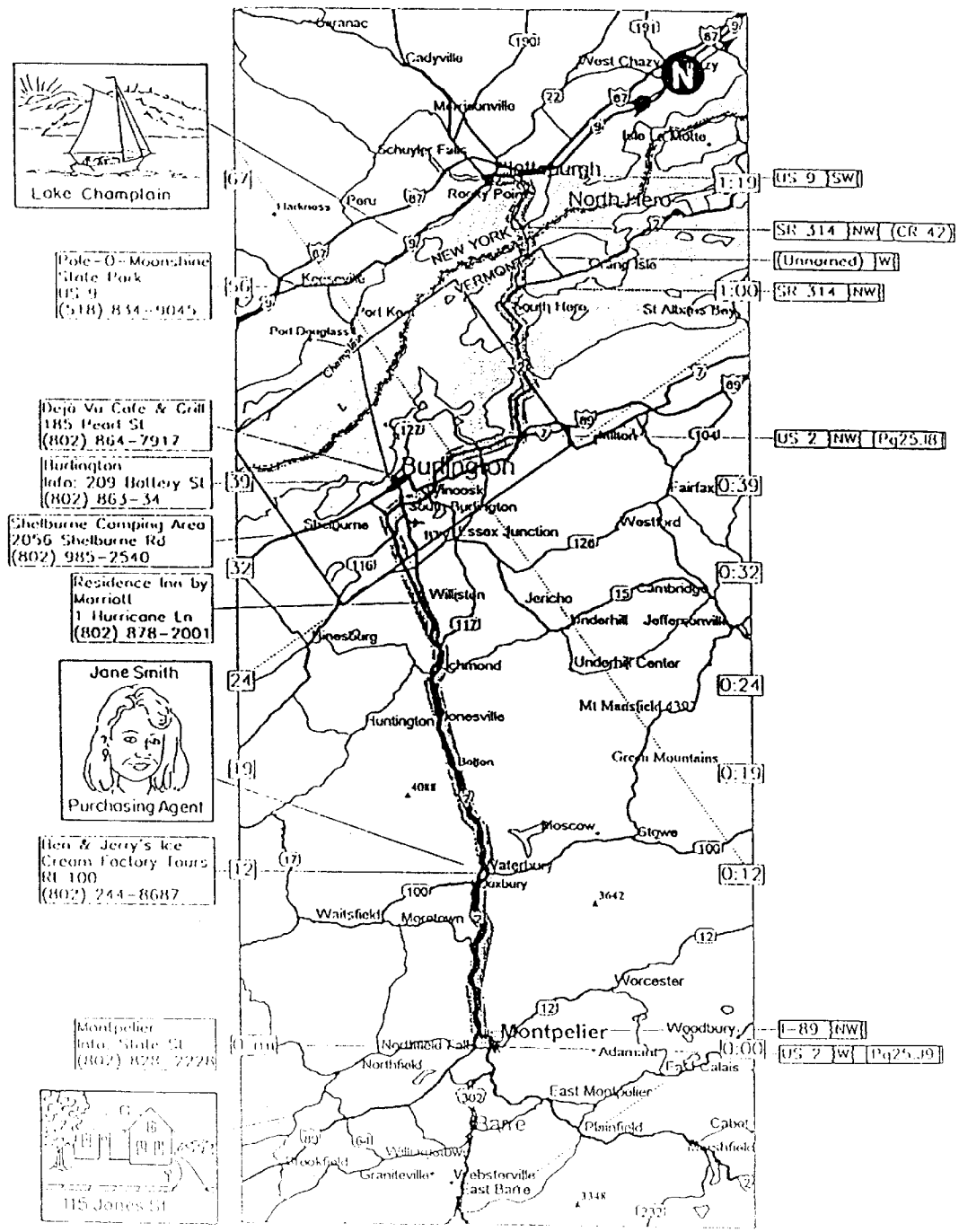
FIG. 1N illustrates an example hard copy printout of a travel plan prepared by IRMIS, or alternatively, digital IRMIS travel plan output.
Figure 10:
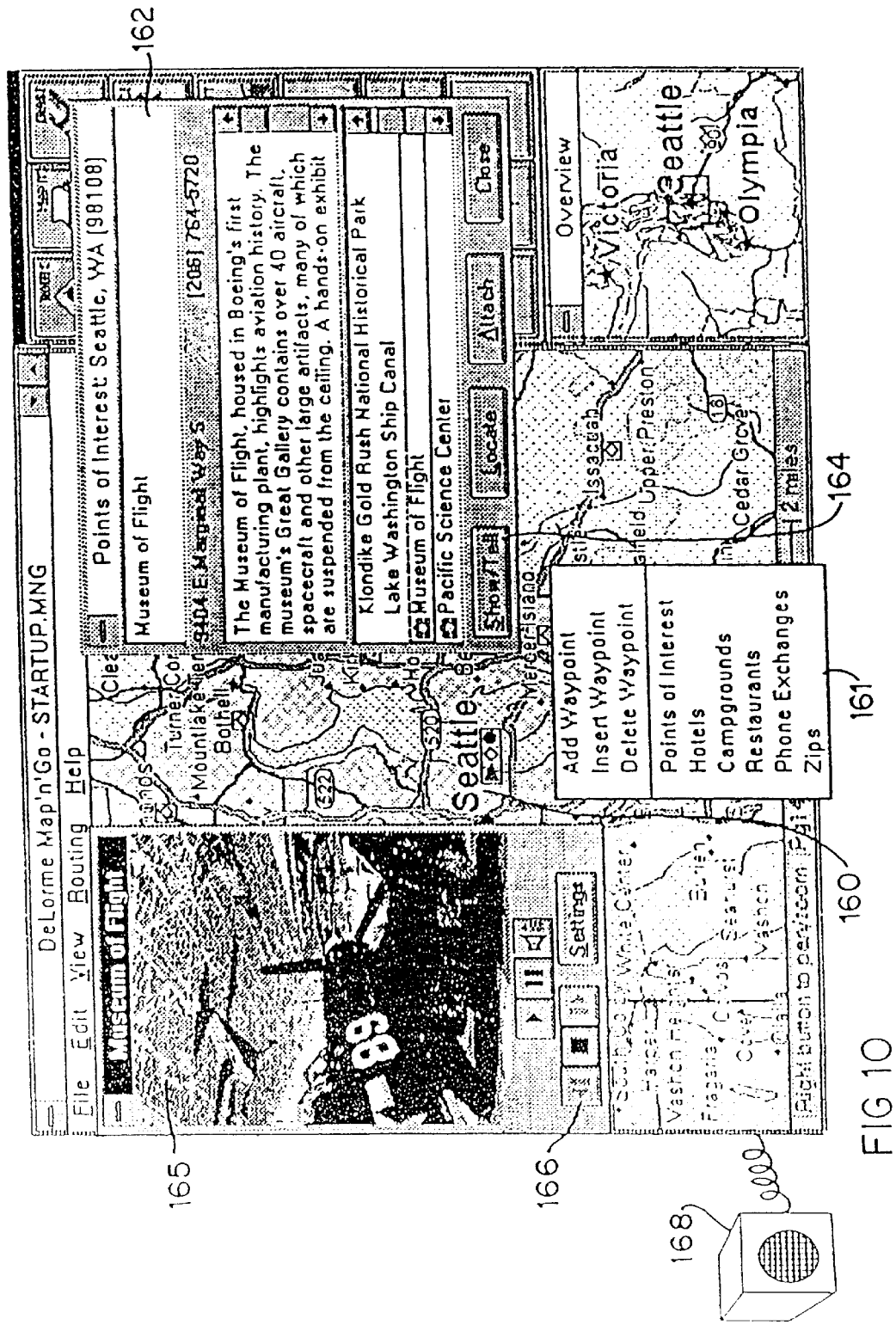

FIG. 1A therefore illustrates but one episode in a potential series of interactions between the routing and multimedia sides of the system, for producing a customized travel plan output, as exemplified by the annotated hardcopy travel plan 126 and further detailed in FIG. 1N. In the alternative, such customized travel plan output(s) may be incorporated into one or more digital route, map, and/or point information "packages," i.e., specialized data sets prepared on the IRMIS desktop computer 105 for use in the portable IRMIS PDA 102, typically in conjunction with GPS, at remote locations—as detailed hereafter. Such a travel plan, and alternative forms of output can result from attaching multiple points of interest, waypoints, and route modifications based upon a succession of multimedia presentations of information on many locations to generate a custom travel plan tailored to the user's personal preferences, as expressed throughout the whole sequence of interactions.

FIG. 1A1 illustrates the portable PDA component of IRMIS at 01 as used apart from its cradle at 02 or data transfer connection at 03 to the desktop component of IRMIS (not shown). The portable or handheld component of IRMIS is implemented on a variety of state-of-art handheld or palmtop portable "personal organizer" devices as shown in FIG. 1A1. For example, IRMIS is embodied in SOLUS™ software provided by DeLorme a.k.a. DeLorme Publishing Co. Inc. of Yarmouth, Me. (www.delorme.com), assignee of this IRMIS patent application and its parent applications. DeLorme's SOLUS program is compatible with the following portable platforms: (1) PalmPilot Personal, Palmpilot Professional, Palm III™, or the PalmPilot 1000 or 5000 with 1 MB upgrade—using Palm OS™ version 2.0 or later—from the 3COM Palm Computing Platform family (formerly a U.S. Robotics product line); (2) various Microsoft™ Windows™ WIN CE compatible devices, working with Windows™ CE 2.0, including NEC™ MobilPro™700/ 750C, Compaq™ 810/200C, Sharp™ HC-4000/4100/ 45000, Phillips Velo™ 500, Casio™ Cassiopeia A-20 and Hewlett-Packard HP 360LX & 620LX. FIG. 1A1 at 01 shows a 3COM PALM III being used in a handheld mode, apart from its cradle connector at 02.

Generally, such PDAs, handhelds or "palmtops" are provided with user alphanumeric input means such as a miniature keyboard, the Palm Computing Platform "graffiti" language for handwritten stylus or pen-point input, and so forth. Hardware and software buttons provide for menus, paging, and other user selection and manipulation means. These portable devices are also typically equipped with gray-scale "touch-screens" for text/graphic display. Such "touch-screens" can be actuated at particular points and/or series of points by touching, tapping, or sliding on the screen with a stylus, or the equivalent of a pen or pencil point.

The IRMIS invention—for example as embodied in Delorme's SOLUS™ software—provides a mapping or geographic information system application and data, for use on such PDAs, handhelds or palmtops and equivalent devices, as described hereafter. IRMIS or SOLUS map displays, as shown in FIG. 1A1, can be controlled, queried and manipulated by use of a stylus at 05, managing the virtual equivalent of typical computer mouse commands and manipulations. Alphanumeric text input, handwritten with stylus, is enabled at 06. For example, DeLorme's SOLUS is programmed so that, in a certain mode, the user can "mark" particular locations, recording exact geographic coordinates (e.g. lat/long), and make related notes or text annotations using the stylus or equivalent. By means well-known in the art of programming such portable devices, IRMIS in the form of the DeLorme SOLUS software also facilitates stylus on touch screen operations as follows: (1) the user "picking" points for additional information (e.g., a place name, lat/ long, or other text or graphic information associated with the point); and (2) estimating distances by "sliding" the stylus between locations or points on the map display, or along a path or route or user-drawn pattern on the touch-screen map display—prompting an estimated distance readout in feet, kilometers or miles according the scale of the current map display.

Figure 4A:
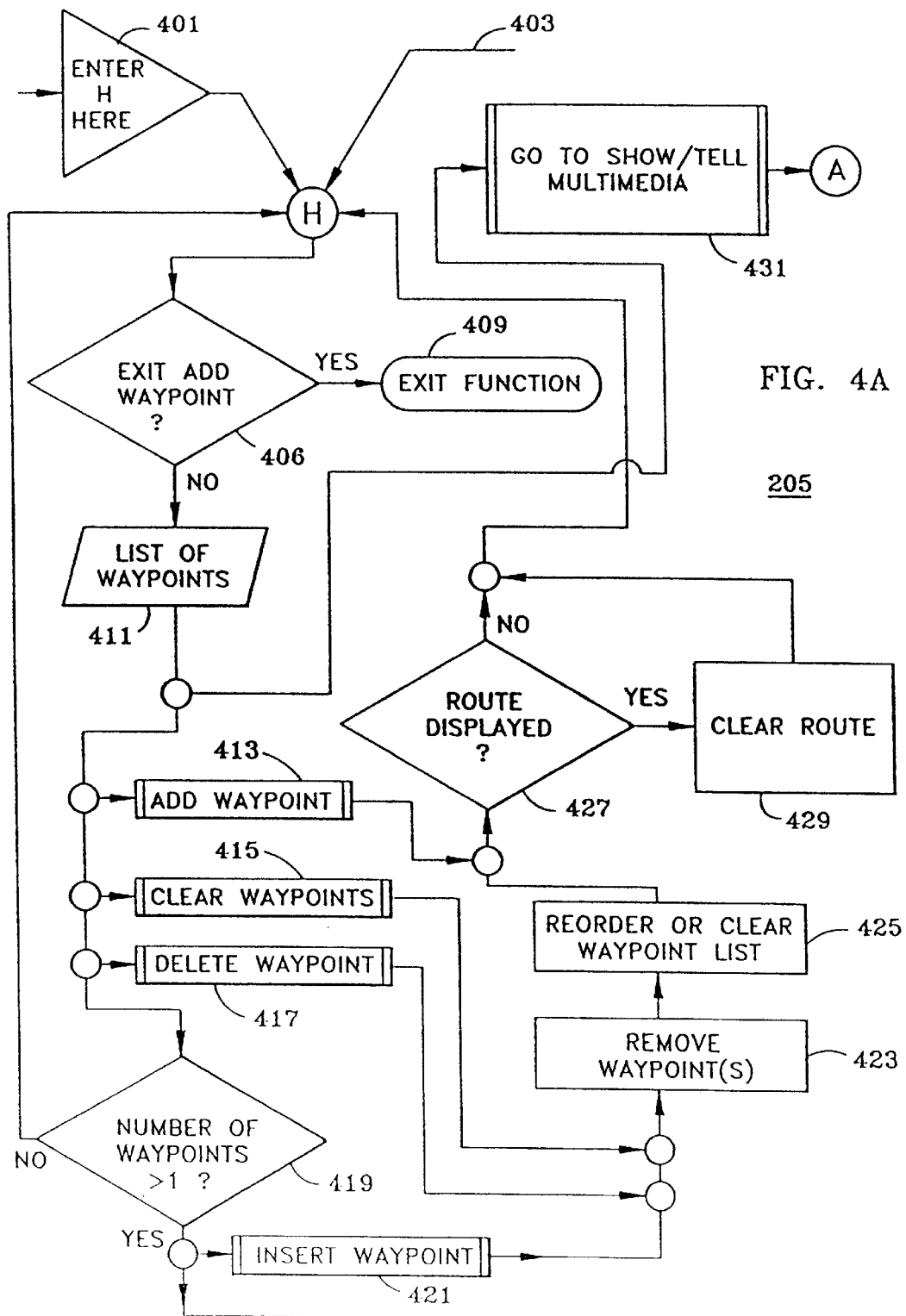
Figure 4B:
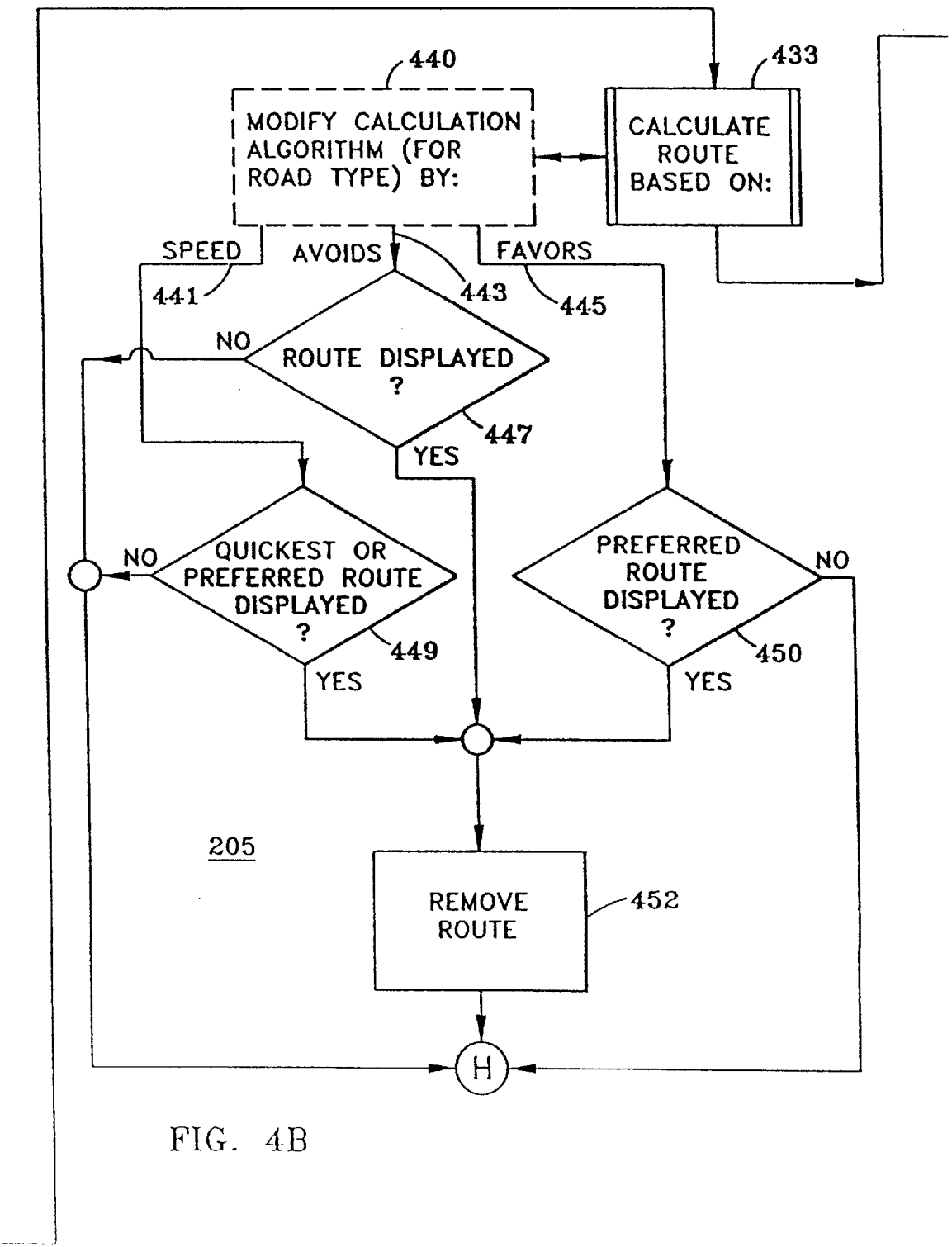
Figure 5:
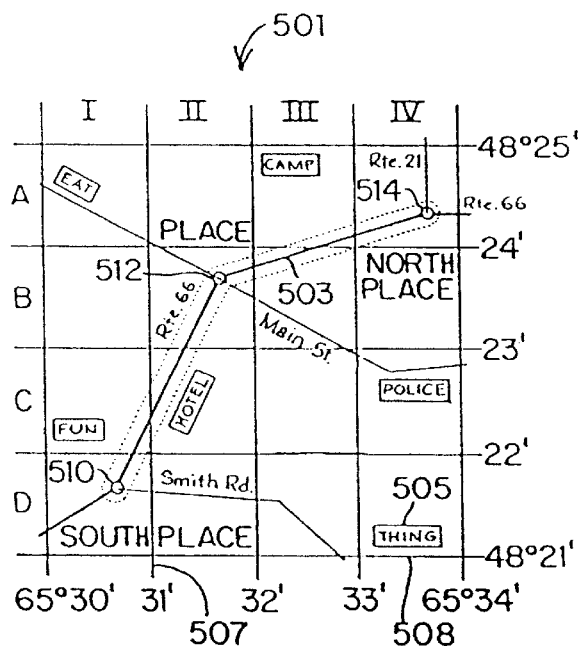
FIG. 5 is an example of a map display presented to the user on a monitor display by IRMIS.

As embodied in DeLorme's SOLUS™ for example and implemented on state-of-the art PDAs or palmtops, the IRMIS invention further enables the user—by means of menus, toolbars, and the like—to select, alter and move between alternate screens, displays or output modes, as described in more detail hereafter particularly relative to FIGS. 1A4 and 1A5.

FIG. 1A1 also shows connection of a portable IRMIS device to a GPS or Global Positioning System peripheral device. DeLorme Publishing Company, Inc., for example, provides GPSTRIPMATE™ and EARTHMATE™ GPS receiver accessories for personal computers that provide data on current position, altitude based on radio signals from a set of satellites. The GPS receivers further provide very exact date/time information and compute information including the direction and rate of travel, time and distance to and from start or finish or intermediate waypoints along a planned travel route or course. Alternative position-sensing devices include loran, other radio location, dead-reckoning, and hybrid systems.

As shown in FIG. 1A1, IRMIS facilitates use of the PDA to display map, route and point information with or without the GPS or equivalent real-time position detection. Illustrated in the foreground at 01 is a 3 COM Palm III™ in hand and capable of use as a digital improvement on conventional paper maps and maps, travel plans and itineraries printed out from computer mapping programs, even without GPS attached. As detailed hereafter, such PDAs or handheld devices provide added functionality when coupled with a GPS receiver, such as DeLorme's EARTHMATE or equivalent. FIG. 1A1, too, also illustrates a Phillips Velo™ "palm-top" at 07 with a small keyboard, connected to an EARTHMATE™ GPS receiver at 08, also implementing the SOLUS embodiment of the IRMIS invention. As detailed hereafter, the addition of GPS provides enhanced capabilities including exact location "marks", GPS logs or "breadcrumbs", real-time information on the current position, speed, elevation, time and distance to destination, as well as user-friendly automated adjustments of display variables on the PDA or handheld—including variables such as map scale, level of detail, additional information about points ahead along the expected direction or route of travel, and so forth. PDAs may also be equipped for communications, as show by the antenna at 09 in FIG. 1A1.

Figure 2:
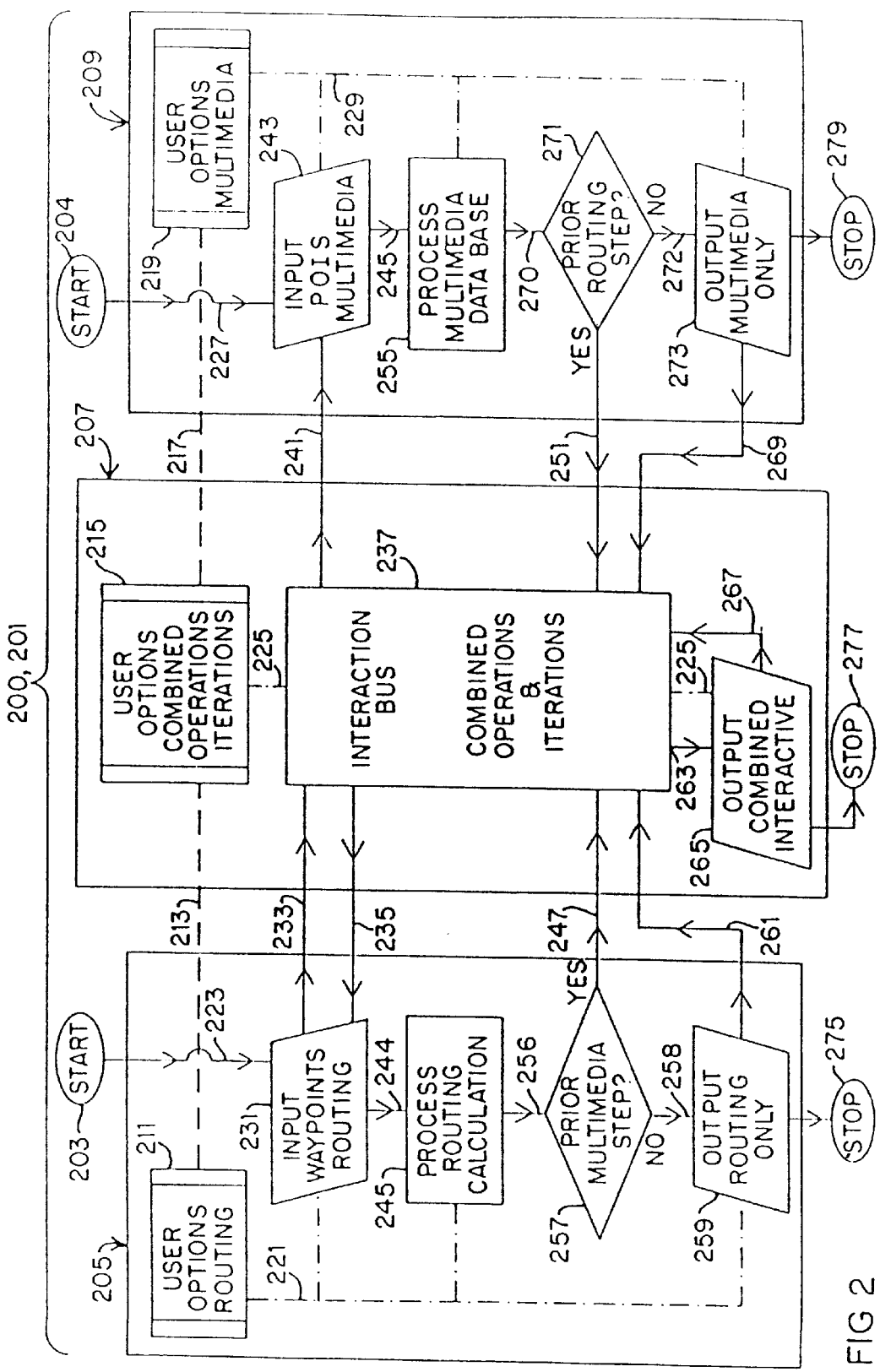
Figure 3:
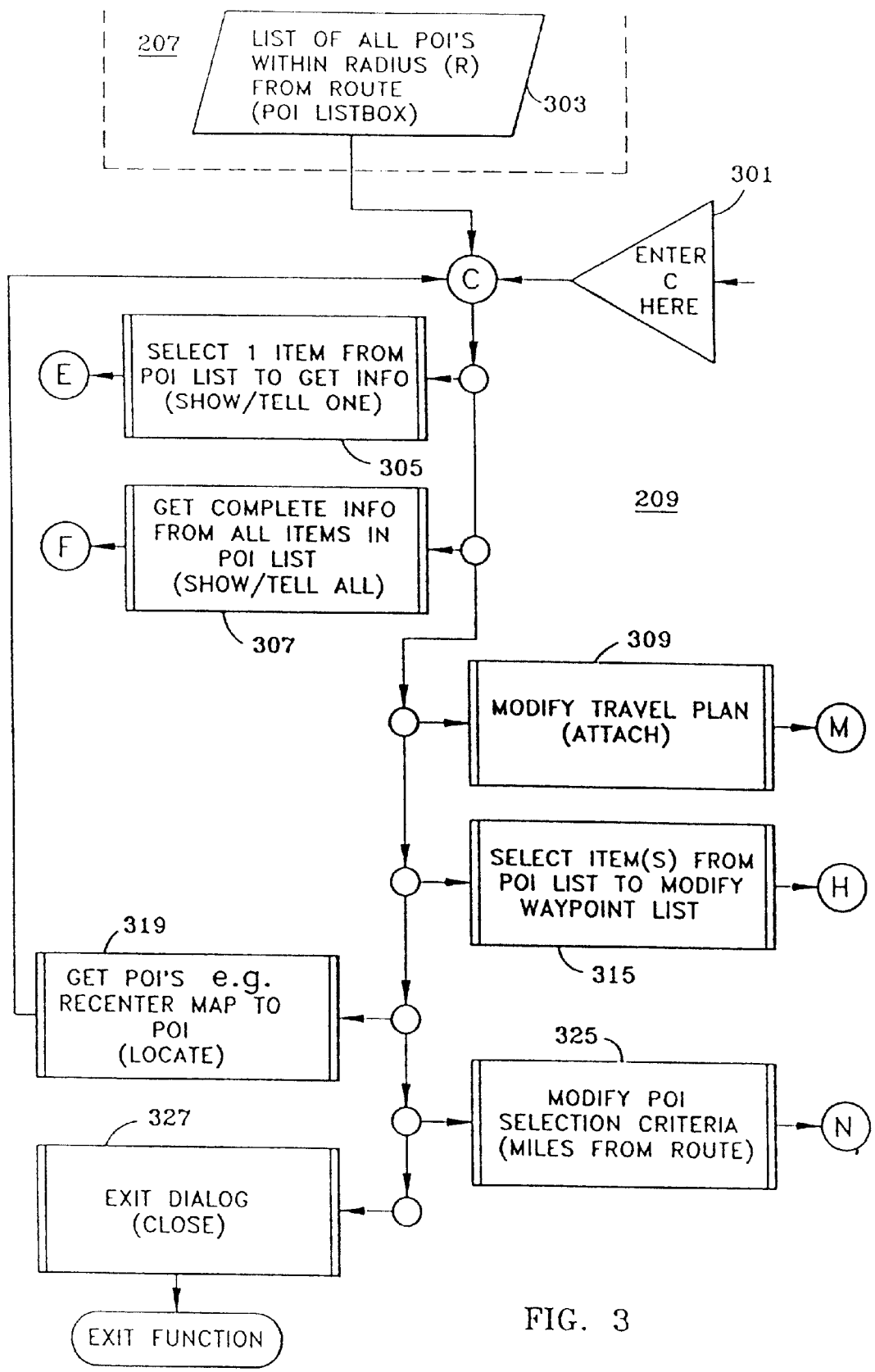

FIGS. 1A2 and 1A3 are derived respectively from FIGS. 3 and 3A from the parent/grandparent U.S. patent application, Ser. No. 08/265,327 titled COMPUTER-AIDED MAP LOCATION SYSTEM (CAMLS) filed Jun. 24, 1994 by inventors David DeLorme and Keith Gray—assigned to DeLorme Publishing Co., Inc., which is also owner of the instant IRMIS application. IRMIS FIGS. 1A2 and 1A3 depict an alternative portable platform at 15 including built-in GPS, a display screen 18 for map information like vector data or routes at 35 and 36. Also displayed are point information at 38 and/or a moving arrow at 32 that indicate current position and travel direction of the user on the map display as detected by the GPS. As shown under the enlarged map screen view in FIG. 1A2, IRMIS portable PDAs or handheld devices can display information on the national edition, regional volume, page number and alpha-numeric map grid indicators—e.g. "US-NE-41-C3" meaning United States map books, Northeast volume, page 41, grid C3. Such information aids the user 12 in locating and interpreting corresponding maps printed on paper in book form. The IRMIS invention can be used in conjunction with map books and/or printouts from map software; however, as described hereafter, IRMIS also provides intelligent digital alternatives to conventional kinds of map, route and/or point information pre-printed or printed-out on paper and other sheet media.

FIG. 1A3 shows a generic feasible IRMIS portable platform with built-in GPS, wireless and hard-wire communication options, tangible supplemental applications and/or data in the form of one or more PCMCIA cards, and a CPU link for connecting to home-base desktop or other computers. Preferred IRMIS portable platforms, shown previously in FIG. 1A1, have a detachable GPS accessory, which is not needed when the PDA or handheld is "docked" in its "cradle" or connected to the home-base desktop for data transfer and/or synchronization. Such IRMIS PDAs can be used in the field without GPS, or used in conjunction with GPS receivers built into a vehicle or other appliance. The alternative IRMIS PDA, shown in FIG. 1A3 has the advantage (plus extra cost) of an integral GPS receiver—for example, avoiding the awkwardness in certain situations of two devices, the PDA and accessory GPS, connected with a cable.

FIG. 1A3 further illustrates a connection or link between the PDA/GPS 15 and another device at 13 such as a digital camera. As described hereafter, the IRMIS invention is adaptable for use in conjunction with other such devices. For example, IRMIS can be used to provide location and/or time/date "stamps" on digital photos, which in turn can be imported and processed by the IRMIS desktop multimedia functionality.

FIG. 1A4 illustrates typical IRMIS PDA screen displays—depicting user controls and IRMIS outputs. At a is "Directions" screen comprising a text list of directions and turning points. The "Directions" screen may be used with or without GPS. In the absence of GPS, this screen provides a substitute or complement for printed travel information such as paper maps or itineraries. With GPS, the "Directions" screen highlights the next turn, and provides graphic representation of the user's progress along the bar at right. GPS also provides real time rather than estimated information on time and distance to next turn in the readouts at the bottom of the "Directions" screen.

As presented herein, a HELP docs or user manual for SOLUS™ Pro 1.0 as provided with DeLorme Topo USA™ by DeLorme Publishing Co. Inc. of Yarmouth, Me., assignee of the present application, provides an aid to the understanding of the PDA representations shown in FIGS. 1A3–1A5. The contents of that manual are presented on the following pages.

Handheld Computer Support

You can send your maps and Route Directions from Topo USA to a handheld computer to take with you as you travel. The same maps and directions that appear in Topo USA will be displayed on your handheld computer in DeLorme's Solus™ Pro.

You can also combine DeLorme's GPS receiver with your handheld computer to monitor your position, heading, speed and elevation as you travel. You can follow your Route Directions as you travel and your handheld computer will beep 60 seconds before your next turn. And the maps ensure that you'll never get lost again.

Safety Warning: Bring a passenger along to serve as GPS operator while you are driving a vehicle. Solus Pro should not be used in automatic navigation or guidance systems of for any purpose requiring precision measurement of distance or direction. See GPS Position Accuracy for additional information.

Solus Pro

Solus™ Pro is a separate application that allows you to integrate features of Topo USA with a handheld computer. You can send your maps and Route Directions from Topo USA to a handheld computer to take with you as you travel. The same maps and directions that appear in Topo USA will be displayed on your handheld computer.

You can also combine DeLorme's GPS receiver with your handheld computer to monitor your position, heading, speed and elevation as you travel. You can follow the map or Route Directions as you travel and your handheld computer will beep 60 seconds before your next turn.

Installing Solus Pro on Your Handheld Computer

During the Topo USA installation, you were asked if you wanted to install the Solus™ Pro application. If you can't remember whether you chose to have Solus Pro installed, choose Start . . . Settings . . . Control Panel . . . Add/Remove Programs to see if Solus Pro is installed on your computer. If the application is not listed, follow the directions below to install Solus Pro.

To Install Solus Pro
1. Insert any Topo USA CD into your CD-ROM drive.
2. Choose Start . . . Run from the task bar, browse to the CD, open the Solus Pro folder found in the Utilities and select either the 3Com Palm Computing or Windows CE folder. Double-click Setup.exe to install Solus Pro to your hard drive. Click OK.
3. Follow the screen directions to complete installation.
4. Transfer the Solus Pro application to your handheld computer according to the protocol outlined in its user's guide.

Sending to a Handheld Computer

You can send your maps and Route Directions from Topo USA to a 3Com®, Palm Computing® or Windows® CE handheld computer to take with you as you travel. The same maps and directions that appear in Topo USA will be displayed on your handheld computer in DeLorme's Solus™ Pro application.

To send a route

1. Be sure that the Solus Pro application is installed on both your desktop computer and your handheld computer.
2. Create your route in Topo USA.
3. Click the Send Route button in the Advanced Routing dialog box.
4. The Send Route dialog box appears.
5. Select the desired options (i.e., current map view, route map and Route Directions) and the type of platform.
6. Click the Preferences . . . button to set your preferences for the individual devices.
7. Click OK.
8. Topo USA creates the appropriate files and displays a message box telling you where they were saved. The default location is C:\DeLorme Mobile Maps.
9. Transfer the files to your handheld computer according to the protocol outlined in its user's guide.
10. When the transfer is complete, open the Solus Pro application on your handheld computer by tapping its icon.

NOTE: You can send the current map view without creating a route. Adjust the map view to the desired location and click the Send Route tool.
NOTE: If you open a previously saved route to send to a handheld computer, you must be using the appropriate CD for the region containing the route.

Solus Pro Help in a Palm Computing Organizer

After you've installed Solus™ Pro to your 3Com® Palm Computing®, organizer, you can access the Solus Pro Help to learn how to use the program.

To Open Help
1. Tap the Solus icon to open the program.
2. Tap the Menu button. The Solus Pro menus appear at the top of the screen.
3. Tap the Tools menu and then tap the Help option. A Help topic specific to the current mode appears.

Viewing the Route Directions in Your Palm Computing Organizer

Downloaded to a Palm Computing® organizer, you can take your Topo USA maps and Route Directions with you when you travel. Your entire route is spelled out in the palm of your hand with DeLorme's Solus™ Pro.

To View Your Route Directions
1. After you have sent your route to the Palm Computing organizer, turn it on and tap the Applications button on the screen to access the application picker.
2. Tap the Solus icon to open the application.
3. Tap the Menu button. The Solus Pro menus appear at the top of the screen.
4. Tap the Tools menu and then tap the Select Route option.
5. Tap the desired route to select it and then tap OK.
6. The Directions mode displays the Route Directions that you created in Topo USA.

The Directions include your Start, the road name and type for each leg of your journey, the cumulative elapsed time and distance after each leg, the general heading for each leg, any Stops you have added, and your Finish. Tap the scrollbar arrows on the right to move up and down through the Directions or use the organizer's scroll buttons.

Symbols appear along the left side of the Directions. Solid circles represent your Start, Stops and Finish. A dotted single line indicates a local road or ferry; a solid double line indicates a US highway or interstate; a single solid, thick line indicates a state route or major connector; a single solid, thin line indicates a forest road; and a solid double line with a dollar sign indicates a toll road.

When tracking with a GPS receiver, Solus Pro highlights the next leg in your Directions list and beeps 60 seconds before your next turn or route change. Use the arrows in the output boxes to select from a variety of options that you can display in the Directions mode while tracking (average speed, battery voltage, bearing, course, distance to Finish, etc.).

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

Viewing Maps in Your Palm Computing Organizer

Downloaded to a Palm Computing® organizer, you can take your Topo USA maps and Route Directions with you when you travel. Your entire route is spelled out in the palm of your hand with DeLorme's Solus™ Pro.

To View Your Map
1. After you have sent your route to the Palm Computing organizer, turn it on and tap the Applications button on the screen to access the application picker.
2. Tap the Solus icon to open the application.
3. Tap the Menu button. The Solus Pro menus appear at the top of the screen.
4. Tap the Tools menu and then tap the Select Map option.
5. Tap the desired map to select it and then tap OK
6. The Map mode displays the map that you created in Topo USA. Tap the map to pan around.

There are two types of maps that you can send from Topo USA—map views and route maps.

The map view is a black-and-white map of what was displayed in Topo USA on your desktop computer's screen. The rectangle on the map represents your map view and contains greater detail than the outlying map area. When centered within the rectangle, you can use the organizer's scroll buttons to zoom in and out for greater or lesser detail. Tap the map to pan in different directions.

The route map provides a bird's-eye overview of your route from your Start to your Finish. On the map, you'll notice two rectangles—one around the area of your Start and one around the area of your Finish. These rectangles provide street-level detail. When the map is centered within either of these rectangles, you can use the organizer's scroll buttons to zoom in and out for greater or lesser detail. You cannot zoom outside of the rectangles.

When connected to a GPS receiver, your position appears as a gray crosshair on the map and updates as you travel. When your position is within either of the rectangles, use the organizer's scroll buttons to zoom in for greater detail. When your position reaches the edge of a rectangle, use the organizer's scroll buttons to zoom out. The black dot within the crosshair indicates the direction of your current heading. Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

Configuring Solus Pro in a Palm Computing Organizer

Solus™ Pro allows you to select the information displayed in the output boxes in the Directions, Navigate and Position modes. Tap the arrows in each box and select the desired option (described below).

Average Speed—when tracking, displays your average speed

Battery Voltage—displays the current voltage of your organizer's batteries

Bearing—when tracking, displays the direction of travel between your next waypoint and your current position, relative to true North Course—when tracking, displays the direction of travel between your next waypoint and the previous waypoint, relative to true North Date—when connected to DeLorme's GPS receiver, displays the current date Dist to Finish—when tracking, displays the distance from your current position to your Finish Dist to Next Turn—when tracking, displays the distance from your current position to your next turn or route change Elevation—when tracking, displays your current elevation (Due to Selective Availability, this can vary as much as 512 feet (156 meters); however, 95 percent of the time you can generally expect much greater accuracy.)

Heading—when tracking, displays your current direction of travel, relative to true North Maximum Speed—when tracking, displays your maximum speed PDOP—when tracking, displays the Position Dilution of Precision, the effect of the combined errors of latitude, longitude and elevation in determining a position Speed—when tracking, displays your speed as you travel Time—when connected to DeLorme's GPS receiver, displays the Greenwich Mean Time Time to Finish—when tracking, displays the time from your current position to your Finish Time to Next Turn—when tracking, displays the time from your current position to your next turn or route change Tripometer—when tracking, displays the mileage traveled (Select Tools . . . Preferences . . . Reset Tripometer to reset the value to zero.)

Choose Tools . . . Preferences . . . from the Solus Pro menu to access the Preferences mode. You can choose which mode to display when the program starts, whether or not you want Solus Pro to beep 60 seconds before your next turn and whether or not you want Solus Pro to log your trip as you travel. You can also reset the Tripometer and clear the Log file.

Initializing DeLorme's GPS Receiver with a Palm Computing Organizer

Connected to DeLorme's GPS receiver, you can use your Palm Computing® organizer to monitor your position, heading, speed and elevation as you travel. Follow along on the map or with the Route Directions as you travel and Solus® Pro will beep 60 seconds before your next turn.

To initialize DeLorme's GPS receiver:

1. Connect your organizer to DeLorme's GPS receiver with DeLorme's Palm Computing adapter cable (available separately from DeLorme).
2. After you have sent your route to the handheld, turn on your organizer and tap the Applications button on the screen to access the application picker.
3. Tap the Solus icon to open the application.
4. Tap the Menu button. The Solus Pro menus appear at the top of the screen.
5. Tap the Mode menu option and then tap Initialize to access the Initialization mode.
6. Tap the Device drop-down list and use the up and down arrows to select your GPS receiver.
7. Tap the State drop-down list and use the up and down arrows to select your current location. You can also use the organizer's scroll buttons to move through the state list.

NOTE: After the first initialization, the State drop-down list defaults to Last (representing your last location or fix). If you are within the same vicinity as your last fixed position, you should use the Last option to speed up the initialization process. If you have a map loaded in Solus, you can select the Map Center option to use the map's center coordinates to initialize.

8. A stream of data at the bottom indicates that you are receiving satellite information. The symbol in the upper right corner indicates your GPS status. A circle with a line through it means that DeLorme's GPS receiver has not been detected or you are not receiving enough information to determine a fix. The transmitting symbol indicates that DeLorme's GPS receiver is acquiring satellite information, but is not yet receiving sufficient satellite data to determine your position. This message is displayed while DeLorme's GPS receiver is acquiring satellite data and can take several minutes. "2-D" indicates that you are receiving data, but it is not sufficient to determine your elevation. "3-D" indicates that you are receiving ample data and have a good fix.
9. Tap the DST option if daylight saving time is currently in effect where you are. The second line displays the offset for your time zone from the Greenwich Mean Time.
10. A stream of data at the bottom of the screen indicates that you are receiving signals from satellites.
11. When the status is "3-D", tap the OK button to close out of the Initialization mode.
12. Tap the Menu button on your organizer. The Solus Pro menus appear at the top of the screen.
13. Tap the Mode menu option and select which mode (i.e., Directions, Position, Navigate or Map) you want to view.
14. When you want to stop tracking, tap the Stop button in the Position mode (this will help save your organizer's batteries). A solid circle in the upper right corner indicates that you are not tracking. You can tap the Start button in the Position mode to resume tracking.

NOTE: In order to conserve batteries, be sure to disconnect the adapter cable when not using DeLorme's GPS receiver with your organizer.

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

Tracking with a Palm Computing Organizer

Combining your Palm Computing® organizer with DeLorme's GPS receiver gives you dynamic maps and Route Directions that you can follow as you travel. As you progress from your Start to Finish, your position is indicated on the map and the next road you'll be traveling is highlighted in the Directions list. In addition, Solus™ Pro displays your next route change and indicates how far away it is in distance and time—your organizer will even beep 60 seconds before your next turn.

To track:

1. Connect your organizer to DeLorme's GPS receiver with DeLorme's Palm Computing adapter cable (available separately from DeLorme).
2. After you have sent your route to the organizer, turn it on and tap the Applications button on the screen to access the application picker.
3. Tap the Solus icon to open the application.
4. Tap the Menu button. The Solus Pro menus appear at the top of the screen.
5. Tap the Mode menu and then tap the Initialize option to initialize DeLorme's GPS receiver
6. If you want to track using your Route Directions, tap the Directions menu option to view the route that you created in Topo USA. As you travel, Solus Pro highlights the next road you will use and beeps 60 seconds before your next route change.
   The Directions include your Start, the road name and type for each leg of your journey, the cumulative elapsed time and distance after each leg, the general heading for each leg, any Stops you have added, and your Finish. Tap the scrollbar arrows on the right to move up and down through the Directions or use the organizer's scroll buttons. Symbols appear along the left side of the Directions. Solid circles represent your Start, Stops and Finish. A dotted single line indicates a local road or ferry, a solid double line indicates a US highway or interstate, a single solid, thick line indicates a state route or major connector, a single solid, thin line indicates a forest road, and a solid double line with a dollar sign indicates a toll road.
   Your GPS status is displayed in the upper right corner. A circle with a line through it means that DeLorme's GPS receiver has not been detected or you are not receiving enough information to determine a fix. The transmitting symbol indicates that DeLorme's GPS receiver is acquiring satellite information, but is not yet receiving sufficient satellite data to determine your position. This message is displayed while DeLorme's GPS receiver is acquiring satellite data and can take several minutes. "2-D" indicates that you are receiving data, but it is not sufficient to determine your elevation. "3-D" indicates that you are receiving ample data and have a good fix.
7. You can also track in the Navigate mode. Tap the Navigate menu option to view your current route status. The instructions for your next route change appear at the top of the screen and update as you travel. Use the arrows in the output boxes to select from a variety of options that you can display in the Navigate screen.
8. Tap the Map menu option to view your current position on the map.

NOTE: In order to conserve batteries, be sure to disconnect the adapter cable when not using DeLorme's GPS receiver with your organizer.

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

Logging with a Palm Computing Organizer

While tracking in Solus™ Pro, you can log your travels and then HotSync™ them to Topo USA to play back on topographical maps.

To Log a Route

1. Connect your organizer to DeLorme's GPS receiver with DeLorme's Palm Computing adapter cable (available separately from DeLorme).
2. Turn on the organizer and tap the Applications button on the screen to access the application picker.
3. Tap the Solus icon to open the application.
4. Tap the Menu button. The Solus Pro menus appear at the top of the screen.
5. Tap the Initialize menu option and initialize your GPS receiver.
6. Tap the Menu button and select Tools . . . Preferences to open the Preferences window.
7. Tap the Logging option and then select the desired length of time you want to track from the drop-down list. The approximate amount of memory required is indicated beside each time option. Tap the Clear Log button to clear any previous logs.
8. Tap the OK button.

Using Marks in a Palm Computing Organizer

While tracking, SOLUS™ Pro lets you add Marks to indicate specific places along your route. These Marks can then be HotSynced to Topo USA to indicate their locations on topographical maps.

To Add a Mark

1. Connect your organizer to DeLorme's GPS receiver with DeLorme's Palm Computing adapter cable (available separately from DeLorme).
2. Turn on the organizer and tap the Applications button on the screen to access the application picker.
3. Tap the Solus icon to open the application.
4. Tap the Menu button. The Solus Pro menus appear at the top of the screen.
5. Tap the Initialize menu option and initialize your GPS receiver.
6. Solus Pro switches to the Position mode.
7. When you are at the desired spot, tap the Mark button. The Mark List opens and your position is added as a new Mark. The latitude/longitude of the Mark is displayed. You can change the name of the Mark in the text field. Tap the New button to add a new Mark. Select a Mark and tap the Delete button to delete the selected item.
8. Tap the OK button when you are done adding Marks.

Solus Pro Help in a Windows CE Device

After you've installed SOLUS™ Pro to your Windows® CE handheld computer, you can access the Solus Pro Help to learn how to use the program.

To Open Help

1. Tap the Solus Pro icon on the desktop to open the program.
2. Tap the Help icon (question mark) in the upper right corner of the title bar.
3. Tap a topic to open it.

You can press ALT+H on your keyboard to access the Solus Pro Help at any time.

Viewing Your Route Directions in a Windows CE Device

Downloaded to a Windows® CE device, you can take your Topo USA Directions with you when you travel. Your entire route is spelled out in the palm of your hand with Solus™ Pro.

To View Your Route Directions:

1. After you have sent your route to the H/PC, tap the Solus Pro icon on the desktop to open the program.
2. Tap the Route Directions tool on the command bar. The Route Directions dialog box appears on the screen.
3. Tap the Select button to select the desired route (that you calculated in Topo USA and downloaded). Solus Pro route files for Windows CE have .ITN extensions and are saved in the DeLorme folder by default.

The Directions include your Start, the road name and type for each leg of your journey, the distance of each leg, the cumulative elapsed time and distance, the general heading for each leg, any Stops you have added, and your Finish. Tap the scrollbar arrows on the right to move up and down through the Directions.

Symbols appear along the left side of the Directions. Solid circles represent your Start, Stops and Finish. A dotted, single line indicates a local road or ferry, a solid double line indicates a US highway or interstate, a single solid, thick line indicates a state route or major connector, a single solid, thin line indicates a forest road, and a solid double line with a dollar sign indicates a toll road.

Select the Track Directions option to follow along in the Directions as you travel.

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

Viewing Maps in a Windows CE Device

Downloaded to a Windows® CE device, you can take your Topo USA maps and Route Directions with you when you travel. Your entire route is spelled out in the palm of your hand with DeLorme's Solus™ Pro.

To View a Map

1. After you have sent your maps to the H/PC, tap the Solus Pro icon on the desktop to open the program.
2. Tap the Map tool and select the desired map. Solus Pro map files have .RI extensions and are saved in the DeLorme folder by default.
3. The map appears in the main window.
4. The latitude and longitude of the map's center are displayed on the command bar, along with the magnitude of the map.

There are two types of maps that you can send from Topo USA—map views and route maps.

The map view is a black-and-white map of what was displayed in Topo USA on your desktop computer's screen. The rectangle on the map represents your map view and contains greater detail than the outlying map area. Press ALT+PAGE DOWN/PAGE UP respectively to zoom in and out for greater or lesser detail. Tap the map (or use the arrow keys) to pan/recenter to different areas.

The route map provides a bird's-eye overview of your route from your Start to your Finish. On the map, you'll notice two rectangles—one around the area of your Start and one around the area of your Finish. These rectangles provide street-level detail. Press ALT+PAGE DOWN/PAGE UP to zoom in and out for greater or lesser detail.

When connected to a GPS receiver, your current position appears as a white arrow on the map as you travel and your GPS status appears on the right of the command bar. When your position is within either of the rectangles, Solus Pro automatically zooms in for greater detail. When your position reaches the edge of a rectangle, Solus Pro zooms out.

Press the X key to recenter the map on your current position. Press the K key on your keyboard to add a Mark at the map center. See Solus Pro Shortcuts for additional shortcuts and functions.

Initializing DeLorme's GPS Receiver with a Windows® CE Device

Connected to DeLorme's GPS receiver, you can use your Windows® CE device (H/PC) to monitor your position, heading, speed and elevation as you travel. You can also follow along on a map or with the Route Directions as you travel and Solus™ Pro will beep 60 seconds before your next turn.

---

To Initialize:

1. Connect your H/PC to DeLorme's GPS receiver with DeLorme's Windows CE adapter cable (available separately from DeLorme).
2. After you have sent your route to the H/PC, tap the Solus Pro icon on the desktop to open the program.
3. Tap the GPS button and select Initialize . . . to access the Initialize GPS dialog box.

-continued

To Initialize:

4. Tap the State drop-down list and use the up and down arrows to select your current location. For the first initialization of your receiver, select the state/province where you are located from the State drop-down list. The latitude and longitude are automatically entered. After your first initialization, the State drop-down list defaults to Last Location and indicates the latitude and longitude of your last fixed position. Unless your position has changed more than a few miles, you should use Last Location in order to decrease the amount of time it takes for your receiver to acquire a fix on your position.
   If the area in which you are located is not listed or if you need more precise coordinates, enter the exact latitude and longitude of your location in the appropriate text boxes. Knowing your initial coordinates decreases the amount of time it takes for your receiver to acquire a fix on your position. If you have a map downloaded, you
   can use its coordinates to initialize. After selecting the desired map, select the Map Center option from the State drop-down list.
5. From the Device drop-down list, select the type of GPS receiver you are using. If your device is not listed, select NMEA183. (Use the keyboard arrow keys to scroll through the options.)
6. From the Port drop-down list, select the communications port that you are using to attach the GPS receiver to your computer (see your computer manual for further information).
7. The GPS Status box on the right indicates whether or not you are receiving satellite information. "No Fix" means that the GPS receiver
   has not been detected or you are not receiving enough information to determine a fix. "Acquiring Satellites" indicates that the GPS receiver is acquiring satellite information, but is not yet receiving sufficient satellite data to determine your position. This message is displayed while the receiver is acquiring satellite data and can take several minutes. "2-D Nav" indicates that you are receiving data, but it is not sufficient to determine your elevation. "3-D Nav" indicates that you are receiving ample data and have a good fix.
8. A stream of data in the center of the screen indicates that you are receiving signals from satellites.
9. Select the Log option if you want to log your GPS route as you track.
10. Use the slider to change the GPS log rate (2–10 seconds). This determines the rate at which the satellite information is updated in the program.
11. Tap the OK button to close out of the Initialize GPS dialog box.

NOTE: In order to conserve batteries, be sure to disconnect the adapter cable when not using DeLorme's GPS receiver with your H/PC.

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

Tracking with a Window CE Device

Combining your Windows® CE device (H/PC) with DeLorme's GPS receiver gives you dynamic Directions that you can follow as you travel. The next road you'll be traveling is highlighted on the screen as you progress from your Start to Finish. In addition, Solus Pro displays your next route change and indicates how far away it is in distance and time—your H/PC will even beep 60 seconds before your next turn. Add a map and you're ensured of always knowing where you are and where you're going.

---

To track:

1. Connect your H/PC to DeLorme's GPS receiver with DeLorme's Windows CE adapter cable (available separately from DeLorme).
2. After you have sent your route to the H/PC, tap the Solus Pro icon on the desktop to open the program.

-continued

To track:

3. Tap the Connect tool on the command bar or choose GPS . . . Connect . . . to begin communication between Solus Pro and your GPS receiver. A message appears at the top of the screen indicating the status of your GPS connection. "Connecting" indicates that Solus Pro is attempting to communicate with the GPS receiver. "Acquiring Satellites" indicates that the GPS receiver is acquiring satellite information, but is not yet receiving sufficient satellite data to determine your position. This message is displayed while the receiver is acquiring satellite data and can take several minutes. "2-D Nav" indicates that you are receiving data, but it is not sufficient to determine your elevation. "3-D Nav" indicates that you are receiving ample data and have a good fix.
4. After achieving 3-D Nav status, you have three tracking options: if you want to track using your Directions, tap the Route Directions tool to view the Directions that you calculated in Topo USA. As you travel, Solus Pro highlights the next road you will use and beeps 60 seconds before your next route change. If you want to track using a map, tap the Map tool to view the map that you created in Topo USA. Your position is indicated on the map by crosshair as you travel. You can also track in the Navigate mode. Tap the Navigate tool to view your current route status. The instructions for your next route change appear at the bottom of the screen and update as you travel. The time and distance to your Finish appear above.
5. Choose GPS . . . Disconnect to stop displaying your route on the screen.

NOTE: In order to conserve batteries, be sure to disconnect the adapter cable when not using DeLorme's GPS receiver with your H/PC 

Safety Warning: Bring a passenger along to serve as GPS operator while you are driving a vehicle. Solus Pro should not be used in automatic navigation or guidance systems or for any purpose requiring precision measurement of distance or direction. See GPS Position Accuracy for additional information.

Monitoring Your GPS Status in a Windows CE Device

Solus™ Pro lets you monitor the status of the satellites in the sky as you are receiving data, To Monitor the Satellite Status 1. Tap the solu Pro icon on the desktop to open the program.
2. Tap the Satellites tool on the command bar.
3. The Monitor Satellite Status dialog appears listing the satellites that are currently visible in the sky.
4. As the GPS receiver acquires data from the satellites, information appears in the columns. Each satellite's ID number, elevation, azimuth and sound-to-noise ratio are displayed on the left. The right window displays the GPS receiver's channels, the corresponding satllite ID and the status of the signal. "T" indicates the number of satellites in the receiver's track or view of the sky, "E" indictes the acquisition of ephemeris data and "N" indicates the number of satellites being used by your receiver for navigation.
5. The GPS Status box on thee right indicates whether or not you are receiving satellite information. "No Fix" means that the GPS receiver has not been detected or you are not receiving enough information to determine a fix. "Acquiring Satellites" indicates that the GPS receiver is acquiring satellite information, but is not yet receiving sufficient satellite data to determine your position. This message is displayed while the receiver is acquiring satellite data and can take several minutes. "2D Nav" indicates that you are receiving data, but it is not sufficient to determine your elevation. "3-D Nav" indicates that you are receiving ample data and have a good fix.
6. Use the slider to change the update rate of the satellite status display.

Tap the Sky View button to open thee Satellite sky View dialog box to see the current positions of the satellites.
Monitoring Your GPS Position in a Windows CE Device Connected to DeLorme's GPS receiver, you can use your Windows® CE device (H/PC) to monitor your position, heading, speed and elevation as you travel.

To Monitor Your Position

1. Tap the Solus Pro icon on the desktop to open the program.
2. Tap the Position tool to open the Position dialog box.
3. Your current latitude/longitude, the time an date, your current heading, the GPS status, and your current speed are displayed.
4. Tap the Close button to close the Position dialog box.

Satellite Sky View in a Windows CE Device

When tracking with a GPS receiver, you can monitor thee positions of the satellite.

To Monitor the Sky View

1. Tap the Solus Pro icon on the desktop to open program.
2. Tap the Sky View tool. The sky view diagram indicates the locations of visible satellites in the sky relative to your current position. White symbols show the satellites' positions in the sky.

A black symbol indicates that your GPS receiver is tracking the satellite, ephemeris data is available an the satellite is being used for navigation. When using DeLorme's GPS receiver, a gray symbol indictes that your GPS receiver is tracking the satellite and ephemeris data is available, but the satellite is not being used for navigation. Two pound symbols indicate that your GPS receiver is tracking the satellite, but it is not receiving data from it.
3. The GPS Status box on the right indicates whether or not you are receiving satellite information. "No Fix" means that the GPS receiver has not been detected or you are not receiving enough information to determine a fix. "Acquiring Satellites" indicates that the GPS receiver is acquiring satellite information, but is not yet receiving sufficient satellite data to determine your position. This message is displayed while the receiver is acquiring satellite data and can take several minutes. "2-D Nav" indicates that you are receiving data, but it is not sufficient to determine your elevation. "3-D Nav" indicates that you are receiving ample data and have a good fix.
4. Tap Close to exit from the dialog box and continue tracking.

Logging in a Windows CE Device

Once you begin tracking with your GPS receiver, Solus™ Pro automatically logs your route as you travel. When you stop tracking, Solus Pro prompts you for a filename and path in which to save this information. Log files have .gpl extensions and are saved to the DeLorme directory by default.

Choose GPS . . . Disconnect to discontinue tracking and logging your route.

Using Marks in a Windows CE Device

As you are tracking, Solus™ Pro lets you indicate specific positions on you maps by using Marks.

To Add a Mark

1. Connect your GPS receiver, open Solus Pro and begin tracking.
2. Tap the Map tool and select the desired map.

3. When at the desired location, press the K key on your keyboard to place a Mark on the map.

To Manage Marks

1. Tap the Marks tool to open the Marks dialog box.
2. Your current Marks are displayed in the list box along with the latitude/longitude of each.
3. Tap a mark to select it.
   Tap it again to rename it.
   Tap the Go To button to find the selected Mark on the map.
   Tap the Delete button to delete the selected mark from the marks list and the map.
4. Tap OK to close the Marks dialog box.

Solus Pro Shortcuts in Windows CE

When in the Map mode you can access other dialog boxes by clicking the appropriate tools or through the following keyboard shortcuts.

Arrow Keys

Pan the map in the corresponding direction (i.e., up, down, left and right)
ALT+PG UP Zooms out from the map
ALT+PG DN Zooms In on the map
K key When tracking, adds a Mark at the map center
X key When tracking, recanters the map on your current position
ALT+H Opens the Help system
CTRL+K Opens Marks dialog box
CRTL+L Opens Locate dialog box
CTRL+N Opens Navigate dialog box
CTRL+P Opens the Position dialog box
CTRL+R Opens the Route directions dialog box
CTRL+S Opens the Monitor Satellite Status dialog box
CTRL+V Opens the Sky View dialog box
When in any mode other than the map mode, you can access the map by pressing ALT+M.

As described above, the user can re-configure screens on the PDA. For example, in FIG. 1A4(a), "Time to Next Turn" and "Distance to Next Turn" as shown, may be replaced with "Speed" and PDA "Battery Voltage." Other PDA screens may also be re-configured. FIG. 1A4(b) shows the "Navigate" screen, used with GPS, and showing text directions to the next turn above one configuration of time and distance read-outs. The "Position" screen shown in FIG. 1A4(c) gives the PDA/GPS user's current latitude and longitude—along with a selection of information such as speed and election derived from the GPS; the user can "mark" or record the geographic coordinates of his/her current location at the bottom of the "Position" PDA screen. "Mode" and "Tools" shown in FIG. 1A4(d) enable to user to navigate, or page, among the PDA screens. The "Mark List" screen shown in FIG. 1A4(e) allows the user to page through and annotate "marks" which are records of particular location lat/longs. "Mark List" entries can relate to another device, such as a digital camera e.g. for purposes of recording and stamping the date, time and exact lat/long at which one or more digital photos are taken. As shown in FIG. 1A4(f), the "initialize" PDA screen facilitates setup of the gps—receiving, processing and recovery of GPS satellite signals.

Figure 5A:
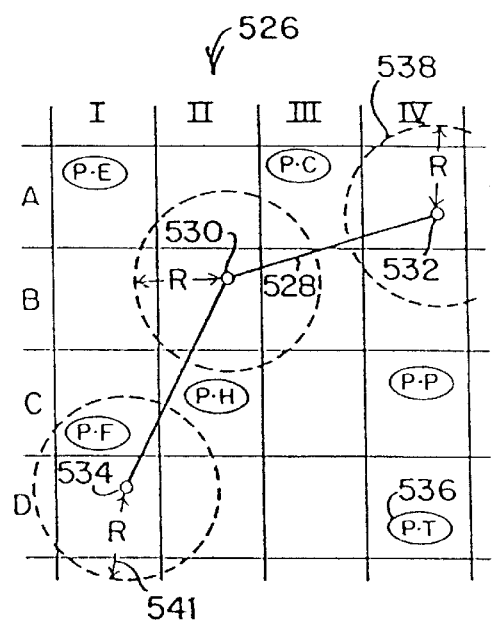
FIGS. 5A, 5B and 5C are simplified screen displays showing alternative strategies and methodologies for circumscribing points of interest within respective defined areas of a selected travel route.
Figure 5B:
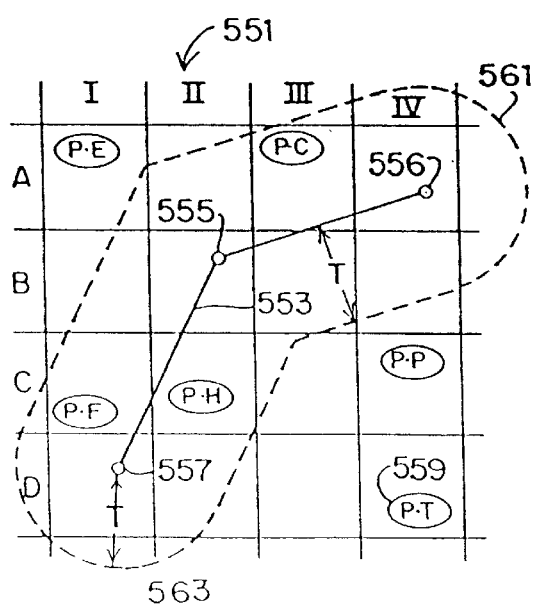
Figure 5C:
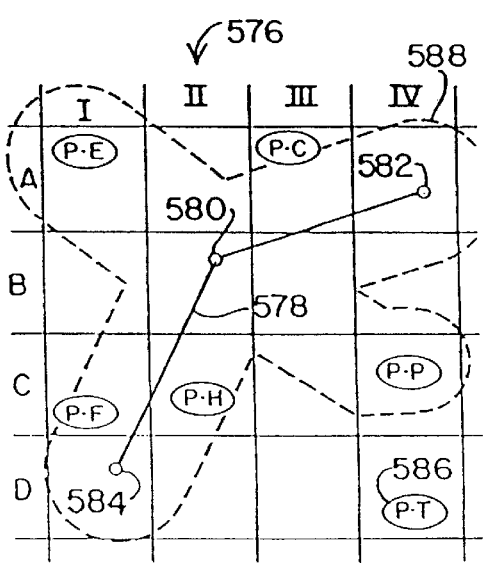
Figure 5D:
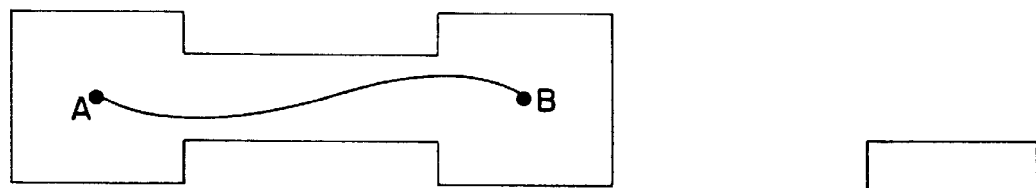
FIGS. 5D, 5E and 5F illustrate configurations for cutting or extracting map/route/point information, prepared by the user on the IRMIS desktop, for downloading to PDA/GPS.

As shown in FIG. 1A5(a), the "Preferences" PDA screen facilitates user adjustments including start mode, route warning (e.g., audio "beep" one minute before next turn), and logging, or laying down "breadcrumbs" with the GPS (i.e., recording a series of positions, or geographic coordinates, at selected or pre-set time/distance intervals along a route or path actually traveled). Map screens of three different scales or magnitudes are shown in FIGS. 1A5(b)–1A5(d). The IRMIS invention is preferably implemented so that maps and related digital information, utilized in the PDA, comprises plural map scales or magnitudes and levels of detail. For example, as shown in FIG. 1A5(b) the PDA displays a map of a geographic area on the order of 50–100 miles square encompassing a planned route of travel. FIG. 1A5(d) displays a map scale of 1–3 miles square or a closer view of one route destination. Much greater detail of an exit, turn, waypoint, POI and/or destination is shown in FIG. 1A5(c) on the order of a map screen showing an area of 0.10 to 0.75 square miles. Further details of how IRMIS displays map, route and point information at multiple scales on PDAs, and how IRMIS maps are selected by the user, and automatically extracted or cut, at plural scales, around user selected points or routes, appears hereafter—with particular reference to FIGS. 5D, E, and F.

The user can pan or move laterally within a map scale and/or magnitude on the PDA display, for example, by touching the screen that re-centers on the geographic point touched by the PDA user. The PDA user can also or additionally zoom or change map scales, or magnitudes, to a more distant or a closer view—for example, using the "page-up/page-down" buttons provided on the PDA. With GPS, the map display is further programmed to scroll or pan over the map in order to follow the moving cursor or other symbol that represent the user's current position, heading, and/or speed of travel. Alternatively, the map display is programmed to shift or move under a fixed cross-hair in order to track a user's current position as detected by the GPS. More capabilities for the GPS to provide controls or contingencies which modify the PDA output of display of map, route, and/or point information are disclosed hereafter—particularly relative to FIG. 9.

FIGS. 1B–1P

Figure 1P:
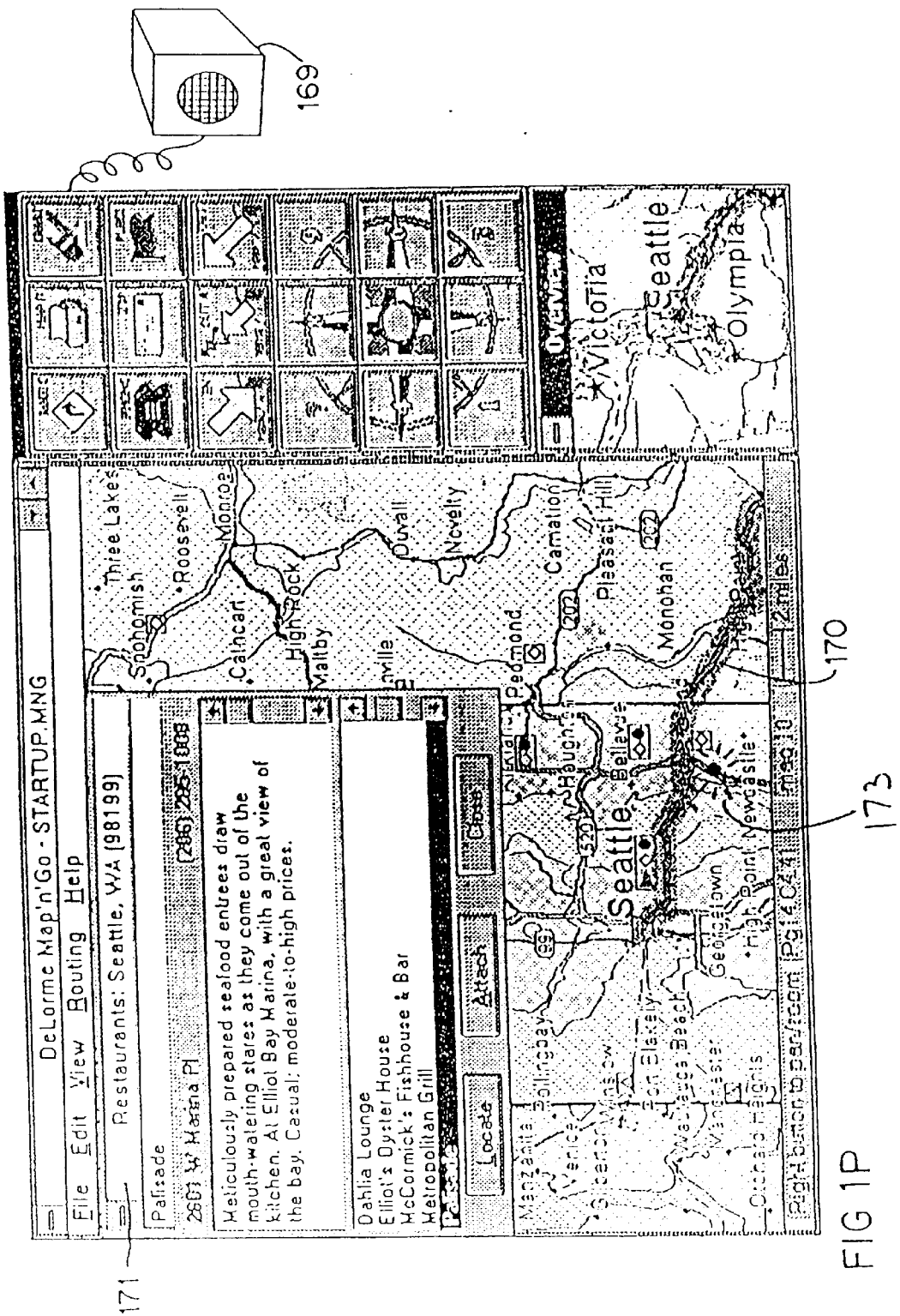

FIGS. 1B through 1P are screen captures from MAP'N'GO (TM) 0.1 by DeLorme Mapping, Freeport, Me. 04032. MAP'N'GO 1.0 includes an auto road atlas of North America both on CD-ROM and printed in a companion paper map book. The MAP'N'GO 1.0 CD-ROM contains a travel planning software utility embodiment of the present IRMIS invention. This utility enables users to generate digital or hardcopy travel plans from routing operations and selected audio, text and pictorial information on hotels, restaurants, campgrounds and tourist attractions.

FIG. 1B reveals the basic user interface, including a map display, and diverse user options for manipulating the electronic maps. Three buttons with diagonal arrows in a row at 130 enable the user to zoom in or out among map scales. Nine buttons in the form of a compass rose at 131 cause the electronic map display to shift or pan to center on a new latitude and longitude. At 134, an overview screen shows the area depicted on the main map in a rectangle in relation to surrounding geography. Mouse clicks in the rectangle further enable the user to shift or pan the center of the map to a different location on the earth's surface. Page numbers and grid identifiers are indicated at 132 for coordinated use of companion paper maps. At 133, the main map scale is shown in terms of "mag" or "magnitude" such that mag 10 offers a closer typically more detailed view than mag 8 or 6, which each present increasingly distant perspectives of larger parts of the earth's surface.

FIG. 1C also reveals the basic user interface, including a higher magnitude or closer scale map, as shown at 135. Compared to FIG. 1B, FIG. 1C offers a main electronic map display with more detail including geometric symbols in small rectangles under "Seattle" for example. These symbols represent the availability of supplemental travel information on specific types of locations e.g. Hotels, Campgrounds, Restaurants and Points of Interest. One such symbol indicating a realtime or recorded location as sensed by a GPS receiver interfacing with IRMIS is shown at 136a. As disclosed hereafter, the user can access and manipulate the added multimedia travel information by various mouse or keyed commands.

FIGS. 1D, 1E and 1F illustrate assorted locating tools for finding geographic locations, recentering the electronic maps, and selecting specific places or geographic loci as input for routing or multimedia operations. Three buttons in the row at 136 prompt the dialog boxes for "Locate Place Name" at 137, "Locate Zip Code" in FIG. 1E and "Locate Area Code and Exchange" in FIG. 1F. This suite of locating tools facilitates searching lists by the names of places or cities and respective states or provinces as well as locating specified places by recentering the map display upon the identified location.

FIGS. 1G, 1H, and 1I express the interface for routing and related operations. The user can access the Manage Route menu or dialog box at 138 by depressing the Route button at 140. A quick pull-down menu at 139 also makes routing or related options available. The user can enter a starting place, e.g., Montpelier, Vt., and a final destination, e.g., Plattsburgh, N.Y., plus intermediate, optional waypoints in between if desired. A suite of buttons at 141 enables the user to add, insert, delete, etc. items to or from the waypoint-input list by routine text and graphic input means. Entered waypoints are symbolized on the map interface by numbered inverted triangles as shown at 147. The user prompts calculation of optimal routes by selecting between Quickest, Shortest or Preferred options at 143 or the 139 quick menu. The resulting route is displayed by highlighting the recommended roads on the map display as shown at 146 from Montpelier through Burlington to Plattsburgh. Added control over routing parameters or variables is provided by depressing Speed 144 and Prefers 145 buttons that access dialog boxes for adjusting the routing computation. The FIG. 1I dialog box allows the user to modify estimated or anticipated speed, or rate of travel, in miles or kilometers per hour for various road classifications. The FIG. 1H dialog box enables the user to calibrate the routing computation module to favor or avoid specified types of roads.

FIGS. 1J and 1K further depict routing functionality plus introduce multimedia capabilities. Accessed for example through the 139 quick menu in FIG. 1G, the Points of Interest Along the Way dialog box at 148 in FIG. 1J exhibits a list of three items termed POIs for points of interest in this disclosure. By prompting the Along the Way command, after inputting an ordered list of waypoint input, the user has caused the software to seek and find POIs within a specified distance from the computed route for which further information is available in the form of audio, pictures or text. By depressing either the Show/Tell All or the Show/Tell One buttons on the right in the 148 Along the Way dialog box, the user can prompt a multimedia presentation or series of presentations as shown at 151 in FIG. 1K. Controls along the bottom of the 151 picture display window on Burlington facilitate user control and selection of multimedia content and form, as described hereafter. In FIG. 1J, the Attach button on the right in the 148 dialog box enables the user to pick, fix and include selections of information with travel plan output, as disclosed further hereafter. Travel Plan dialog or list boxes are shown at 149 in FIG. 1J and 152 in FIG. 1K. Travel Plan list boxes are a form of routing computation output including a list of waypoints, routes, compass directions, nearby town, time and distance estimates for route segments and the overall route.

FIGS. 1L and 1M further depict information resources about specific types of places. As disclosed hereafter in relation to FIG. 1-O and quick menu 161, the user can access information on specific types of POIs such as hotels or restaurants. List boxes for local hotels and restaurants appear at 154 and 156 in FIG. 1L and for campgrounds at 158 in FIG. 1M. These listboxes all have a button to Attach information on chosen accommodations to emerging travel plan output. These listboxes also allow the user to call for more detailed information or Full Info on selected locations of the respective types. Such information availability is indicated on the mapping interface by colored symbols within a small rectangle under or adjacent to the relevant place name, as shown for Shelburne at 157. The Campground information box at 159 shows a typical display of Full Info requested by the user concerning the Shelburne Camping Area.

FIG. 1N illustrates a typical, moderately complex MAP'N'GO (TM) 1.0 hardcopy travel plan output, as developed in FIGS. 1G, 1J and 1K. Note the heading up orientation of the travel plan, with point of departure at the bottom and destination at the top of a strip map format, as compared with the conventional North is Up and South is Down orientation of the map display in FIG. 1G. The heading up strip map format of the FIG. 1N travel plan has the advantage of a mapping representation in which a route change involving a righthand turn e.g. in Burlington appears intuitively as a righthand turn on the travel plan map. The FIG. 1N travel plan illustrates text travel directions and travel time estimates in hours and minutes along the right margin. Pictorial and text attachments plus estimated miles of travel are presented in the left margin and border of the FIG. 1N strip map.

FIG. 1N alternatively shows one or more digital desktop displays. The highlighted route up the center can represent a set of "breadcrumbs", or an actual path of travel logged on an IRMIS PDA/GPS, and transferred to the home-base desktop computer component of IRMIS. Some or all of the digital photos, and/or "map notes" or text POI information boxes, on the left side of FIG. 1N can also reflect PDA/GPS utilization according to the IRMIS invention. For example, the picture of "115 Jones St." could be a digital photo taken with a camera device linked with an IRMIS PDA/GPS in the field. The PDA/GPS recorded the precise date, time, and geographic coordinates of the digital photo for later transfer to, processing and display on the IRMIS desktop. The digital photo was tagged or electronically stamped with the GPS-generated information by the connected PDA/GPS unit, at the time and place it was taken—then transferred from the digital camera to the IRMIS desktop.

FIGS. 1-O and 1P illustrate advanced capabilities to do routing or multimedia and combined operations. In the absence of any prior routing input, the user can click on a location, like Seattle at 160, for which multimedia is available. The user can then select various operations or types of information from the quick menu at 161. Selection of Points of Interest, for example, brings up a list box for tourist attractions situated in Seattle as shown towards the bottom of the Points of Interest window for Seattle at 162. As shown in the middle of the window at 162, the user can scroll through text information concerning selected attractions, such as the Museum of Flight. The user can prompt pictorial and audio information using the Show/Tell button at 164. The Show/Tell command results in a selectable audio or pictorial presentation at 165 and 168 subject to a flexible set of user controls at 166.

As shown in FIG. 1P, flexible control over multimedia form and content enables the user of an in-vehicle embodiment of the invention, for example, to maintain an output of audio 169 travel directions for the driver to hear. Meanwhile, the passenger can monitor the visual route map at 170 and, at the same time, browse through information about places to eat in Seattle using the restaurant list box 171. For in-vehicle use, alternatively or in addition, a GPS receiver linked to IRMIS can provide a display of the vehicle's current position as shown as a dot at 173.

FIG. 2

FIG. 2 is a block diagram illustrating an interactive system 200 which combines computer software processes for routing and travel directions with presentations of multimedia information related to locations. IRMIS works with one or more geographic information systems (GIS) 201 for storage, retrieval, manipulation, mapping, correlation and computation of spatial data related to geographic coordinates corresponding to locations on, above or beneath the surface of the earth within the realm of human activity. The David M. DeLorme U.S. Pat. Nos. 4,972,319 and 5,030,117, exemplify such geographic information systems for generating the map displays and output, as well as management of the geographic databases. Other GIS, or other database systems that relate data with geographic coordinates, e.g., latitude and longitude, also suffice for use with the present invention.

On the left in FIG. 2, block 205 comprises the subsystem for routing. Block 209, on the far right, relates to one or more databases of multimedia information concerning places or objects identified by geographic coordinates. In the middle, block 207 illustrates the data transfer processes and operational pathways facilitating interactivity, or combined operations, between the multimedia 209 and routing 205 subsystems.

Processing starts either with routing 203 or multimedia 204. For example, as a leading step within the routing subsystem 205, a typical application, or episode of use, proceeds with waypoint input 231, typically selected by the user, including a starting place, a final destination and optionally one or more mid-points or intermediate locations where the user may stop or pass through in his or her travels. Waypoints include departure points and destinations as well as intermediate or mid-route waypoints. Waypoints are listed in the users intended order of travel. The system 200 facilitates waypoint input for routing functions by a variety of means, including database searches, as disclosed for input of points of interest (POIs) within the multimedia block 209. Waypoint input can also be derived from a GPS receiver interfacing with IRMIS, for example, to download the current position of the GPS receiver and input it as a starting point.

Next, in the course of a typical operation performed within the routing subsystem 205, the user prompts the computation of an initial route, or optimal travel path, between entered waypoints at step 245. Such software routing computations generally entail known methodologies for the manipulation and calculation of data comprised of vectors, line segments or sets of geographically located points or line intersections sequenced in temporal order or order of the occurrence of events related to travel or motion in geographic space. The user can calibrate or tune routing functions in order to compute either the shortest, quickest, or preferred route, among other parameters, as disclosed hereafter.

Based on user-optimized route computations, step 259 next expedites one or more computer displays, graphics, hardcopy, text, audio or other output, representing the initial route as computed along the waypoints input by the user. Such routes are represented as various forms of itinerary including: (1) annotated maps upon which the optimal routes are graphically marked, accentuated or highlighted; (2) lists of waypoints, or place names or geographic coordinates typically arranged in the order encountered along the route; (3) point to point directions how to take the optimal computed route indicating turning points, landmarks, navigation aids, signposts etc. along the computed route also typically arranged in temporal order of travel; (4) one or more POIs or preferrably one or more ordered sets of waypoints or route nodes electronically uploaded into a compatible GPS receiver PDA as shown at 102 in FIG. 1A for portable, remote use (with or without GPS), e.g., for route guidance in the field; (5) various combinations of the four forms of route output or itinerary just listed.

As pictured in FIG. 1N, the preferred route output includes map displays or map hardcopy with the optimal route highlighted, marginal travel directions in an easy to follow format with the point of departure consistently at the map bottom, and the destination near the top of the strip map format. Alternative embodiments express such route information output in pure form at step 259 in FIG. 2, by employing other graphics or map formats, images, text and numbers, or sound/voice output to convey the recommended or optimal itinerary or route. Preferred IRMIS desktop/PDA interface is further described hereafter relative to FIGS. 2A, 4C, and 5D–5F.

On the other hand, a typical operation or program can begin on the multimedia side 209 with user entry of one or more points of interest (POIs) selected by the user inputting individual POIs or by database searches, sorting for specific predefined types of POI, related characteristics, or linked data or information using the underlying GIS 201. In FIG. 2, to set up a presentation of multimedia place information, the user can perform individual or manual POI input at step 243. For example, a vacation traveler can request multimedia information on two or three popular resort locations recommended by friends, ads or travel articles by using well known data entry methods such as keying in the resort names, or nearest place name, or geographic coordinates. The system 200 is further able to locate individual POIs for input by enabling a user to select from lists of place names, or through linked phone exchange, zip code or geographic coordinate data. The user can engage in manual input of individual POIs by clicking at points, symbols or place names on the map display.

In fully developed embodiments of IRMIS 200, steps 243 and 255 work together within the multimedia subsystem 209 to enable the user to execute database searches for desired multimedia input. Step 255 enables and manages automated POI sorts or searches in order to generate, among other tasks, one or more lists of locations or POIs, about which information is available in the underlying database system 201 as potential content for multimedia presentation in step 273. For example, step 255 facilitates user searching for resorts of a predefined type e.g. skiing, tennis club, theme park, etc.; or for a list of resorts with specific characteristics including low cost, desired climate, nearby attractions or transport, etc.; or for a list of resorts linked to certain data or data types e.g. graphic images, hotel reservation access, or banquet or conference facilities information, etc. In step 243, the user can then either edit the results of such database sorts, or input the entire list of resort locations produced by such a database search. Whether manually entered by the user or taken from a user designed database search, POI input at step 243 calls forth multimedia information presentations concerning the resort location inputs.

As already noted, step 231 waypoint input within the routing subsystem 205 can involve identical database searching processes, as well as manual input of individual locations. This specification uses the term-selected waypoint to refer to a routing input item at step 231 in the routing subsystem 205. POI for point of interest is the term generally reserved for an item of multimedia input at step 243 in the multimedia subsystem 209. Terms such as place, location or geographic object refer to definite points, loci or sites on or proximate to the surface of the earth. Such loci, points or sites are associated in the GIS 201 with particular or ascertainable geographical coordinates e.g. latitude/longitude, plus an index of elevation, altitude or depth as appropriate. A single unique place, location or geographic object could be both a waypoint, i.e., a routing input item and a POI, i.e., a multimedia input item. Outputs and inputs are transferred between routing and multimedia as part and parcel of important applications of the system technology.

Within the multimedia subsystem 209, step 273 facilitates diverse multimedia information presentations or output on places, locations or geographic objects listed as POI or multimedia input in step 243. The step 273 output or multimedia presentations are subject to flexible user control, inviting further user response and interaction. The invention 200 facilitates user participation in, and user control of, both the form and content of ongoing multimedia presentations. The multimedia subsystem 209 provides access to commands or user options for making further manual selections of individual POIs, or further database POI searches, even in the middle of an ongoing multimedia presentation. In step 273, as detailed hereafter, the user can elect to repeat or skip parts of a multimedia presentation, pick among or combine forms of media such as audio, text or graphics, alter the current POI list governing the order and geographical focus of the unfolding ongoing multimedia experience, or prompt alternative or more detailed multimedia presentations about the places of interest to the user.

Pure routing is accomplished entirely in the routing block or subsystem 205. Block 205 generally illustrates a software process for routing which computes the temporal arrangement, sequencing and linear structure of travel or movement, between two or more places or waypoint locations, following specified transportation routes such as vehicular roads, hiking trails, shipping channels or flight paths, etc. Such routing computations are subject to adjustable parameters. For example, users can opt to compute the shortest route in terms of the absolute travel distance, or in the alternative, the quickest route in terms of the predicted, elapsed time it will take to travel the route. Routing output from such computations can also report estimated distances and expected time frames for an overall journey as well as discrete parts or segments of an optimal computed route. The users can engage exclusively in routing functions, absent any intervening multimedia operations, starting at 203 and stopping at 275, all within the routing subsystem 205.

Similarly, pure multimedia can commence at 204 and stop at 279, unfolding entirely within block 209, without reference to or interaction with the routing subsystem 205. The term multimedia in this context refers to a broad range of audible, visible, legible, or otherwise humanly perceptible data or information as stored, processed, output and transmitted within and between computer systems. The GIS at 201, underlying the invention 200, stores, retrieves, manipulates and manages discrete units or items of information in various media in relation to geographic coordinates. Block 209 in FIG. 2 illustrates a multimedia database subsystem for flexible, user controlled, processing and presentation of located information in various media and formats including alphanumeric data, text, graphics, still or moving imagery, and sound, etc. which can be separate from routing.

The overall system 200, however, enables transfers of intermediate and final outputs between the independent routing 205 and multimedia 209 processes or subsystems. Multimedia and pure routing functions, as just discussed, are blended or integrated essentially by sequencing multimedia and routing operations under user control. Routing 205 plus multimedia 209 subsystem operations, performed sequentially, produce combined or interactive output at step 265. The combined or interactive output typically includes a unique, customized or personalized travel plan provided in the form of map displays or hardcopy maps annotated with information about places, and travel directions, with the optimal computed route highlighted, labeled or otherwise marked. Users can opt to further embellish combined, interactive travel plan output with selected multimedia graphic images, videos, animations, sound or voice output as well as text, documents, numeric or tabular data about locations, POIs or points of interest or other geographic objects along the way, i.e., on or near the computed optimal route. One preferred form of such combined travel plan output is illustrated in FIG. 1N.

Combined interactive output 265, routing only output 259, and multimedia—only output 273 can be transferred to and/or from companion IRMIS PDA or PDA/GPS devices. User interaction with routing and multimedia, as illustrated at step 265, gives a combined interactive output that reflects choices made by the user. Step 265 output integrates the user's decisions about waypoint input or routing calculation parameters, plus the user's selection of individual POIs or multimedia inputs derived from database searches, along with the user's interaction with and responses to multimedia presentations. For example, in order to revise or refine his or her emerging itinerary, the user can modify an initial route by altering the current waypoint list adding places he or she really desires to visit, or excluding places from the itinerary, in response to selected multimedia information about the locations found along the initial route. The system 200 further enables users to attach or include multimedia selections to or with travel plan output, i.e., printouts, audio, screen displays, etc. As shown at 265 in FIG. 2, combined output incorporates the user's choices and interests as exercised through one or more interactions with and between the routing 205 and multimedia 209 subsystems.

FIG. 2 illustrates the invention's capability for combined interactive routing and multimedia about locations, in the middle block 207, and related lines portraying operational flows between the routing block 205 and the multimedia 209 block. Pathways for transfers of intermediate or final input/output among the routing 205 and multimedia 209 subsystems coinciding with pathways for sequencing combinations of multimedia and routing operations are illustrated by solid lines with one-way arrows symbolizing a single direction of flow e.g. 233, 235, 241, 247, 251, 261 & 269.

As disclosed in detail hereafter, various input/output transfers and combined routing/multimedia operational sequences take place through the interaction bus 237. Within the middle block 207, the interaction bus 237 facilitates repetitive, looped or iterative operations as well as user interactions producing combined output at step 265 by sequencing multimedia and routing operations. For example, the system 200 enables users to blend pure routing output generated at 259 with subsequent multimedia operations by transferring data via path 261, the interaction bus 237, and path 241 to the multimedia input step 243. In this manner, users can prompt a multimedia experience of information focused upon places found along the way, i.e., within a preset distance of, or in a user-defined region around, an initial route or set of waypoints. Thus in typical operations, the invention 200 sequences prior routing and subsequent multimedia operations to generate route based multimedia information presentations on locations or points of interest along an initial route. Output 259 from prior route computations gets transferred from block 205, the routing subsystem, through the interaction bus 237, over into the multimedia subsystem 209 which then absorbs the route data as multimedia input at step 243. The user can then pick and play one or more multimedia presentations about points of interest or geographic locations found in the vicinity of the current optimal route highlighted on the map display.

In the examples just cited, the geographic content of the subsequent multimedia presentation is circumscribed by the prior routing operation. As detailed hereafter, location data from the routing subsystem 205 focuses or sets the overall agenda for the following multimedia show about places nearby the computed route. This location data comes to step 243, to become multimedia input, through the interaction bus 237, via procedural and data transfer pathways at 261 and 241. Any resulting multimedia presentations are no longer pure, in the language of this disclosure. Rather the multimedia has been combined with, and derives its geographic context or structure from, the prior routing operation. Routing operations are also preceded by multimedia in other applications or uses of the invention 200, as disclosed hereafter. In those cases, the geographic context of the subsequent routing follows the lead, i.e., the locational focus of the prior multimedia.

So called pure multimedia output at step 273 involves no prior routing operations. No multimedia operations come before pure step 259 routing output. In FIG. 2, steps 257 and 271 distinguish such pure sequences of operations from mixtures or series of multimedia and routing functions. Given the existence of a prior routing step or operation, output from such a combined prior routing and subsequent multimedia sequence of operations is shunted in step 271 away from step 273, reserved only for pure multimedia output. Output from a routing operation followed by a multimedia operation appears at step 265, arriving there by dint of the logic of step 271, then path 251, the interaction bus 237, and path 263. Combined interactive output at 265 can also follow one or more prior multimedia operations followed by one or more routing operations. In such cases, data transfers and operational sequences follow the logic of step 257, through path 247, the interaction bus 237 and path 263, resulting in combined output at step 265.

The interactive system 200 facilitates additional iterations and combinations. For example, during or after the playing of a multimedia presentation based upon an initial route computation as just described, the user can then decide to add or remove one or more locations or places from his or her itinerary as a matter of personal preference, responding to the multimedia experience. This additional operation gets done by a transfer of the combined multimedia output from step 265, through path 267, looping back into the interaction bus 237, to become routing or waypoint input at step 231 via path 235. In this manner, the user calls forth a new or revised route computation, via step 245, based on his or her responses to multimedia information about points of interest found along the initial route.

The foregoing example of system usage focuses on a combined interactive multimedia and routing process made up of a sequence of three operations: (1) an initial routing computation and output (R1); (2) a multimedia information presentation about places or points of interest found nearby the initial route (M1); and (3) a re-calculation or a modification of the initial route output based upon new waypoint input stemming from the user's response to the multimedia presentation (R2). In a shorthand notation, amplified below, this combined operation is formulated thus: R1, M1, R2=C01. Equivalently in words, first routing operation, followed by first multimedia operation, then second modified routing operation yields first combined output.

Any time that output results from a substantial sequence of routing and multimedia steps, then the resulting combined output appears at step 265. Steps 259 and 273 are reserved for pure output, meaning multimedia not preceded by any routing, as well as routing steps absent any prior multimedia, software decisions managed in steps 271 and 257 respectively. Otherwise, steps 257 and 271 work to shunt the product of sequences of multimedia and routing operations through the interaction bus 237 to appear as combined interactive output at 265 in FIG. 2. Such a combined output could result from a single multimedia operation followed by a single routing operation. Moreover, one or more multimedia operations can precede one or more routing operations. What is more, as exemplified hereafter, IRMIS 200 is capable of complex, prolonged iterations and operations composed of at least one multimedia or at least one routing operation combined with a plurality of counterpart operations.

As a shorthand notation for such combined or sequenced sets of operations, this disclosure employs the expression R1, R2, R3, Rx=R01 to denominate a series of pure routing operations and its pure output as shown in step 259 in FIG. 2. M1, M2, M3, Mx=M01 denote a pure multimedia operational sequence and its multimedia only output as shown at step 273 in FIG. 2. Thus, sequences of steps such as R1, M1=C01 and M1, R1=C02 represent combinations of multimedia and routing operations productive of combined, interactive output as shown at step 265 in FIG. 2. The system 200 is capable of complex iterations and combinations of operations as, for one example, expressed in the following shorthand formula: R1, R2, M1, R3, M2, M3, M4, R4, M5=C03.

As detailed hereafter IRMIS 200 enables even more complex operational chains and loops, typically because the user is engaged in replaying selected routing and multimedia steps or operations, usually with minor or modest variations of inputs and parameters, in an effort to refine his or her travel plan. Complex operational sequences also occur because the user shifts back and forth repeatedly between routing and multimedia tasks, for example, to play multimedia information related to routes and waypoints appearing on the map display, or to revise their travel plans by altering the current list of waypoints in response to multimedia information about places and POIs.

Thus, the system 200 enables the user to generate, review, reshape, edit, improve, simplify, complicate or otherwise amend a custom, personalized or individualized travel plan. Travel plans are typically the product of a unique process of interactivity, consisting of particular series of routing and multimedia operations, arranged by the user. The user can impose his or her idiosyncratic responses or personal choices to shape each operation's form and content, or repeat and vary operations, by adjusting parameters and by exercising commands and options disclosed in more detail hereafter.

The user can opt for a quick and simple routing operation or extensive travel planning with multimedia input. For example, a user can employ the system 200 just to input Boston as a point of departure and New York as a final destination, then compute the quickest route for automobile travel between the two cities. Given more leisure time, however, the user can elect to proceed with the invention 200 to experience multimedia about points of interest around the quick car route to New York from Boston, or to explore and compare rail, air or marine routes between these two cities. Moreover, in response to the multimedia experience, this user can plan various side trips, or a much more convoluted route incorporating intermediate waypoints, including places the user wants to visit. Furthermore, the user can choose to compute a combined transportation route, for example, driving by car from Boston, Mass. to Providence, R.I., then taking a train to New Haven, Conn., with the journey on to New York City completed by bicycle, or on foot.

After making an extensive travel plan, including more side trips or stop-overs than available leisure time, the user can opt to edit or revise down an overambitious travel plan. This task of prioritizing or selectively reducing a travel plan entails yet another series of multimedia presentations and routing computations, aimed at the discriminating elimination of the intermediate destinations of least interest to the user, and the side trips or modes of transportation which involve too much travel distance or travel time. This disclosure employs the shorthand notation explained above in order to help express or describe such complicated sequences of multimedia and routing operations in relation to the FIG. 2 block diagram, or more detailed flow charts presented hereafter.

Importantly, the shorthand notation aids the user in understanding that the invention 200 facilitates a diversity of repeated or combined software operations. The interaction bus at 237, within the interaction block 207, enables pure sequences of iterative operations e.g. a series of routing operations only, as well as sequential combinations of mixed multimedia and routing operations. By taking or following different paths through the interaction block 207, for example, the user can either recycle a pure routing operation, with deliberate variations, or combine antecedent routing output with subsequent multimedia operations to produce presentations of information in various media related to the prior routing output. Vice-versa, the user can repeat a pure multimedia operation varying significant details. Or the user can invoke an ensuing routing operation, after a multimedia presentation about locations or geographically located objects, typically in order to plan and map out optimal travel routes and transport between selected places or points of interest experienced by the user in the multimedia.

By way of illustration, in FIG. 2, the routing subsystem 205 enables the user to compute and compare alternate routes or modes of transportation, by iterative or cumulative operations accomplished through the interaction bus 237. Starting with an initial pure routing computation, such cyclical sequences of pure operations involve looping or feeding step 259 output back up via path 261, through the interaction bus 237 and path 235 in to the routing or waypoint input step at 231. In this manner without any reference to multimedia information, the user replays and reworks routing computations in order to insert or delete waypoints, or to try other parameters for routing.

For a concrete case, suppose the user first computes the quickest way by automobile from Boston to New York City. The user has many options for a second or follow-up routing operation, which takes the first routing output as the baseline input for one or more successive routing operations. As a second phase for instance, the user can recompute the first route in order to compare the cost and benefits of travel by rail or air or sea to New York City from Boston. In the alternative, as a second operation of divining optimal automobile routes, the user can opt to readjust software routing parameters, as disclosed hereafter. Then, the user can recompute and output the shortest route in total miles or kilometers, or the best roads and highways for wide or heavy truck loads, or the most scenic automobile route from Boston to New York City. Other optional routing software parameters also are described in more detail elsewhere in the specification. Yet another option for a second or successive routing operation is for the user to recompute the optimal route from Boston to New York City, incorporating the user's personal desire to stopover en route for an overnight visit with friends or relatives living in Bennington, Vt.

In shorthand notation already proposed, all examples, just expressed in the foregoing paragraph, of a second or successive routing operation get formulated as follows: R1, R2=R02. This particular expression denominates a pure sequence, composed of two routing operations producing routing output only at step 259. Of course, the initial or first phase routing operation, i.e., the quickest route by car from Boston to New York, upon which later iterative operations are based, is expressed as follows: R1=R01. The vital result is that the first and second routing operations produce first and second outputs, i.e., R01 and R02 for the user to consider and compare in planning his or her itinerary. Such iterative or follow-up routing operations enable the user to evaluate and make choices between two or more alternate routes or modes of transport by looping or recycling routing subsystem operations through the interaction bus 237 and interaction block 207, without involving multimedia.

In a similar fashion, the invention 200 enables the user to replay multimedia operations in sequences, purely within the multimedia subsystem 209. For example, the first such operation would be expressed as M1=M01. M1, M2=M02 expresses a range of possible second phase operations in a pure multimedia only sequence. Such replaying within the multimedia subsystem 209 is accomplished by transferring or looping the M01 output from step 273 at the end of first operation via path 269 through the interaction bus 237 and path 241 to step 243 where the second or iterative operation can begin.

The formulae and pathways cited in the foregoing paragraph are consistent with recycled multimedia operations such as the following. (1) M01 comprises a multimedia presentation of all sports-oriented resorts on the West Coast of the United States as found in a database search. The user elected only to examine a brief text description about each of the 100 resorts found in the search, to browse for places to go on his or her vacation. (2) M02 comprises a user selection or short list of 10 from the full M01 list of 100 resorts. The user has chosen to experience more multimedia information, such as digital photos or videos of selected resorts, voiced descriptions of the sports facilities, text concerning nearby cultural happenings and price information in tabular form about the short list of 10 resorts picked by the user in browsing the brief text descriptions about all 100 resorts on the M01 list. In yet a third phase multimedia operation, the user could review, compose and save selections of the multimedia information about the 5 personally most appealing resort locations to share with his or her family. Including this third operation of editing down the list to five resorts and selecting related information in various media, the full sequence of pure multimedia discussed in this paragraph is formulated as follows: M1, M2, M3=M03.

The user may be content to show family members the M03 pure multimedia presentation on his or her favorite five resorts. But the invention enables further operational sequences at the user's election. In addition to or as an alternative to more operations in the multimedia subsystem 209, the user can choose to engage in diverse follow-up travel planning functions utilizing the routing subsystem 205. Routing operations, following up such multimedia operations, entail transferring the resort POI data by way of path 269 through the interaction bus 237 and path 235 to the waypoint input module at 231. Then, as described further in relation to FIG. 4, the user can variously pick and arrange the resort POIs or the nearest nodes subject to routing computations as waypoints for one or more subsequent travel planning or routing operations.

For example, the user might proceed to compute an optimized route from home to the one resort location most preferred by the whole family. This entails transfer of POI data on the selected resort from the multimedia subsystem 209 into the waypoint-input module 231. There the user can input the resort location, or the nearest routable node, as the ultimate travel destination. The user's home address is entered as the point of departure. Then, in step 245, the user can prompt the computation of the quickest, shortest or another optimized route, as detailed hereafter. In combination with prior multimedia tasks developing a short list of resorts, this one simple follow-up routing computation expands the overall formulation to the following: M1, M2, M3, R1=C01. The first three multimedia operations can also be expressed in terms of their pure output M03, which the user can elect to save for later comparison and/or added processing. Thus, the overall sequence of combined routing and multimedia can be equivalently and compactly formulated as: M03, R1=C01. In any event, C01 stands for a combined output rather than pure output. Following up the antecedent multimedia selection of resort locations, the routing operation R1 proceeds by way of steps 245 and 257, then path 247, through the interaction bus 237, down path 263 to step 265. There it becomes the C01 combined output, typically in the form of highlighting the optimal computed route from the user's home to the selected resort on the underlying map display.

As just noted above, the system 200 lets the user save, compare or continue processing output from pure and/or combined routing or multimedia operations. Although essentially equivalent to M1, M2, M3, R1=C01, for example, the formulation M03, R1=C01 indicates that the prior pure multimedia output was saved or memorized by routine means, then retrieved and combined with the R1 follow-up routing operation. Similarly, the user can save the C01 combined output for later processing. This capacity of the invention 200 for later processing of memorized output or operational sequences enables the user to perform a diversity of combined routing and multimedia based on the same initial set of operations such as produced the M03 or C01 outputs. This feature helps to compare routes and compute multiple travel plans.

For example, instead of clearly preferring one resort on the M03 list, based upon their experience of the M03 presentation of multimedia information, suppose that the user's family favors two resorts about the same. The choice between the two resorts might depend on the travel cost or distance or other factors related to the routes to the two resorts. In such cases, the invention 200 facilitates additional routing operations combined with the prior M03 output to aid the user comparing routes and composing various alternative travel plans. M03, R2=C02 is the shorthand formula for a second follow-up routing operation from home to the family's other favored resort, yielding combined output C02 for comparison with C01. Moreover, an extended family, whose members reside in different places, but who are planning to vacation together, can compose multiple travel routes from their respective homes to the chosen resort. All based on the M03 list, here is a group of shorthand formulae for various sequences of operations producing multiple routes to a single resort for an extended family living in three different locations e.g. grandparents residing in Santa Fe, parents in St. Louis and a son or daughter away at college in Chicago: M03, R3=C03; M03, R4=C04; and M03, R5=C05. This capability of the system 200 to save the output from operational sequences, for later replay varying formats or inputs subject to the user's control, facilitates comparative or multiple routing operations which the user can combine selectively with multimedia information about places along the routes.

The invention 200 also provides for selectivity, flexibility and iteration in composing operational sequences so that the user can engage in extended integrated series of operations to develop and refine a single personalized travel plan. Such unique custom or individualized travel plans typically culminate from sequences of pure or combined multimedia or routing operations. The system 200 is interactive, i.e., enabling the user to control operational content, sequencing, parameters and media. This disclosure uses the term "interactivity" to describe how the system 200 provides for flexible ongoing user control over the order or sequencing of operations, and the exercise of optional commands and parameters, shown generally at 211, 215 and 219. User options are described further relative to FIGS. 1B–1M and 1-O to 1P which picture the user interface for one embodiment. Command and parameter options that influence multimedia or routing format, content or sequencing are also disclosed in relation to FIGS. 3, 4, 7, 8A–8E. For one example, the user can calibrate or adjust the module for routing calculations, at 245 in FIG. 2, to get the quickest or shortest travel route, or other preferred or optimal parameters for routing computations, as detailed relative to FIG. 4. For another example, paths 233, 235, 261, 263, 267, 241, 251 and 269 comprise optional pathways for the transfer of location data and travel information in various media between the routing 205 and the multimedia subsystems. Selecting among these pathways, the user controls sequencing, combination and iteration of multimedia and/or routing, as detailed hereafter. Also, alternative options to start and stop operations shown at 203, 204, 275, 277 and 279 facilitate user control over operational arrangements as well as input and output formats. Moreover, the user exercises flexible controls over the medium, topical focus and substantive content of the geographic information or travel presentations which are generated in the multimedia subsystem 209 in FIG. 2, described hereafter in more detail relative to FIGS. 8A–8E.

Along with the capability to modify multimedia and routing parameters and content, the invention 200 provides user control over operational sequencing and combinations, facilitating the production of individualized, custom, or personal travel plans. This disclosure uses the terms "individualized, "customized" or "personalized" to characterize output generated with substantial user interactivity. Even in the example previously cited, where the user only opts to compute the quickest automobile route from Boston to New York City, the user exercises choice over the point of departure and the travel destination. More user interactivity productive of custom output is illustrated by the added selection of intermediate waypoints, such as Hartford Conn. and Providence R.I., and the specific order of travel between waypoints. User choices or interaction are also enhanced by the capability for comparison of varied routing parameters e.g. scenic or shortest route and varied modes of transport e.g. rail, bus, ferry, air as well as automobile travel. The invention further enables individualized or custom output by facilitating unique iterative, sequenced and combined multimedia or routing operations, according to the user's responses and preferences while operating the system 200.

Customizing travel plans through the selective exercise of user controls over the sequencing and combination of operations was already exemplified above in the case of the resorts picked first in the multimedia subsystem 209. The user could proceed thereafter with various scenarios for follow-up routing tailored to user requirements and preferences. Comparing and evaluating alternate destinations and routes enabled the user to develop or refine individualized travel plans, reflecting "roads not taken" or selectively deleted waypoints as well as explicit travel information. Such customized travel planning often entails some operational sequences being repeated with the user varying the format, content, media and parameters involved in succeeding operations. Such systematic variations help the user to decide about alternative waypoints, transport, points of interest, or variable informational forms and content, in order to compose a personal travel plan. Travel planning is typically individualized by the user controlling transfers and integration of data between the multimedia 209 and the routing 205 subsystems by means of user selectable pathways through the interaction bus 237. For instance, individualized travel plans are further facilitated by operational sequences, commencing in the routing subsystem 205, which are then combined with presentations in the multimedia subsystem 209.

For example, going back to the case of planning travel from Boston Mass. to New York City N.Y., the user commenced operations at 203 in the routing 205 rather than the multimedia subsystem 209. On the one hand, the user can conduct sequences of pure routing, adding intermediate waypoints and varying routing parameters, as formulated for example by the short hand expression R1, R2, R3=R01. Other even longer pure routing operational sequences could involve added evaluation of alternate means of transport. On the other hand, the invention 200 provides the user with commands or options for variously interposing multimedia operations.

FIG. 2 depicts the flexibility or user options as provided by the invention 200 for variable or custom sequences of routing and multimedia operations. For one instance, having done no more than enter Boston as the starting point plus New York City as the final destination in the waypoint input module 231, the user can choose to transfer operations and data via paths 233 and 241, and prompt multimedia presentations on the attractions, accommodations and other geographically located information about Boston or New York City, which are stored in the IRMIS database. This option is further described in relation to FIG. 4, particularly step 431. Alternatively, the user can opt to transfer to the multimedia 209 only after computing and displaying an optimal route from Boston to New York through steps 245 and 259 in FIG. 2. Then, paths 261 and 241 enable access to a variety of subsequent multimedia about Boston, New York City, or points of interest or POIs found along or within a certain user-defined region around the optimal route. FIG. 4 especially step 471, FIGS. 5, 6A and 6B, and related text, further specify this process whereby POIs are found or located along the way or within a user-defined distance from a computed route or its component waypoints. In sum, the sequences of operations discussed in this paragraph generally reduce in the shorthand notation as follows: R1, M1=C01. The one multimedia operation, following one prior substantial routing computation or waypoint input operation, logically generates combined output 265 via path 251, the interaction bus 237 and path 263.

The invention 200, particularly the 207 subsystem governing interactive, iterative or combined operations, enables more individualized travel planning by means of varied combinations or sequences of operations. For example, pathways 251 and 235 offer the user the opportunity following the R1, M1 sequence to return to the routing subsystem 205. The user could then add, delete or insert waypoints selected in response to information experienced back in the multimedia, as detailed hereafter relative to FIG. 4. As detailed more in relation to steps 465 and 467, the user can also return from the multimedia 209 to the routing subsystem 205 to attach multimedia information about POIs to a developing travel plan, or to alter the dimensions of the region around the user's intended route in which the system 200 searches for POIs and related multimedia information. By returning for an added routing operation, the user enlarges the general formulation of sequenced operations in shorthand as follows: R1, M1, R2=C02. C02 combined output gets done at 265 via paths 247 and 263. The M1 multimedia step is recognized as "prior" to R2 in step 257.

As already disclosed, the invention 200 lets the user stop and output or memorize R01, C01 and C02 or other output from any valid sequence or combination of operations. As emphasized and exemplified below, the invention 200 also facilitates much more extensive series of operations refining and individualizing the user's emerging travel plan by repeated and varied multimedia or routing operations. Extending the example in the last paragraph, new waypoints or routing computations, performed in R2 after returning from the preceding M1 multimedia operation, may tempt the user to further explore multimedia information. As detailed hereafter, new waypoints or altered route computations can often generate added POI inputs about locations found around or along the new waypoints or computed route. Further exploration of the new POIs through an added multimedia operation entail an expanded sequence of operations as follows: R1, M1, R2, M2=C03. In turn the added multimedia exploration M2 could provide information on locations motivating the user to return yet again to the routing subsystem 205, for example, to insert or delete more waypoints at 231 as a matter of personal or individual preference. This added operation expands the formulation as follows: R1, M1, R2, M2, R3=C04. Moreover, the system 200 also permits repeated and varied multimedia or routing operations within a given sequence. Thus, R1, R2, M1, M2, M3, R4=C05 is a feasible operational sequence.

Combined outputs C04 and C05 stem from relatively extensive operational sequences. The invention 200 facilitates still more complex sequences and combinations of operations, typically with more user interaction or exercise of user options built into the system 200. Therefore, as a rule, the more elongated or complex sequences of routing and multimedia operations tend to generate travel plan outputs that are more unique or individualized. The invention 200 further enables the user to edit down or prioritize overdeveloped travel plans eliminating side trips or waypoints of less personal interest, for example, in case time does not permit an overambitious itinerary. Such editing typically results in a simplified, concentrated travel plan.

But, this editing process nonetheless involves additional routing or multimedia operations in order to delete less interesting waypoints or remove attached information about lesser POIs. Thus, relatively succinct custom travel plans could result from extensive sequences of multimedia and routing. In sum, the invention 200 provides flexibility and control over the sequencing, media, parameters and substance of routing and multimedia operations, yielding individualized travel plan outputs. Such travel plans are uniquely shaped and defined by the process of user interactivity involved in developing each travel plan, and optionally editing it down.

FIG. 2 also provides an overview of the user options and program controls, described in greater detail elsewhere in this disclosure as, for example, command menus, dialog boxes, control panels, adjustable parameters and global/local system settings. The user exercises such user options by command input and system management methodologies well known to software artisans e.g. conventional keystroke sequences; mouse, joystick or touch-screen manipulations on pertinent pixel locations, symbols and buttons; command text entries; voice-recognition technologies; macros and batch commands; and equivalents. In various embodiments, particularly embedded applications, such user control mechanisms are consolidated, overlapping, redundant, or simplified, as dictated by consumer requirements, user friendly design criteria and anticipated usage patterns.

For conceptual purposes, FIG. 2 depicts three distinct control interfaces, one for routing 211, another for the interaction block 215 and a third for multimedia 219. Simple dotted lines, at 213 and 217, indicate that all command and control interfaces are accessible between blocks or subsystems, one from another. Users involved in a routing process, for example, can stop in mid-operation and access the interaction or multimedia commands and controls. Some implementations have routing, interactivity and multimedia buttons or controls visible on screen from within any given mode of operation, particularly simplified versions of the invention and embedded applications.

In FIG. 2, the broken dotted lines, at 221, 225 and 229, represent two way connections between substantive steps and the user option managers for any given mode of operation. Line 221, for example, means that the user is able to control and define any and all routing input, calculation and output parameters by setting or adjustment before a particular operation. Moreover, the user can halt, suspend or detach from an ongoing operation to manipulate relevant controls and settings on the fly. Control lines 225 and 229 represent similar connections and capabilities for user option management within the interaction block 207 and the multimedia block 209 respectively.

Figure 2A:
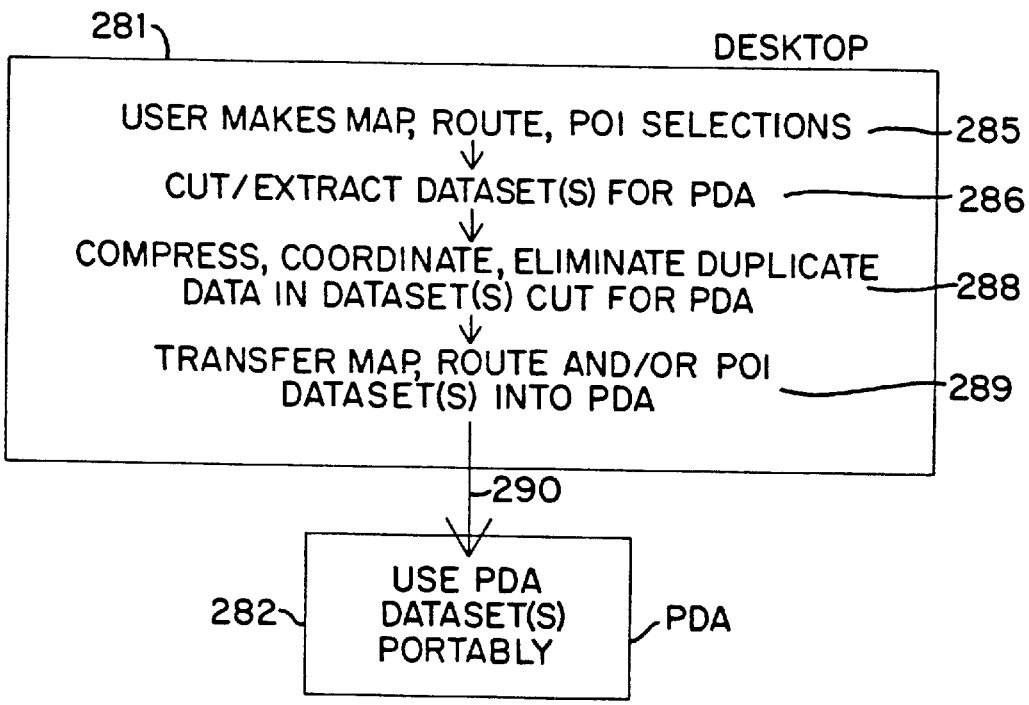
FIG. 2A depicts IRMIS protocols for the automated cutting or extraction of one or more sets of point, route, map, textual, and/or multimedia information, based on user desktop selections, for downloading into PDA/GPS.

FIG. 2A shows the steps of user selection, automated data extraction, cutting, compression, coordination, and elimination of duplication which proceed transfer of dataset(s) of map, route, and/or point information from IRMIS home-base desktop to portable PDA for use in the field.

Figure 2B:
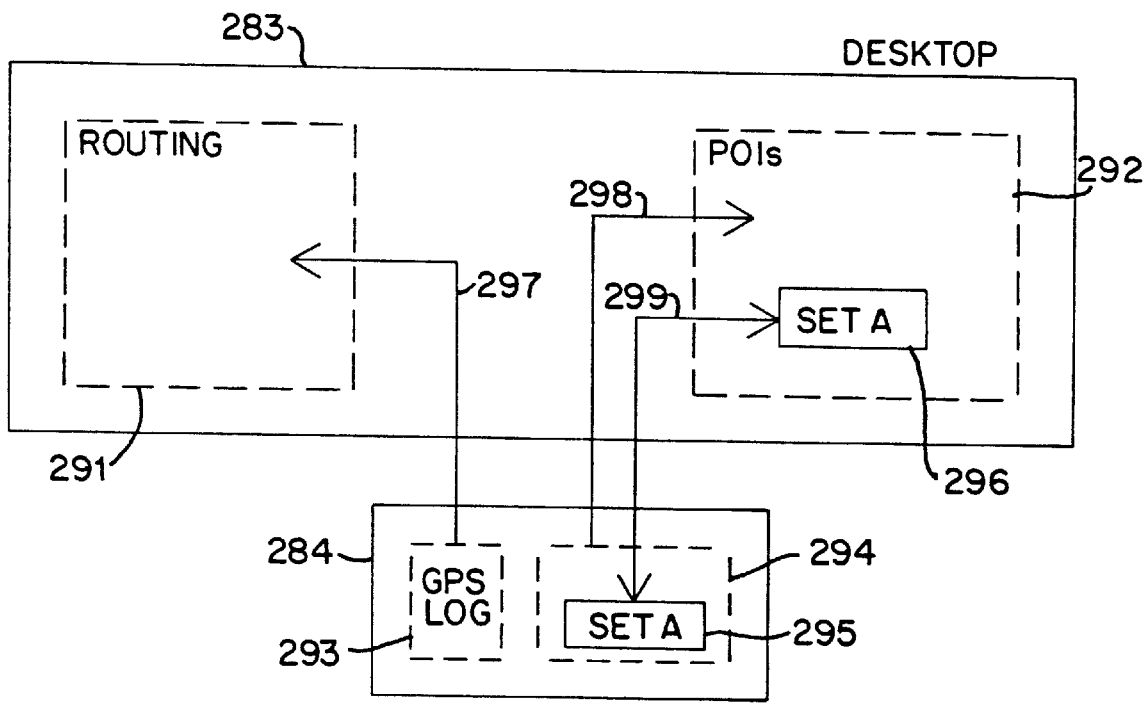
FIG. 2B illustrates uploading of location marks, GPS logs and other information from PDA/GPS into IRMIS desktop home base.

FIG. 2B illustrates transfer of GPS log records and/or POI location marks and annotations from PDA respectively to the route and point data processing parts of the desktop GIS or geographic information system. At 295 and 298 are illustrated the process of "hot-synching" or the automated one or two way coordination or "updating" of one or more selected, corresponding dataset(s) in a linked PDA and desktop.

In FIGS. 2A and 2B, the desktop or home-base component of the IRMIS invention is represented by the larger boxes—at 281 and 282 respectively—corresponding to the interactive routing and multimedia POI system at 200 in FIG. 2 for user-customized travel planning and/or geographic data selection. The portable PDA component of the IRMIS invention is shown in FIGS. 2A and 2B at 282 and 284 respectively. As described elsewhere in this disclosure, the PDA at 282 and 284 is typically utilized in the field, or at locations remote from the desktop; the PDA is often and preferably used in conjunction with a GPS receiver, or some equivalent.

In FIG. 2A, the desktop geographic information system for routing and multimedia operations preferably comprises a large-scale (e.g. national) map and point information database. The user considers and selects points of interest, computes optimal route and travel plans often by repeated iterations and editing, and at the user's option chooses and attaches multimedia or POI information—at 285. The user can then opt to transfer one or more map, route and/or point information "packages" or datasets into the companion, portable PDA at 290.

At 286, in response to the user command to load the PDA, the inventive IRMIS software cuts or extracts the map, route, and/or point information selected by the user, and "packages" it for use in the PDA. This process of cutting or extracting a geographical information subset collects data from one or more map screens—including information on POIs and routes picked by the user, as further detailed hereafter particularly relative to FIG. 5F.

At 288, the IRMIS invention proceeds to make the dataset(s) more compact and adapted to use on the PDA. For example, color maps are adapted for use on gray-scale PDA map displays removing unnecessary color data which would waste PDA memory; alternative symbols, legible in black-and-white, may be substituted for vital map or symbol color-coding. Users typically select more than one package for PDA—often including overlapping maps and alternate routes to or from a particular location. Such multiple packages are coordinated or cross-referenced, and PDA memory requirements are reduced by elimination of duplicate records, as detailed more hereafter, particularly relative to FIG. 5F. The dataset(s) or packages are then transferred into one or more PDAs 282 at 289 and 290—for portable remote use.

In FIG. 2B, such a PDA 284 is shown after field use. For example, the PDA user may have deployed the GPS log to record a set of breadcrumbs or a series of geographic points at some user-specified time/distance intervals along an actual route or path of travel taken the user with the PDA. One or more accumulated breadcrumb trails or GPS log dataset(s), stored in the PDA at 293, are readily transfered into the more fully articulated 291 routing subsystem within the desktop 283 in FIG. 2B. This 291 routing subsystem in FIG. 2B corresponds to 205 in FIG. 2A, wherein the GPS log data can be displayed, used in further trip planning or analysis, or otherwise processed using the powerful desktop.

The PDA user also often records or modifies data related to one or more individual geographic points in the field. The user for example can make and annotate location "marks". Such new or revised POI data is stored at 294 in the PDA and transferred into the desktop POI subsystem at 292 in FIG. 2B, which corresponds to 209 in FIG. 2. Thus, POI data gathered with the PDA/GPS in the field can be processed using the desktop.

As shown at 297 and 298, such transfers between the PDA and desktop can be one-way, at the user's option, or programmed for automatic transfer whenever the PDA "docks" or connects with the desktop. The two-way arrow at 299 illustrates "synchronization" i.e. automated two-way or mutual updating of specific, congruent dataset(s) in the desktop and PDA e.g. "Set A" at 296 and at 295 respectively. Thus, changes in the user's address book, travel plans, map configurations, and/or point information can be made to match on both the desktop and PDA. "Synchronization" of this kind can be one-way, two-way, automatic, and/or subject to user confirmation. For example, the IRMIS PDA might be programmed to automatically transfer any and all new digital photos—the date, time and location—taken by a digital camera, connected to and used in conjunction with the IRMIS PDA/GPS in the field.

FIG. 3

FIG. 3 is a flow chart illustrating the organization and procedural logic of the commands or user options available to multimedia users of the preferred embodiment of IRMIS. The system combines multimedia and routing to provide a software utility for personal and business travel planning. FIG. 3 depicts data transfer pathways as well as the hierarchy of commands and user options available to users in the Points of Interest system listbox or dialog box shown in FIG. 1J. In the multimedia mode, the user can call up this dialog box on top of the map display that typically dominates the computer screen.

FIG. 3 relates to the user options 219 and POI input 243 steps found within the multimedia subsystem block 207 in FIG. 2. In FIG. 3, dotted lines and reference numbers delineate the margins of the routing 205 and interaction 207 subsystems portrayed in FIG. 2. FIG. 3 shows the particular multimedia user options and commands for POI input and pertinent data transfers embodied in IRMIS in relation to the more generalized FIG. 2 system block diagram.

In FIG. 3, processing begins at reference letter C. The user can activate the multimedia mode at 301 in the first instance for purposes of composing fresh or new multimedia presentations uncombined with prior operations. Activation of the multimedia mode facilitates user access to the user options and commands shown in FIGS. 1J, K, L, M, O and P as well as FIG. 3. From C, the user proceeds to step 319 to select or get fresh POI inputs for multimedia presentations implemented by looping back through C to steps 305 and 307. This is how, in the vocabulary of this disclosure, pure multimedia is started by the user from scratch, uncombined with prior routing or multimedia. But, the user can also recycle pure multimedia through C typically for replay with variations in media, focus, contents or locations.

Entry point C plays a pivotal role in recycling multimedia presentations and combining routing and multimedia. During or after multimedia presentations, the user can return to C proceeding to replay multimedia she or he has just experienced, by recycling the prior multimedia presentations through steps 305 or 307 typically in order to vary the multimedia form, content or focus according to the user's interests, as disclosed hereafter in more detail in relation to FIGS. 7, 8A–8E. In step 319, the user is able to amend or revise preexisting POI input lists, on which prior multimedia was based, by adding or deleting points of interest or locations to or from the preexisting list. This altered POI list sets up a new variation or altered geographic foci for multimedia replay implemented by looping around through C to step 305 or 307. Moreover, multimedia presentations can derive from or combine with output from prior routing, as shown, entering C at 303 in FIG. 3.

Either to start a fresh pure multimedia presentation or to modify one or more pre-existing POI lists, the user proceeds from C to step 319 in order to get and decide on POI inputs in several ways. Users can get and manually enter one or more POIs typing in place names, geographic coordinates or other literal location indicators. The user can also seek, pick or delete POI input by browsing lists of locations, or other situated data, and choosing points of interest. Moreover, the user can employ cartographic or graphic means in order to locate potential POIs to be added to or deleted from the current POI input list. This typically is done by positioning the cursor on locations, symbols, geographic coordinates, place names, etc. on the current map display. The user can manipulate the cursor position on the map display with the mouse, arrow keys or other means in order to recenter the map display, causing it to shift or pan laterally to a new location centered on a different latitude and longitude. In summary, the "GET POI" operations at 319 include user options to add, delete and rearrange the POI input list along with shifting or recentering the map display on the current POI. Users can also opt for zooming down to a closer map scale for a more detailed perspective or zooming up or out to get a more global outlook covering larger territory. IRMIS utilizes such flexible and intuitive capabilities to zoom among map scales or shift across digital maps, seeking POI input, with map generation and cartographic database technology as disclosed in the David M. DeLorme U.S. Pat. Nos. 4,972,319 and 5,030,117. The user can also shift, or recenter, map displays to locate POI inputs by entry of telephone numbers, zip codes, street address information and other located or locatable data. IRMIS provides several textual or graphic methods for the user to get POI input by means of selective commands and procedures made available at step 319. The system also enables the generation and modification of lists of POI inputs by various methods for database searching and sorting well known in the art of computer programming.

In a typical usage of the system, the multimedia mode of operation of the invention is invoked at C, deploying the command and user option arrangements illustrated in FIG. 3. POI inputs are transferred and transformed within the interaction block 207 into the multimedia subsystem 209 in the form of a list of POIs found in proximity to a route previously computed, as revealed at 303 and detailed hereafter in relation to FIGS. 5, 6A & 6B. Step 303 deals with output from a previous operation of routing, transferred from the routing subsystem and transformed into multimedia input for processing, subject to the user options and command organization shown in FIG. 3. In this fashion, the user is enabled to selectively experience multimedia information about locations and points of interest along the way or within a user-defined region around, i.e., circumscribing an optimal route already computed. Steps 309, 315 and 325 enable the user to return to and modify the previous route or travel plan output with changes typically based on the user's responses to an intervening IRMIS system multimedia presentation.

FIG. 3 illustrates the commands and user options made available to users upon startup or recycling of the multimedia mode of operation of IRMIS. Through 301 and C, the user can make a completely fresh start on a pure multimedia process, proceeding to get and locate POI input by a great variety of means at step 319. Step 319 is also available for users to get or revise multimedia input for amendment of one or more pre-existing POI lists. Recycling of a preexisting list of POI input through C can involve pure multimedia inputs, generated without reference to routing. As presented for multimedia processing at 303, data transformed into multimedia input from previous routing output illustrates POI input in the form of an amendable or modifiable preexisting list that is not pure multimedia. Rather, it derives from and is combined with previous routing operations.

The user can opt for a selectable multimedia presentation on any single POI input of his or her choice at step 305, described further in relation to FIG. 7 hereafter. Such Show/Tell One operations unfold from E, as shown in both in FIG. 3 and FIG. 7. After or in the midst of such multimedia presentations about a single POI or location, the user can return to C, typically in order to add or cull one or more POIs as just experienced in multimedia to or from his or her travel plan. The user can also prompt further presentations of located multimedia information which vary in form, media or level of detail as detailed hereafter. Similarly, at 307, FIG. 3 depicts user options and commands for multimedia presentations on a total list of POIs. Step 307 Show/Tell All functions proceed from reference letter F, as disclosed hereafter with respect to FIG. 8A. The user is also able to return from the midst or conclusion of a Show/Tell All operation to C in order to browse the multimedia command set and user options in FIG. 3.

The system also enables the user to prompt multimedia presentations about a selected fraction of one or more POI input lists, i.e., Show/Tell Certain POIs by various methods such as concatenating individual Show/Tell One operations, or by means of searching for POIs of a predefined type or by sorting POIs as related to characteristic data.

For example, the system routing and multimedia utility presents the user with at least four predefined types of POIs: (1) Points of Interest, i.e., tourist, recreational and cultural attractions; (2) Hotels; (3) Campgrounds; (4) Restaurants. Thus, the hungry user can search for multimedia input on places to eat only, while the tired user can employ well known database sorting techniques to focus upon multimedia information about places to stay for the night e.g. Hotels and Campgrounds.

The dialog box or organized set of commands and user options in FIG. 3 also facilitates initial transfer or return of ongoing operations to the routing mode as well as termination of the multimedia mode of operations in favor of some new or fresh operation or sequence of operations, or in order to exit the program entirely. The user options in FIG. 3 correspond to the 162 dialog box in FIG. 1-O and the 161 quick menu. Steps 309, 315 and 325 allow access to, and modification of, subsequent routing operations performed within the routing subsystem or block 205 revealed from a more general perspective in FIG. 2. Step 327 provides an exit from the multimedia mode. Step 327 corresponds to step 279 and partly to step 277 in FIG. 2. After exiting at 327 in FIG. 3, users can commence fresh operations, on the one hand, by starting anew in the routing mode, as detailed elsewhere in relation to FIGS. 2 and 4. On the other hand, exiting at 327, the user can begin a completely new or unprecedented multimedia operation, or sequence of operations, reactivating the multimedia mode at 301, and then proceeding through C in FIG. 3.

At 309, in FIG. 3, the user develops or alters his or her travel plan or itinerary by attaching selections of multimedia, as experienced in a Show/Tell operation. Such travel plans or itineraries are composed in IRMIS in part by the attaching of multimedia information about places and locations to the underlying map display on which is highlighted previously computed optimal route output. FIG. 1N illustrates one example of such travel plan output, adorned with annotations, pictures, and graphic arrows concerning points of interest as selected by the user in response to multimedia presentations on those locations or POIs, generated by IRMIS preferred embodiment. Different, more advanced embodiments facilitate attachment and location of audio or video output, experienced in the multimedia mode, on digital travel plan outputs combining multimedia and routing as detailed elsewhere in this disclosure. Step 309 enables the user to transfer selected multimedia through M to be attached to an itinerary or travel plan, as depicted in FIG. 1N, by processes described hereafter in relation to FIG. 4.

In the lexicon of this disclosure, attaching multimedia refers to the process of picking, transferring and displaying multimedia about particular POIs or locations through the interaction block 207 for inclusion upon travel plan output at 265 with reference to FIG. 2. Attached multimedia can comprise text annotations about POIs with graphic arrows or pointers indicating the site or geographic location of specific POIs on travel plans in the form of map hardcopy or map display output on which one or more routes are highlighted, as shown in FIG. 1N. Other embodiments enable attachment of still or moving images, sound, and various other media to travel plan output. Though such multimedia attachments invariably modify the informational content of travel plans, the definitive feature of travel plans with attached multimedia is that the highlighted computed optimal routing component has not been altered by modification of the waypoint lists.

Instead, information about POIs, found along the way, is presented as a supplement or marginal note on a travel plan showing one or more optimal routes already computed as depicted in FIG. 1N. Thus, attached annotations or other selected multimedia about POIs or places, situated along the way or in vicinity of a precomputed routing output, constitute a preferred travel plan output format in cases where the user needs information on a travel plan about locations nearby one or more optimal routes previously computed. However, the user does not require a revised routing computation based on new waypoint input chosen by the user while browsing multimedia information about proximate POIs or locations.

Step 315 in FIG. 3 does facilitate transfer of POIs picked by the user, experiencing multimedia information about such POIs, over to the routing subsystem 205 to be transformed into a new, or modified, list of waypoint input in order to prompt a new, or a revised or recycled, routing computation as described relative to FIG. 4. In contrast to merely attaching prior multimedia information to travel plans by way of step 309, through step 315 IRMIS user is able to add or delete new waypoints and highlight a newly computed optimal route based on his or her experience of, interaction with and responses to multimedia place information. This new or altered highlighted route output can appear at the user's option without any supplemental information from the preceding multimedia added to the user's itinerary. The user can also opt to include annotations, or alternate selections from the prior multimedia, embellishing the resultant travel plan output, along with the optimal route encompassing new waypoint selections, based upon the user's multimedia experience. In sum, step 315 provides preferred travel plan output where the user wants a new optimal route computed in response to multimedia about new locations.

Steps 309 and 315 apply both to transfers of pure multimedia, as yet uncombined with prior routing, and multimedia already combined with routing, pursuant to step 303. In another form of expression, in the shorthand notation for sequences of operations presented above relative to FIG. 2, steps 309 and 315 enable routing operations subsequent to, and combined with, multimedia in accord with both of the following formulae: (1) M1, R1 C01=; and (2) R1, M1, R2=C02.

In the two fairly simple examples just formulated, step 309 or 315 each is interposed right after M1 to transfer data from the operation M1 into the immediately ensuing routing operation. The first formula represents a case of output from a pure multimedia operation M1 transferred through step 309 or 315 for subsequent processing in the routing subsystem. The second formula represents a transfer of an output from a combined sequence of routing (R1) and multimedia (M1) via step 309 or 315 to become input for one further routing operation (R2). The invention can facilitate more complex combinations and sequences of multimedia and routing functions in order to produce combined output e.g. C01 and C02 that incorporates and reflects the user's responses to, and interaction with, the flexible technology.

In FIG. 3, step 325 enables users to return to the routing subsystem 205 to modify parameters on which a previous routing computation was based. For example, as one possible response to a multimedia experience derived from previous routing at 303, the user can elect to go back to the routing mode by way of step 325 in order to prompt computation of the shortest rather than the quickest route, or to shrink or swell the user-defined region around the route from which POIs are extracted, as described in more detail in relation to FIGS. 4, 5, 6A and 6B. Of course, such selection criteria are fully adjustable by user from within the routing mode. Step 325 provides the system user with a quick return from the multimedia mode or subsystem 209 for a corrective readjustment of routing computation parameters or the distance from a route or set of waypoints within which POIs are recovered as potential input for subsequent multimedia. This is a convenience to the user when a list of route-related POIs as provided in step 303 is far too long or far too short.

The user can quickly enlarge or diminish the user-defined region around the route, or alter the manner in which the route is computed, in hopes of generating a POI list of a more useful size as potential input for multimedia. For example, suppose no hotels or eating places turn up as POIs along a particular stretch of highway, step 325 then lets the user go right back to the routing mode or subsystem 205 in order to calculate a more local route along which he or she can hope to find food and lodging. Or, the user can readjust the system selection criteria to prompt the system to search for hotels and restaurants at an increased distance from the exits off the major highway. Readjustment of the radius or area searched for POIs is also detailed hereafter in relation to step 467 in FIG. 4.

FIG. 4

FIGS. 4A, 4B, and 4C are assembled to form the flow chart referred to hereafter as FIG. 4. FIG. 4 is a flow chart illustrating the processes and user options included in the routing mode of a preferred embodiment of IRMIS. The system is a component software travel planning tool which combines multimedia and routing. FIG. 4 relates to the operational sequences, data transfers and user controls implemented by way of the Manage Route dialog box depicted at 138 in FIG. 1G. The user can access this suite of tools, commands and processes, invoking the routing mode of operations, by calling up the Manage Route dialog box on top of a portion of the map display which pervades the computer screen in typical applications of the system.

FIG. 4 illustrates the specific user options and processes embodied in IRMIS corresponding to the routing subsystem 205 shown at a more generalized level in FIG. 2. FIG. 4 also depicts pathways for input/output data transfers to and from the multimedia operating mode, as shown at 403. Connectors A, M and N comprise the pathways or channels which facilitate the combining of multimedia and routing operations in various sequences at the user's option, as described in relation to FIG. 2 and in other places in the specification disclosure. In the vocabulary of this disclosure, FIG. 4 illustrates both pure routing, i.e., routing uncombined with multimedia and operations yielding combined output at step 453 which result from an integrated succession of multimedia and routing software functions. Because step 453 handles both pure routing output and output combined with previous multimedia, step 453 in FIG. 4 corresponds in part to step 265 and embraces step 259 in the more generalized FIG. 2.

In FIG. 4, processing commences and is recycled through H. The user activates the routing mode at step 401, in order to start a fresh routing operation, for example. Thus, step 203 in FIG. 2 corresponds to step 401 in FIG. 4. Pathway 403 shows how the user can transfer from the multimedia mode to subsequent routing operations in order to transform the output from previous multimedia operations into new or revised waypoint input for one or more succeeding impure routing operations, i.e., routing that has been modified by the user in response to preceding multimedia operations. Therefore, pathway 235 in FIG. 2 is analogous to pathway 403 as shown in FIG. 4. Path 403 stems from step 315 in FIG. 3.

In FIG. 4, steps 406, 409, 411, 413, 415, 417, 419, 421, 423, 425, 427 and 429 comprise the waypoint entry module in which the user can engage a suite of commands in to add, clear, delete or insert waypoints or routing input. The specific process for waypoint input shown here in FIG. 4 corresponds to the more generalized step 231 in the FIG. 2 Block Diagram. The user is also able to access waypoint input commands while in the multimedia mode, in order to provide for immediate transfer of POIs to become input for new or recycled routing operations. As portrayed in the FIG. 2 block diagram at 211, 213, 217 and 219, a user can access commands and options betwixt and between the routing 205, interaction 207 and multimedia subsystems. For clarity in this disclosure, however, waypoint input operations are presented as prompted and executed within the routing subsystem.

In FIG. 4, steps 406 and 409 mean that the user can opt to exit from or close the waypoint input module. Like virtually all operations embodying the invention, waypoint input is achieved on top of a computer map display, which becomes part of the waypoint input interface, as described hereafter. In the lexicon of this disclosure, waypoints are route input items including one point of departure, one final destination and, optionally, one or more intermediate loci entered in order of travel. Waypoints are highlighted as input with inverted green triangle symbols on the map display as shown at 147 in FIG. 1G. As entered, waypoints also appear on a list in the order to be encountered on the intended journey, as shown in the Manage Route dialog box illustrated at 138 in FIG. 1G. The list of waypoints arranged in planned order of travel in the Manage Route dialog box corresponds to step 411 in FIG. 4. The user works in the waypoint entry module or command suite until he or she elects to close the function at 406 and 409, or to compute a route at 433, or to transfer waypoint input through 431 in order to experience selected multimedia information about the waypoint locations and nearby places.

Consistent with methods for the management of ordered lists well known in software, the module for waypoint input enables the user to add one or more waypoints to the end of the waypoint list at 413, clear all waypoints at 415, or delete one or more waypoints at 417. Routing requires at least a starting place and a destination, i.e., at least two waypoints. Step 419 recycles empty or single item waypoint lists for further input to meet this requirement. Step 421 facilitates the insertion of one or more new waypoints at places chosen by the user between or before other waypoints on a preexisting list. In this way, the user can amend a waypoint list starting out from Boston going to New York City by inserting Hartford en route. Or, the user can insert Los Angeles or Mexico City as intermediate stops or places to pass through on his or her planned trip departing from Boston and ending in New York City. After specific waypoints have been cleared, deleted or inserted, steps 423 and 425 implement those changes by rearranging the current waypoint list in accord with the user's revised or amended order of planned travel.

Even entry of a fresh waypoint list can cycle several times through H while the user is engaged in revising his or her initial input. Moreover, the waypoint entry module also enables the user to edit and alter a waypoint list from which an optimal route has already been computed and displayed. In such cases, a user adds, deletes or inserts waypoints relating to a previously computed route. Then steps 427 and 429 function to clear away the old route display, anticipating a new route computation that will incorporate the user's new waypoint list based on revision of the old waypoint list.

The system enables input and alteration of waypoint lists by means of an array of list based locating tools that can search zip code, phone exchange and place name indexes, as shown in FIGS. 1D, 1E and 1F. The map display recenters on new locations thus selected by the user. Also, the user can employ graphic/cartographic means for the selection of waypoints and related manipulation of the map display. For an example, users can choose waypoints by pointing and clicking upon symbols or place names or at specified pixel locations on the digital map display which correspond to geographic coordinates of places or objects situated on or adjacent to the earth's surface. Graphic, intuitive waypoint input location is further facilitated by capabilities to zoom amongst map scales and detail levels as well as panning or shifting to recenter the map display upon a different place or set of geographic coordinates.

In alternate embodiments of IRMIS and enhanced commercial versions, routing or waypoint input can encompass airports plus flight paths, bus stations and bus routes, railroad terminals and tracks, subways and other urban transit systems, offroad vehicle travel, trails for bicycles, hiking and other pedestrian paths as well as oceanic, coastal and inland shipping channels, also boat launches, portages and river passages for canoes or rafts, plus other commercial and recreational transport and travel means. Even more generalized point-to-point routing more or less "as the crow flies" over rasterized or digitized computer maps can be added. The present system is applicable to a broad range of point and vector data structures familiar in the routine arts of geographic databasing and digital cartography including but not limited to the foregoing specific input/output formats for waypoints or POIs as detailed in relation to FIGS. 5, 6A and 6B.

The system technology is designed to take user travel planning requirements into account. Waypoint inputs are ordinarily structured. First on any waypoint list is a single point of departure. By definition, waypoint lists end with one final destination. In between, stops and places to pass through picked by the user are arranged in the order of intended travel. Thus, a first waypoint list consisting of Boston, Hartford, New Haven and New York City is not the same for example as a second waypoint list which calls for leaving Boston, going to New Haven, then Hartford, on the way to New York City. Waypoints are input in an ordinal or serial data structure which is a representation of the user's intended order of travel: (1) first, the starting place; (2) second, initial intermediate waypoint; (3) third, next stop or waypoint; N-1th intermediate waypoint; and Nth waypoint, final destination or end of planned journey. Intermediate waypoints are optional, of course, but get entered in a specific order corresponding to the user's intended itinerary. Even before any computation of the optimal routes between a set of waypoints, waypoint input is already arranged in a data format descriptive of the user's overall planned itinerary.

In enhanced versions, step 431 facilitates the transfer and transformation of ordinally structured waypoint input data over through the interaction subsystem 207 into the multimedia subsystem 209 so that the user can browse multimedia information about the input waypoint locations. Transformation of the waypoint input into the POI or multimedia input format is involved, as detailed hereafter in relation to FIGS. 5, 6A and 6B. Step 431 in FIG. 4 approximates pathways 233 and 241, as shown in FIG. 2. Step 431 in FIG. 4 concerns waypoint input only, in advance of any routing computation based on said input. Step 471 transfers output from subsequent routing computations for multimedia exposition. Step 431 further enables the user to intelligently refine his or her current waypoint list by prompting and experiencing selected multimedia information on chosen waypoints. In response to such multimedia information, the user can return to the waypoint input module via 403 to make informed choices about waypoints to keep or delete and the order of travel.

This disclosure confines the term routing output to output from computation and display operations at steps 433 through 453, as detailed hereafter. Waypoint input operations, transferred to multimedia via step 431, still qualify nonetheless as substantial routing steps or operations for purposes of making up a valid set of routing and multimedia operations combined in sequence within the inventive technology. This is because ordinarily structured waypoint input can be distinguished from random location data, or even from a list of POIs selected manually by the user or from a database search based on personal interest or links to specific topics or subject-matter. Waypoint input describes the user's point of departure, planned stop-overs or intermediate waypoints and ultimate destination in order.

By contrast with an alphabetical list of regional hotels, or a handpicked list of the user's favorite type of resort, the rudiments of a travel plan or itinerary are presented in the standard waypoint input structure consisting of a list of locations ordinarily arranged in order of planned travel. For sequences of operations employed in this disclosure, waypoint input entered in such an ordinal data structure does qualify as a substantial routing operation. Therefore, the expression R1, M1=C01 can describe an operation of waypoint input succeeded by a related multimedia presentation which produces output shaped by the user's interaction through the combination of substantial routing and multimedia functions.

In the simplified embodiment of IRMIS the user can choose to browse one or more of the following lists: (1) Points of Interest, i.e., tourist or cultural attractions; (2) Hotels; (2) Campgrounds; and (3) Restaurants. Alternative embodiments incorporate a broader range of well-known techniques for storage, retrieval and correlation of geographic or cartographic data. For example, customer and sales prospect information can be stored in a relational database linking geographic locations with various personal, business and financial data. Such a database would be useful for diverse sales, service, delivery, property survey and security functions, particularly to prepare travel or route plans with multimedia digital photos of valued prospects or real estate. Utilizing such a relational customer database, sales force personnel can evaluate and locate prospects and established accounts needing a sales call, then extract the pertinent street addresses as waypoint input in order to prompt computation of an efficient, comprehensive route for making a round of sales calls.

Similarly, service and delivery personnel can plan their work for the day or the week on the road. Appropriate databases can help identify prime properties or security trouble spots. Real estate or security agents can input the street addresses or other location identifiers from the database in order to compose a waypoint list as input for the computation of an optimal route encompassing the properties of interest to the agents. With the waypoint list at step 411 and the background map display, alternate embodiments of the invention incorporate a variety of well-known databasing methodologies in order to enable the user to design, implement, output and further process diverse searches for waypoint input. In like fashion, waypoint lists can be memorized and recalled for later use or modification.

Such service and delivery personnel will find the IRMIS PDA and/or PDA/GPS devices particularly useful. After using the IRMIS desktop for more complicated client and/or address list processing, and one or more iterations of related route-planning, the delivery or sales call route(s) for the day or week can be selected, refined, compacted and transferred to compatible portable IRMIS PDA or PDA/GPS devices, as detailed particularly relatively to FIGS. 2A and 5D–5F in this disclosure. Then, the sales or service workers can take the IRMIS PDA or PDA/GPS device—loaded with one or more sets of map, route and/or point information, along on the road, e.g., for route guidance. Moreover, the portable IRMIS devices can be used in the field to track actual paths of travel, to mark locations, and/or for point information annotations, which data as recorded at remote locations can be transferred to the IRMIS home-base desktop for further display and processing, as detailed herein particularly relative to FIGS. 1A3 and 2B.

Step 411 and the map display interface also facilitate the processing of canned or prepackaged sets of waypoint inputs in addition to individual ad hoc waypoint input lists made by users planning personal travels in the waypoint entry module. Thus, the present invention enables processing by the user of prepared lists of particular types of museums or recreational facilities, for example, with database links to the pertinent street addresses or other location identifiers such as latitude/longitude. The user may purchase such digital lists of potential waypoints on software media e.g. diskette, CD-ROM, PCMCIA cards etc. as a data accessory for use in the system. Such prepackaged lists of waypoint inputs can also be downloaded via modem from another computer or a central service bureau. Such pre-recorded lists include sets of business or residential names and addresses linked to certain financial or demographic data. Alternatively, an off-the-shelf travel plan might include a recommended list of waypoints for a selected region or user interest. Utilizing the waypoint entry module, the user can then modify or personalize and customize such prerecorded waypoint lists. To assist with the task of individualizing a canned list, the user can invoke step 431 to consult selected multimedia information concerning the predefined waypoints, nearby resources and attractions.

In FIG. 4, steps 433, 437, 438, 439, 440, 441, 443, 445, 449, 450 and 452 comprise the routing calculation or computation module including related user adjustments and options, corresponding to steps 245 and 211 in FIG. 2. As implemented in steps 433, 437, 438 and 439, such routing computations generally involve known methodologies or processes for the manipulation and calculation of geographically situated data in the form of vectors, line segments, networks, nodes, or other sets of geographic points which represent specific transportation systems or permissible routes. These methodologies facilitate computation of optimum routes or pathways in relation to the temporal order of planned travel or movement through space in spheres of human activity on or near the surface of the earth. Such processes or algorithms for the calculation of optimized routes may take into account factors such as the physical structure of transportation routes, legal and customary rules of the road or other transport systems, estimated or allowed travel speed, available transportation modes, schedules and connections, traffic, obstacles, currents, weather and other advantageous or limiting conditions.

For example, the July 1994 release of the MAP'N'GO (TM) 1.0 on CD-ROM included a preferred embodiment of the invention, in the form of a travel planning utility, which computes quickest, shortest, or other preferred or optimal routes along major auto roads and selected car ferries. This embodiment represents the available routes as certain line segments on map displays which are drawn between the routable geographic points generally termed "nodes". The MAP'N'GO (TM) 1.0 travel planning utility treats the following geographic points as possible waypoints or nodes: (1) major road and highway intersections; (2) the junctures or turning points of connected line segments representing the major auto roads and highways; (3) place names situated right on major auto roads and highways; and (4) POIs located on or immediately adjacent to the major roads or highways. To facilitate and speed routing computations in this embodiment, every possible waypoint or routable node is stored in the IRMIS database on the CD-ROM in association with a list of all immediately adjacent nodes and the precalculated distance thereto. The July 1994 MAP'N'GO (TM) 1.0 travel planning utility computes optimal routes between selected and ordered lists of nodes or waypoints employing routines based on the Sedgwick-Vitter algorithm disclosed in James A. McHugh, *Algorithmic Graph Theory* (Prentice Hall 1990) pp. 107–108. This embodiment permits the user to adjust parameters for the routing computations, such as speed settings and preferences for/against certain road types as disclosed hereafter. The present technology works, however, with other transport system databases, various types of routes and definitions of routable nodes as well as alternative routing algorithms and adjustable parameters.

As shown in FIG. 4, new or recycled routing computations follow input, recall or alteration of a particular waypoint list including a selection of routable nodes which are arranged in an ordinal array according to the user's intended itinerary or order of travel. Provided with input of at least two waypoints, including one point of departure and one destination, step 433 enables the user to select and execute various routing computation options. The system facilitates the following alternative route computations: (1) Quickest, i.e., the route estimated to take the least time to travel between entered waypoints, even if over a longer distance on faster roads (step 437); (2) Shortest, i.e., the route which is the least distance in the actual miles or kilometers, etc. one must travel even if the route takes more time to travel on slow roads (step 438); and (3) Preferred, i.e., the user can select various road conditions or types to favor or avoid, such as toll roads, forest roads and routes involving car ferries (step 439). The Manage Route dialog box, shown in FIG. 1G, facilitates user choice among the foregoing criteria or variables for routing computations.

The Manage Route dialog box in the July 1994 MAP'N'GO (TM) 1.0 travel planner embodiment also provides access to a Preferred Routing dialog box, shown in FIG. 1H, enabling the user to favor or avoid the following road types: limited access roads; toll roads; national highways, primary state or provincial roads; lesser state and provincial roads; major connectors; forest roads; and ferries. The Global Speed Setting dialog box in FIG. 1I enables users to adjust the estimated or expected speed of travel on each the foregoing road types in response to user preferences or expectations with regard to a leisurely pace or need for haste, weather, traffic, construction or vehicle problems which the user might anticipate.

In FIG. 4, steps 440, 447, 449, 450, 452, and associated paths relate to the menus or dialog boxes which enable users to choose various routing computation options such as Quickest or Preferred routes as illustrated in FIGS. 1H and 1I. Whenever the user elects to alter such routing computation variables, IRMIS loops or returns the user to the connector H in FIG. 4 thereafter, giving the user a chance to modify the waypoint list content or not. Then, the user can go to step 433 to implement the altered routing computation. When the user chooses a new routing computation option, for example to avoid one or more types of road in step 443, then step 447 determines whether there is any current route display needing to be cleared away or removed in step 452 before returning the user to H. Steps 449 and 450 administer similar display housekeeping chores in the cases where the user opts to adjust the speed on certain road types in step 441 or to favor selected road types in step 445. In other words, if the user modifies parameters for routing computation in step 440, after any necessary clearing of old displays in step 452, the user is returned to step 433 through H for execution of the new form of routing computation, with its new criteria for routing e.g. Quickest instead of Shortest route. The system defaults to computation of the quickest route through step 433 in the absence of the user picking another parameter. Steps 438 and 439 reflect routing computation options or variables elected by the user through step 440.

Other embodiments of the system provide further parameters or options for optimal routing computations. Scenic routes can be identified in the database of highways, roads and other modes of transport such that a minor routine modification of the overall routing algorithm program then enables the user to prefer roads and transport which afford natural vistas and ample opportunities for sightseeing. Similarly, enhancements to the route database can address highway width, clearance and load factors such that the routing algorithm, with minor alterations, can output travel plans suited to the specialized requirements of truckers and heavy transport. Using programming techniques well known in the field of geographic information systems and digital cartography for managing located statistical data expressed in the form of map overlays, routing computations can be integrated with databases relating geographic locations with a broad range of situated conditions. Thus, users of the present invention can choose an optimal route computation which prefers or avoids high crime areas, particular environmental or weather conditions, residential versus industrial or rural as opposed to urban areas, even geocoded demographic or economic factors, provided the embodiment is linked to the appropriate databases.

Steps 453, 455, 457, 459 and 461 in FIG. 4 constitute the module for routing output and display including pertinent user options and adjustments. Insofar as no multimedia is combined with routing, step 453 corresponds with step 259 in FIG. 2, i.e., routing output only. But, to the extent that prior multimedia operations and outputs are mixed or combined with a specific routing operation through path 403, steps 465 and 467, then step 453 in FIG. 4 parallels step 265 in FIG. 2. In such cases, step 453 produces output from combined multimedia and routing, mediated by user responses and interaction, involving at least one preceding multimedia operation integrated with at least one ensuing substantial routing operation. For example, a prior multimedia output can get attached to otherwise pure routing output through step 465. Such attached multimedia selections typically include a marginal annotation or digital image with an arrow symbol or graphic pointer indicating a pertinent location on the map display as illustrated in FIG. 1N.

For another example of combined operation output at step 453, path 403 facilitates the user transferring POI data from the multimedia subsystem 209 through the interaction subsystem 207 to become new waypoint input, either expanding or shortening the current list of waypoint inputs. Any resulting routing computation and its ensuing output at step 453, which are based on this new list of waypoints, therefore incorporate the user's responses to and interaction with the preceding multimedia transferred to the routing subsystem 205 via path 403. Relative to route output/display at 453 in FIG. 4C, IRMIS embodiments preferably provide users with some control options or command means (dialog boxes, menus, keystroke sequences, . . . etc.) in order to select various outputs or output combinations. Thus users can select levels of detail, various map printouts and displays, text directions, lists of attachments, supplemental information on POIs, audio and/or graphics. At 463, users can additionally or alternatively command IRMIS electronic digital output: e.g. (1) transferring map, route, and/or point information into an IRMIS PDA interfacing the IRMIS desktop—for portable use in the field; or (2) transmission of IRMIS output to other computers. IRMIS invention further facilitates transfer of point information, like multimedia on POIs, to portable IRMIS devices from the IRMIS desktop or home-base. Such map, routing and/or point information can be used on one or more IRMIS PDA devices (with or without GPS).

Figure 6A:
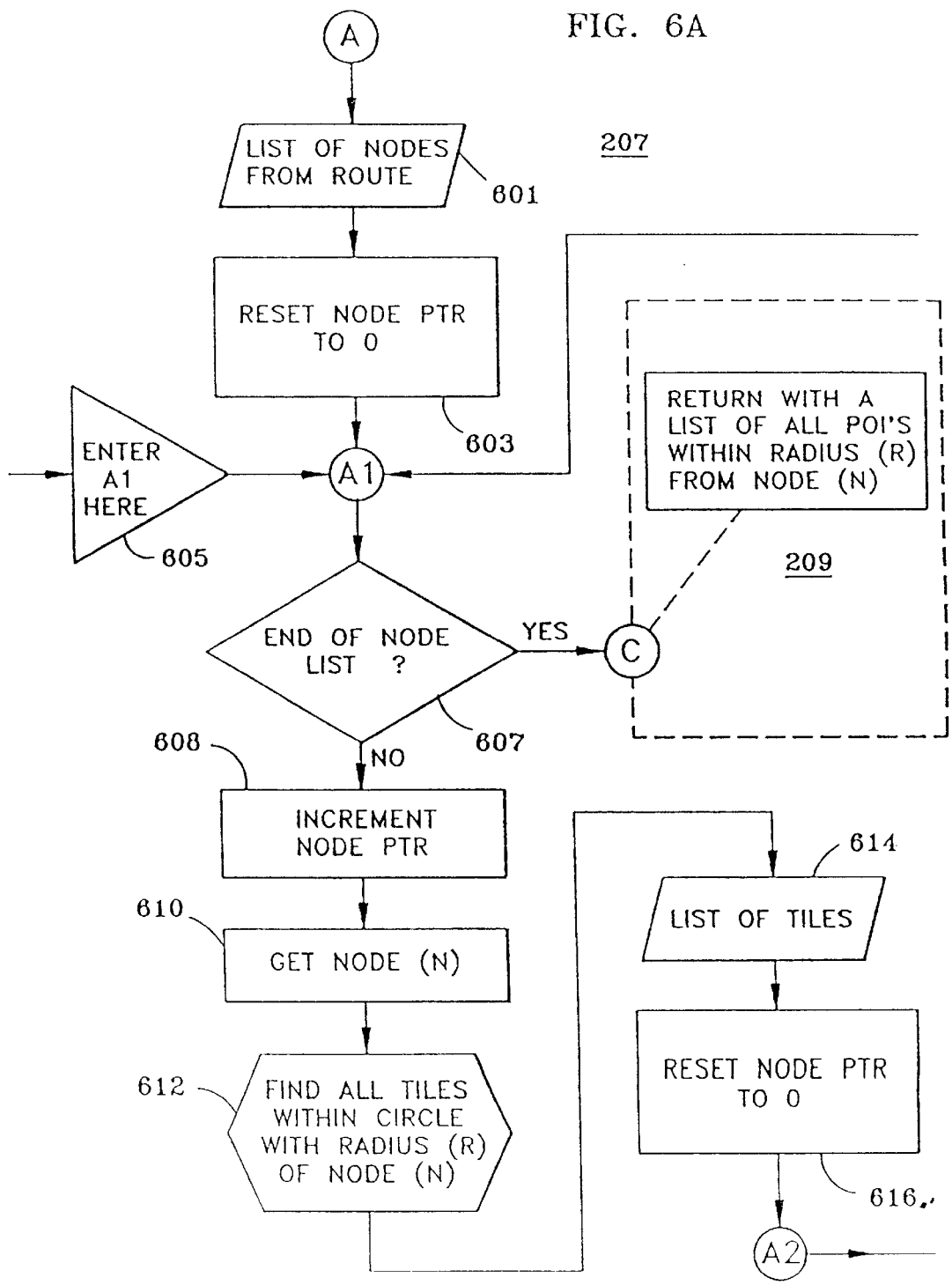
FIGS. 6A and 6B are assembled to form a flow chart showing the operational steps of IRMIS for transforming a routing waypoint list or list of nodes of a selected route into a list of points of interest within defined areas along the selected route.
Figure 6B:
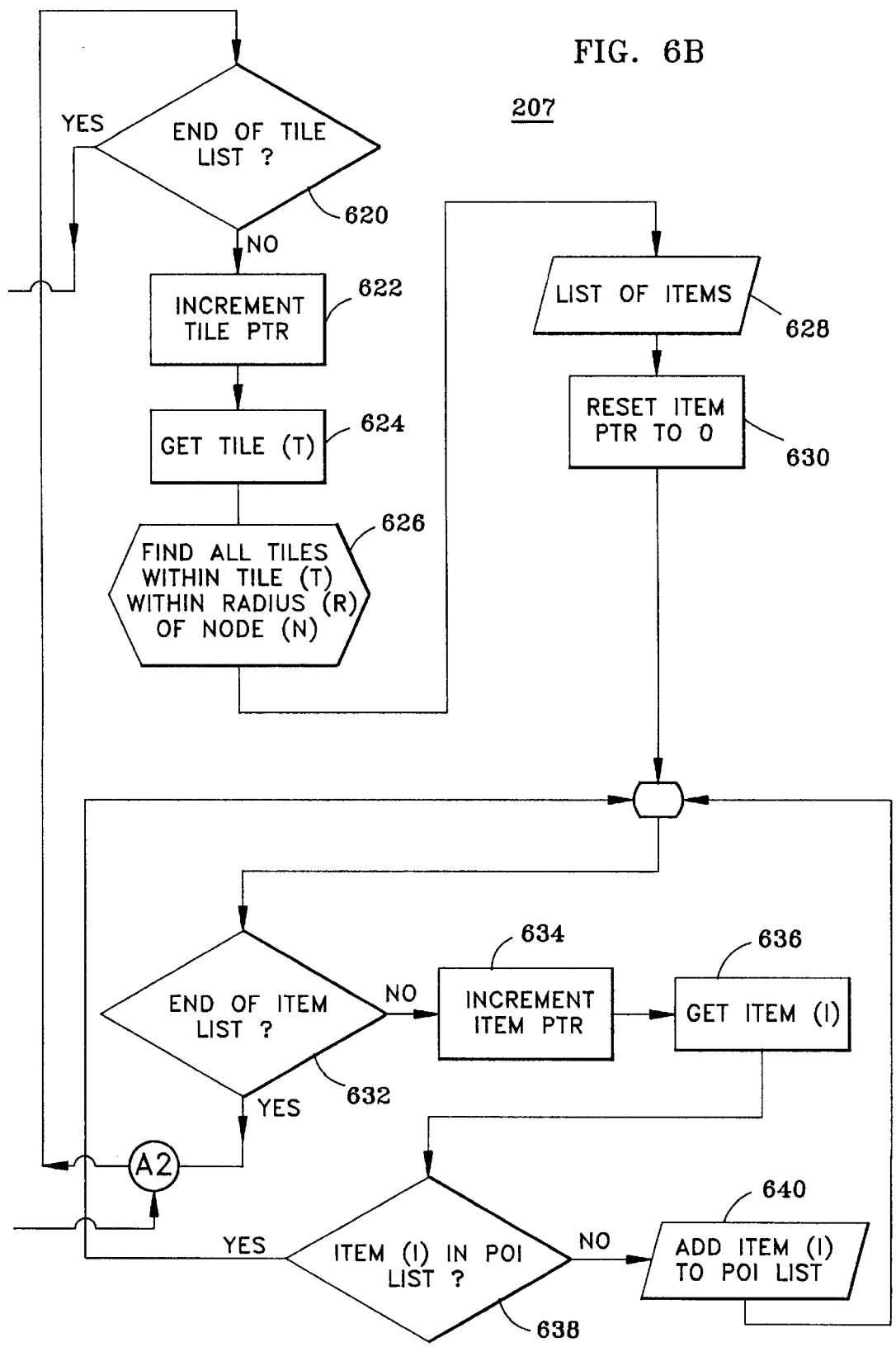

As described hereafter in relation to FIGS. 5, 6A and 6B, step 467 in FIG. 4 readjusts the radius or, more generally, the size of the area around intersections or nodes along a computed route within which the travel planning utility looks for POIs as topics for multimedia presentations. This technical process of resetting the geographic area to be searched for multimedia POIs comprises a substantial multimedia operation for combination with routing insofar as readjustment of the radius or POI search area impacts on a map display also exhibiting route output. Resetting the radius or the size of the region searched for POIs impacts on route display/output substantially whenever it causes POIs to be added or deleted from the map display and the related POI list as detailed in relation to FIGS. 5, 6A and 6B.

Steps 455, 457, 459, 461, and 463 enable the user to choose among formats for the routing display/output at 453 in FIG. 4. These steps correspond with the more general options for mixed or pure routing output available to the user in steps 215 and 211 in FIG. 2. As shown in FIG. 4, the user options selected through step 455 are controlled through dialog boxes, menus, text commands and other routine user interface technologies. Step 457 enables the user to prompt route output in the form of a voice or text list of waypoints presented in planned order of travel with or without verbal or literal travel directions and other located information associated with items on the waypoint list. Step 457 also allows the user to opt for such audio or text output either in conjunction with or in lieu of the map display or visual route output.

For example, while driving, the user of an in-vehicle embodiment can turn off the map display as an unnecessary visual distraction, using step 457 to retain spoken output about waypoints, route directions as well as other located audio information pertaining to places along the way. Step 457 also permits simultaneous audio-visual output, for example, so that the driver can listen to audio output about his or her travel plans while a passenger is also looking at the highlighted route and other information on the map display as illustrated in FIG. 1P. Step 457 further permits turning off the audio output so the driver and passenger can listen to music or converse while the passenger keeps an eye on the visual map/route display. Further details on audio/visual options for multimedia output, which can be combined with routing output at 453, are disclosed in relation to FIGS. 7, 8A–8E. Software control of IRMIS output/display format and/or contents on portable IRMIS devices, based on GPS/route variables, is further described in relation particularly to IRMIS FIG. 9.

Accessed through step 455 in FIG. 4, step 459 offers user options and controls related to combining multimedia selections with routing output by attaching text, numbers, visual images or sounds or voice. As earlier stated, attaching multimedia refers to processes whereby selected information about locations gets included with map output, but without changing the waypoint input list. For example, the system attaches annotations in the margins of standard strip map travel plan output, as shown in FIG. 1N, with graphic arrows indicating related locations on the background map. A typical text annotation includes the name, address and phone number of a cultural event or attraction: e.g. "Pole-O-Moonshine State Park U.S. Route 9 (518) 834-9045". An arrow stretches from the box containing the text in the margin of the map, pointing out this park's location in Keeseville, N.Y. over on the map portion of the travel plan in FIG. 1N.

Such text annotations can attach a broad variety of data and information to map locations including historic facts, environmental data, personal commentary, demographic, economic or political intelligence, news, even ads, jokes, folklore or fictional accounts relevant to the particular location and potentially of interest to the user. By its nature, however, attached information provides supplemental information about places or objects located on or near some pre-existing route display/output. In the example above, the state park is not made a new waypoint, i.e., it is not treated as a new waypoint input. Rather, the location of the park is pointed out near or along the route display with supplemental information about the park presented in a marginal text annotation. Attach "buttons" are shown for Hotels and Restaurants in the 154 and 156 dialog boxes in FIG. 1L, also for campgrounds in the 158 dialog box in FIG. 1M.

The present invention facilitates other forms and methods to attach information about locations. For example, to enhance a hardcopy travel plan for making sales calls on the road, step 459 facilitates attaching digital photos of sales prospects beside marginal notes detailing their name, personal interests and past purchasing history. This located information aids the user not only to find sales prospects' locations but also to recognize the prospects' faces, remember names and create a more effective and personable impression. Similar attached photographic imagery proves useful with various travel plans: (1) photos of landmarks as navigation aids; (2) digital pictures of drop-off sites, loading docks and other shipping terminal facilities to aid truckers and other delivery personnel; (3) images of industrial facilities, homes, buildings and land as seen from the road to enhance travel plans for real estate surveys, private security, public safety, etc.; and (4) attached digital photos enhance scenic or sightseeing travel plans. FIG. 1N illustrates attached digital photos of people and property. Attached images of faces, places or other located content are not limited to still digital photo imagery except in hardcopy output. The system enables attachment of videos, extensive alphanumerical text or voice information about places or POIs, or situated music or natural sounds to map/route displays and electronic output.

Along with the marginal note or image box format, attached material can be accessed by clicking the cursor on an appropriate symbol located upon the map/route display. Attached visual and audio material related to the place picked by the user can then be played selectively on the full screen, interrupting the map display for a brief or lengthy time period, at the user's option. In the alternative, the user can attach multimedia selections about locations appearing in windows superimposed upon map/route displays as illustrated at 162 and 165 in FIG. 1-O. These can also be printed out in hardcopy covering portions of the underlying map, as well as in marginal notes or accessible alternative screens.

Contrasting with attached multimedia, step 461 in FIG. 4 facilitates combined map/route displays and output whereby the locations or POIs selected by the multimedia user do become new waypoint or routing inputs. In effect, step 461 enables the user to choose a routing display/output format which adds, deletes or inserts POIs selected by the user in multimedia using the module for waypoint input. Instead of just attaching multimedia information about places along a pre-computed route, step 461 causes entry of locations picked by the user in response to multimedia as new waypoint input. Step 461 reformulates the current waypoint list by recycling operations through H. Unless the user chooses otherwise, new waypoints are inserted after or before the closest old waypoint in accord with the user's old order and direction of travel. This new waypoint input in turn prompts a new route computation through step 433 resulting in a corresponding new route output at step 453. Step 461 provides a preferred means for combining routing and multimedia output in cases where the user desires or requires computation/output of a new optimal route based on a new revised waypoint input list including or eliminating locations according to selections by the user made in response to his or her experience of multimedia concerning those locations.

The quick menu box at 161 in FIG. 1-O, for example, enables the user to add, delete or insert waypoints in response to multimedia information about locations. Steps 457, 459, 461, and 463 implement concurrent or overlapping map/route display/output options. In other words, for example, the user can elect to have step 459 attachments as well as a new waypoint list as provided in step 461. In the alternative, attachments without any new or revised routing or waypoint input, or a new route based upon altered waypoint input but without attached multimedia, are also valid options. In sum, the display/output adjustments provided in steps 457, 459, 461, and 463 can be toggled on/off independently.

Whatever the format and content of a step 453 route output/display, step 471 enables the user to transfer to the multimedia mode from said routing output/display. Thus, any route output or display can be combined with subsequent multimedia, typically in order for the user to gather more information about an emerging travel plan and the places on his or her itinerary. Consistent with the objective of facilitating flexible sequences and combinations of routing and multimedia operations, the user can eventually return from playing multimedia selections after such a transfer from step 453 through step 471 in order to work on further routing operations, returning via path 403, step 465 or step 467. Transfers through step 471 entail transformation of routing data into a multimedia format, as detailed in relation to FIGS. 5, 6A and 6B.

The IRMIS invention preferably manages more geographically extensive and data-processing intensive multimedia and/or routing operations on more powerful, desktop, home-base or central dispatch IRMIS computers. Portable IRMIS PDA and PDA/GPS devices are put to work in remote locations with one or more selected, simplified and compacted IRMIS datasets preferably made on the IRMIS desktop. The IRMIS PDA and PDA/GPS devices can be used in the field to log travel paths, mark locations, annotate maps, or enter graphic or text information on geographic points or POIs, as well as for location information and route guidance. The route, point and/or map information so gathered on IRMIS portable devices in the field can be transferred into the home-base or central dispatch IRMIS desktop, then further processed as just described relative to FIG. 4. The transformation and transfer of point, route and/or point information between IRMIS desktop, home-base or service bureau platforms and said portable IRMIS PDA or PDA/GPS devices are further described in other parts of this disclosure, particularly relative to IRMIS FIGS. 2A–2B and 5D–5F.

FIGS. 5–5C

FIG. 5 illustrates cartographic data structures as seen on typical map/route display output in 501 in the upper left drawing. Underlying cartographic data arrangements, typically not seen by the user are shown at 526 (upper right), 551 (lower left) and 576 (lower right) of FIGS. 5A, 5B, and 5C. They are used in alternative embodiments of the present invention to interrelate nodes or routes with POIs found in one or more user-defined regions around an ordinal series of entered waypoints or along a previously computed route. FIGS. 5, 5A, 5B, and 5C help to explain how the present invention enables the user to transfer from substantial routing operations over into the multimedia mode to experience multimedia presentations about POIs or points of interest located within a certain distance of a previously computed route or input waypoint list. These figures reveal general geographical data formats whereby prior route output or substantial waypoint input is transformed into a list of POIs, situated around or along the previous routing output or waypoint list. Data transformations in this manner are done in anticipation of the user selectively playing multimedia information concerning the POIs on the resulting POI list.

Relative to other parts of this invention disclosure, FIGS. 5, 5A, 5B, and 5C sketch a framework for comprehending the data transformation involved in transferring operations from the routing subsystem 205 through the interaction subsystem 207 for added processing within the multimedia subsystem 209 as shown in FIG. 2. The result of such data transformations is a list of POIs, potential multimedia input, shown at step 303 in FIG. 3. Such data transformations are prompted by the user transferring from substantial operations in the routing mode through steps 431 or 471, as shown in FIG. 4. FIGS. 6A and 6B illustrate the data transformation process whereby ordinal waypoint input or routing output becomes a list of POIs found around or along the previously computed route or previously entered waypoints. FIGS. 7, 8A, 8B and 8C go on to show how the user can select and play multimedia about POIs or lists of POIs. With regard to the object of the invention to integrate multimedia and routing, FIG. 5 outlines the specific cartographic data structures and overall processes for the data transformation which facilitates prior routing operations being combined with ensuing multimedia operations.

FIG. 5 comprises one illustration of a map display at 501 as presented on screen to the user in almost all embodiments and typical utilizations of IRMIS. 501 is a simplified version of a typical electronic map with a computed route displayed by graphic accentuation, as illustrated in FIG. 1G. While such a map display might not be presented to users in some applications or episodes of use e.g. audio output only embodiments or full screen presentations of graphic images or alphanumeric documents about locations, multimedia and routing functions generally are accomplished by means of the cartographic and geographical information structures illustrated as typically displayed to the user at 501.

The illustrations at 526, 551 and 576 of FIG. 5A, 5B, and 5C represent alternative transparent arrangements of the basic data formats embodied in 501, demonstrating three variant methodologies for circumscribing POIs. At 526 in FIG. 5A, POIs are listed as retrieved within circles of a specified radius e.g. 538 centered on geographic points termed nodes, which are essentially road or highway intersections. At 551, a line buffer graphic data structure, i.e., an equidistant enclosure around a line segment at 561 encompasses POIs found along the route as represented by the line segment. At 576 and 588, one or more irregular polygons drawn manually by the user, or computed by another algorithm, serve to capture a particular set of POIs related to the antecedent routing data.

More specifically, 501 in the upper left of FIG. 5 shows a simplified map display. Such map displays appear on the computer screen serving as a graphic interface in practically all modes of operation and various embodiments of the present invention. The map display in 501 is centered upon a location named PLACE, for purposes of this illustration, situated in between SOUTH PLACE and NORTH PLACE, representing municipalities or parts thereof. As is routine in conventional map making and digital cartography, these entities are represented on maps by their names written on the map with the place name situated on the map in relation to its actual geographic location. Sometimes, place name labels on maps are visually associated with a located symbol, such as a dot or political subdivision boundaries or colored area on the map. No such graphic symbols are associated with the underlined place names in the 501 illustration, however, in the interest of a simpler drawing. Generally, place names comprise a particular cartographic data type. In the underlying geographic information system or database, specific geographic coordinates are linked to each place name. Storage, retrieval, manipulation and linkage of place names are done by means of well known list based, spatial, relational, and other database methodologies which are routinely used for management of geographic point types of data.

The present invention further employs such routine database methodologies in order to manage another geographic point type of data namely, the POI or point of interest. POIs appear on the 501 map display as boxed labels e.g. THING at 505. Each POI is placed upon the map display in relation to a certain latitude and longitude, or other set of geographic coordinates, related to a specific location on or near the surface of the earth. CAMP, EAT, POLICE and FUN also comprise POI names or labels upon the 501 map display. In consumer travel planning embodiments of the present invention, POIs typically represent accommodations and recreational attractions. For example, the July 1994 release of MAP'N'GO (TM) by DeLorme Mapping Company, Freeport Me. 04032, included the following predefined types or subtypes of POIs represented on the map display by various colored symbols: (1) Points of Interest, i.e., tourist, recreational and cultural attractions essentially symbolized by red arrows; (2) Hotels also, motels, inns, etc. symbolized by yellow diamonds; (3) Campgrounds symbolized by green triangles; and (4) Restaurants by blue circle symbols. Such symbols indicating the availability of multimedia information on certain types of POIs are illustrated at 157 in FIG. 1M, for example. For purposes of a simplified drawing, in FIG. 5, no such POI symbols appear on the map display shown at 501. On the 501 map display, EAT represents a Restaurant POI; FUN is a particular example of a Point of Interest type of POI; CAMP is a certain Campground POI; and HOTEL exemplifies a Hotel type or subtype of POI.

But, POIs are not confined to tourist attractions and travel accommodations. Alternative embodiments of the present invention handle a great variety of public facilities or infrastructures as geographic point type POI data e.g. POLICE as shown on the 501 map display. Located or locatable objects in geographical space can also qualify as POIs e.g. THING at 505 on the map display shown at 501. THING might comprise a fixed landmark of human or natural origin. THING might also comprise a moveable object such as a vehicle, another item of personal property, a migratory animal or species, a person on foot, or other non-stationary phenomena as currently known, estimated, or predicted to be at a particular location. POIs can also include intended locations such as the proposed location of a building, a place to meet, or the site of a planned event. The term POI or point of interest lower case encompasses extensive types of geographical point data identified with or related to located or locatable objects which can be input, described, depicted and accounted for in a multimedia database.

At 510, 512 and 514 in FIG. 5, waypoints comprise a third major type of geographic point data, in addition to place names and POIs. Waypoints is a term utilized in this disclosure for the starting place, ultimate destination and intermediate locations to stop or pass through on an intended trip. Such a waypoint list is a user selection and ordinal arrangement of the routable nodes or geographic point components of the transportation routes or modes of travel subject to routing computations in a given embodiment. To plan automobile travel on national highways and state roads, waypoints are typically defined in terms of road intersections or turning points in line segments or vector data representing routes customarily traveled by ordinary automobiles. For example, waypoints are defined in terms of road intersections and joints between the straight line segments used to represent normal automobile roads and highways in the routing and multimedia software travel planning utility included with the MAP'N'GO (tm) digital atlas of North America on CD-ROM, released by DeLorme Mapping, Freeport Me., 04032 in July 1994. Any place name is linked for purposes of system functions to the nearest node, i.e., road intersection or other juncture between line segments representing roads.

For various alternate embodiments, in order to address marine, air flights, off-road, pedestrian or other forms of transport and travel, waypoints are structured according to the physical and mappable characteristics of those other ways of going places. For example, travel by air involves available airports, private planes and commercial lines, safe and customary flight paths, terrain obstacles, etc., which become factors or building blocks for appropriate air waypoint data structures. Travel on foot is also constrained by legal and safety issues exemplified by sidewalks and crosswalks as well as issues of customary paths or trails and natural terrain limitations plus artificial obstacles, etc. Subways, buses and other public ground transportation systems and public or private marine travel also require waypoint data structures appropriate to the mode of transportation, taking into account factors such as available stops, stations, terminals or docks, regular routes, connections and schedules, human or natural obstacles, safe navigation practices, etc. Ordinary CARS and railroad travel are plainly confined to certain routes and tracks. Travel by air, foot and boat takes place in a more open spatial context still constrained, however, by customary or legal paths or channels and physical obstacles. In the FIG. 5 map display at 501, waypoints 510, 512 and 514 are structured as nodes coinciding with various intersections of ordinary automobile roads and highways.

In the 501 map display illustration of FIG. 5, nodes 510, 512 and 514 have been entered in that order as waypoints for a planned trip from SOUTH PLACE, through PLACE to NORTH PLACE. The resulting optimal route computation is being displayed or output by graphical accentuation or highlighting of the recommended route as shown by the fine dotted lines around the optimal route 503 on the 501 map display. This highlighted route is identical with the two-part line segment, representing the route, illustrated at 528, 553 and 578 in the 526, 551 and 576 drawings of FIGS. 5A, 5B, and 5C.

The 501 map display illustration further discloses a typical latitude/longitude grid system of horizontal latitude lines e.g. 507 and vertical longitude lines e.g. 508 visibly superimposed as a locational aid over the map display. Such grid systems also are composed in terms of alternate geographic coordinate systems, such as UTM, State Plane as well as proprietary or arbitrary grid systems used for particular map publications. Capital letters in conjunction with roman numerals that run across the top of the map display form a typical system for identifying or naming individual grids, as a visual user aid for a variety of common map interpretation, cross-referencing and indexing chores. For example, the POLICE POI is found in the C-IV grid.

Such grid systems may comprise more than just a visual user aid. The present invention is typically, though not necessarily, implemented in conjunction with a geographic information system, or GIS, which manages spatial data with reference to interrelated matrices of quadrangular grids or tiles constructed substantially parallel to lines of latitude or longitude. Map database systems of this kind are detailed and disclosed, for example, in the David M. DeLorme U.S. Pat. Nos. 4,972,319 and 5,030,117. Also, in U.S. Pat. No. 5,848,373. David M. DeLorme and Keith Gray inventors, titled COMPUTER AIDED MAP LOCATION SYSTEM.

Map database systems or GIS organizing geographic data in terms of tiles, quads, grids or frames present several advantages disclosed in the background art just cited. These advantages generally derive from breaking down the massive amounts of data typically involved in a state of the art GIS into discrete, identifiable, adjacent and related map tiles, quads, grids and frames to store, retrieve, manipulate and integrate geographic information. Rapid generation or redrawing of map displays, recentering or panning across seamless maps, zooming to closer or more outlying map scales, as well as the correlation of located data and the management of cartographic computations are all enhanced by such GIS which manage masses of geographic data in small quadrangular units.

Such mapping database systems do not necessarily display the underlying system of map tiles, quads, grids or frames which are used behind the screen by the software. For example, the user can typically turn grid displays or longitude/latitude lines off or on, off to de-clutter the display, or on for better map location and orientation.

In FIGS. 5A, 5B, and 5C, the drawings at 526, 551 and 576 illustrate three different cartographic data structures, used behind the screen, for the transformation from routing output or lists of waypoints into POI lists which function as input for subsequent multimedia operations. The 526, 551 and 576 drawings illustrate alternative methodologies, used in conjunction with the present invention, to capture POIs situated within some specified distance along or around previous routing output or waypoints listed in order of intended travel. The preferred embodiments of the system manage transformations from routing to multimedia data structures utilizing GIS or map databases that organize geographic data into tiles, grids, quads or frames. Illustrations 526, 551 and 576 each reveal the same behind the screen or underlying system of grids or tiles for efficient geographic databasing. To simplify these drawings, FIGS. 5A, 5B, and 5C show a behind the screen database system of map quads or frames which correspond exactly with longitude/latitude lines and the grid or tile naming system superimposed as a visual aid on the 501 map display of FIG. 5.

FIGS. 5A, 5B, and 5C also show POI data corresponding to the 501 map display. For example, the FUN POI in grid C-I upon the 501 map display appears circled as P-F in grid C-I in 526, 551 and 576. Similarly, THING at 505 corresponds to P-T at 536, 559 and 586. Other geographic point data are reproduced exactly from the visible 501 map display over into the underlying behind the screen data representation in 526, 551 and 576. Thus, starting point node 510 in SOUTH PLACE is the same as 534, 557 and 584 in the other three data representations. Elements 512, 530, 555 and 580 all represent the same mid-journey waypoint near PLACE. Likewise the end of the trip is shown at 514, 532, 556 and 582. Moreover, the two-part line segment, which is the highlighted route from SOUTH PLACE through PLACE to NORTH PLACE at 503, is reproduced exactly at 528, 553 and 578.

Reference numeral 526 illustrates the preferred technique of drawing a circle e.g. 538 around each node 534, 530, and 532 along a line segment or ordinal set of waypoints representing a planned route. These circles of a specified radius R at 541 define the tiles or quads within which the data transformation subprogram begins to search for POIs, as detailed hereafter in relation to FIG. 6A. For example, the circle drawn around node 530 prompts an initial search for POIs in the following grids: A-I, A-II, A-III, B-I, B-II, B-III, C-II and C-III. This preliminary search turns up three POIs found within the intersecting tiles: P-E=EAT; P-C=CAMP; and P-H=HOTEL.

As detailed hereafter relative to FIG. 6B, the next step within the routing to multimedia data transformation subprogram is to identify all the POIs, just found in intersecting tiles or grids, that are also found inside of the circle of radius R around node 530. In this case, this second step eliminates all three POIs just listed. But, POI P-F in grid C-I does fall within the circle of radius R drawn around node 534. In fact, using the 526 circle methodology, P-F is the only POI which gets on the POI list presented as potential multimedia input at step 303 in FIG. 3. To check for POIs in each of the three circles, the 526 methodology concatenates such searches of all the circles and sets of intersecting grids or tiles around a succession of nodes, as detailed in relation to FIG. 6A.

The 526 circle methodology is preferable for ordinal series of waypoint inputs transferred through step 431 in FIG. 4. Such waypoint input is transferred before the computation of an optimal route. Therefore, the optimal route between the entered waypoints is yet an unknown. For software simplicity, and particularly for conventional on-road automobile travel, the 526 circle technique is also preferred. On ordinary rural or urban automobile trips, the car and driver cannot turn off the road between nodes or road intersections and proceed cross-country or through city buildings and blocks to adjacent POIs. But note that the 526 circle method misses P-H or HOTEL in grid C-II adjacent to Rt. 66, which is likely accessible from the optimal route that it adjoins.

Other embodiments additionally or alternatively use the methodology pictured at 551 of a line buffer, i.e., a polygon enclosure which is drawn equidistantly at a specified tangential T distance all around a line segment. The line segment at 553 represents the optimal route between the nodes computed for the journey to NORTH PLACE, from SOUTH PLACE, through PLACE. Such line segments derive from routing computations, as detailed in relation to FIG. 4, expressed at step 453 as output from pure or combined operations performed in the routing mode. This 453 output then gets transferred via step 471 for ensuing multimedia operations.

The user-defined region outlined by the line buffer at 561 serves a similar function to the circles shown at 526. In other words, the 551 method begins searching for all POIs located in tiles or grids which intersect the line buffer region. Next, searching is narrowed to produce a list of POIs found inside the line buffer itself. Thus the line buffer methodology works with the steps detailed in relation to FIGS. 6A and 6B hereafter except for substituting the tangent T for the radius R. The line buffer technique does require extra code and algorithms for handling routing output from step 471 in FIG. 4, at least when implemented in addition to the 526 circle technique.

In FIG. 5B, note that the line buffer methodology did capture POIs at P-H in grid C-II, and at P-C in grid A-III, where the 526 circle technique missed these same POIs. The 551 method of the line buffer is therefore preferable in cases of POIs found between circles adjacent to and accessible to computed routes. The line buffer data structure is also preferable for ground vehicles capable of off-road travel as well as travel by air, boat or on foot, i.e., transport which can handle detours and side trips off-route between nodes. On the other hand, the method of circles shown at 526 is better for trips by rail or other transport which stops only as scheduled at predetermined waypoints, without possibility of detouring or side trips off the beaten track.

FIG. 5C at 576 shows a third behind the screen data configuration for the transformation of routing output and waypoint input in lists of nearby POIs for subsequent multimedia presentations controlled by the user. Instead of a circle or line buffer, the 576 method employs a custom or irregular polygon 588. Such odd polygons can be manually drawn by the user, employing known technologies for graphic input, or derived from alternate algorithms for relating computed routes or specified waypoints to surrounding POIs. For example, in the 576 drawing in the lower right of FIG. 5, there is an irregular polygon at 588, shown by dotted lines, that results from an algorithm which combines a line buffer along a computed route as done in drawing 551 with a line buffer drawn along major intersecting routes out to a certain distance from the intended route. But, note this more intricate algorithm can capture both EAT=P-E and POLICE=P-P, which are some distance from the user's planned route, but readily accessible on Main Street. Such complex algorithms require more code and slow the routing to multimedia data transformation process.

Figure 5E:
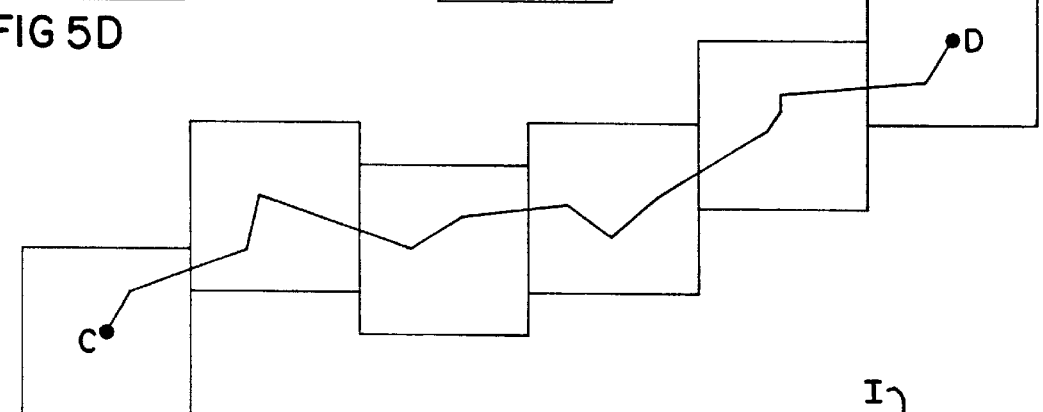
Figure 5F:
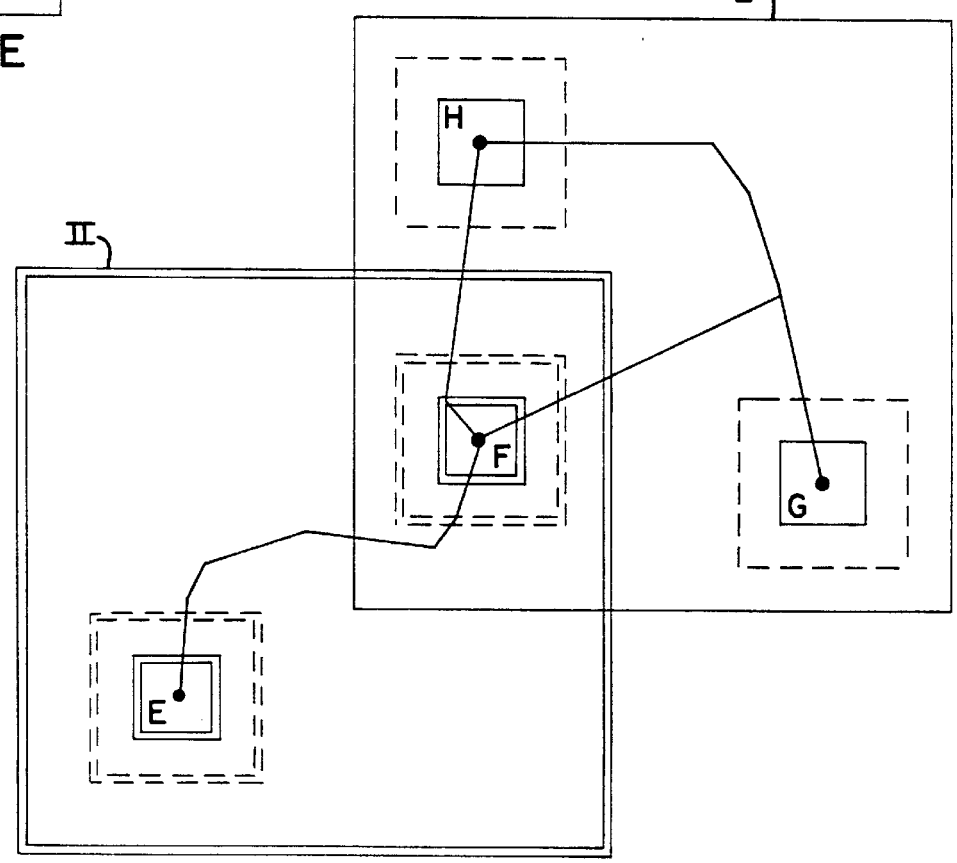

This more complex algorithm is a preferable methodology for applications where a more refined model of accessibility to POIs beside a planned route is desired. Complex multimedia/routing operations are preferably done on more powerful IRMIS desktop or central server computers, which are capable of accessing and quickly processing larger amounts of geographically related information. The IRMIS invention further provides that one or more compact, localized and non-redundant dataset(s) can be selected and "cut" or refined from map, point and/or route information travel plan output as prepared on the larger IRMIS home-base desktop computers. FIGS. 5D, 5E and 5F illustrate the process by which such IRMIS datasets or information packages are prepared for transfer into and portable use upon IRMIS PDA or PDA/GPS devices.

By means well-known in the cartographic software field, map and related information subsets can be cut or extracted out of a GIS, or geographical information system database, for example, a map of an area around a point described by geographic coordinates or information associated with a particular lat/long. FIG. 5D further illustrates a state-of-the-art approach to cutting a set of map data around a starting point A and destination B along a route between. FIG. 5E depicts another approach to cutting or extracting a package of map tiles or quads along a route between C and D.

The IRMIS invention utilizes an improved approach to cutting or extracting useful, flexible, compact packages of point, route, and/or map information for use in portable PDA handheld devices, with limited memory. As illustrated in FIG. 5F, the user takes advantage of the IRMIS invention to compute and enhance a travel plan from point E (e.g. Boston Mass.) to point F (e.g. Portland Me.). When instructed to make a PDA package or dataset, the inventive IRMIS program first assembles a lower magnitude or greater scale map with less detail encompassing E and F., shown in FIG. 5F as II. Next the IRMIS invention captures at least one lower scale, or higher magnitude map, providing more detail and a closer view, around points E and F. Preferably, such detail maps around the start and finish points are on the order of four (4) magnitudes of resolution greater than the overview map, providing a closer view and more information per square mile. Alternatively, the IRMIS invention can also assemble one or more even closer scale maps of the cities at each end of the planned route. The two or more added levels of closer view and/or greater detail maps are represented by the double-dotted line and solid dotted line boxes or map tiles around E and F.

Recreational and business travelers typically make and pick overlapping travel plans, as shown by the intersection of I and II in FIG. 5F. With F as a destination, users are motivated to plan day-trips, client visits or other excursions from F out to H and/or G in I. IRMIS therefore cuts or extracts added map, point and route information package(s), including differential scales or magnitudes, around H and G to be used in the PDA component at locations remote from the desktop—according to the improved algorithm described in the previous paragraph. F is the primary destination or "hub" city, for which the user typically selects more point information. Scarce memory and processing resources on the PDA are saved by further steps in preparing the multiple travel plan dataset or "package" for the PDA. Duplicate records and information in the overlap between I and II are eliminated—so that the PDA is not burdened with two redundant sets of maps, directions, other route information and point information about city F and its immediate surroundings. Other data compression techniques well-known in the art of PDA programming can further conserve PDA resources. Tags or cross-references are inserted in the I and II "sub-packages" or overlapping datasets, in order to facilitate seamless transitions, map movements, and handling of POI queries in the vicinity of city F.

FIGS. 6A through 8E depict routing/multimedia operations which are preferably performed upon IRMIS desktop or home-base platforms with their larger computing power and access to more extensive geographically-related databases. Moreover, the route-related multimedia presentations described relative to FIGS. 6A–8E, while advantageous for travel planning, are not essential operations on the IRMIS desktop in the preparation of travel plan output from which map, route and/or pint information datasets can be cut for use on portable IRMIS PDA or PDA/GPS devices. Portable information packages or datasets, according to the present IRMIS invention, preferably are cut from desktop IRMIS travel plans comprising map, route and/or point information concerning at least one starting pint and one destination on a proposed, computed or actual route of travel. The present IRMIS invention can further comprise information recorded on PDA or PDA/GPS devices at remote locations in the field. For example, users of portable IRMIS PDAs can make annotations about geographic locations and travel routes; and IRMIS PDA/GPS devices facilitate marking locations, tracking or logging "breadcrumbs" or series of points representing actual travel paths, plus date/time/lat-long stamping of user annotations and/or digital photos made in conjunction with the PDA/GPS. Thereafter, such information gathered on one or more portable IRMIS devices can be transferred into the IRMIS desktop or central dispatch system for further processing or display. For example, such information can be used to update real estate, security service, sales/delivery route, etc. databases; such information can be used to display a historical record or replay of part or all of an actual trip; and/or such information can be incorporated within the IRMIS desktop GIS database for use in future travel planning or multimedia/routing operations and presentations.

FIGS. 6A–6B

FIGS. 6A and 6B illustrate the steps whereby IRMIS transforms routing output or a waypoint list into a list of POIs. In relation to FIG. 2, such transformations take place in the interaction subsystem 207. Waypoint lists are transferred via path 233. Pure routing output is conveyed through path 261. Routing output combined with prior multimedia becomes involved in the processes depicted in FIGS. 6A and 6B by way of path 267 in FIG. 2. In relation to FIG. 4, these same transfers pass through connector A as also revealed in FIG. 6A. In FIG. 4, waypoint input approaches A by means of step 431. Pure or combined routing output is delivered to A via step 471. FIG. 5, particularly the drawing of the circle methodology at 526, provides background on the cartographic data structures involved in FIGS. 6A and 6B.

FIG. 6A shows the bounds of the interaction 207 and multimedia 209 subsystems with dotted lines and reference numbers corresponding to FIG. 2. The processes shown in FIGS. 6A and 6B transpire more generally within the FIG.

2 interaction subsystem 207. FIGS. 6A and 6B work together via connectors A1 and A2. The FIGS. 6A and 6B data transformations culminate at C as seen in FIG. 6A, corresponding with step 303 and C in FIG. 3.

A typical episode of usage of the processes depicted in FIGS. 6A and 6B commences at A. Step 601 comprises a node list from the routing mode. The 601 node list consists of waypoints ordinarily arranged in order of travel along the route coming either from the waypoint input module through step 431, or through step 471 from the routing output module at 453 in FIG. 4. For a new list of nodes fresh from routing, step 603 initializes the overall transformation process.

As detailed hereafter, further processes explained relative to FIG. 6B loop back through A1. Moreover, in an alternative embodiment, the user can enter A1 at 605 in order to process canned or prepackaged node lists offered as data accessories. A1 at 605 also provides access for the user to recall lists of nodes representative of ordinal waypoint input or routing output from memory or from a database process. Unless processing of a list of nodes for a route between an origin and a destination is complete, step 607 leads to the processing of the next node. After processing of a list of nodes for the route is complete, it passes through 607 and C to the multimedia mode. Steps 608 and 610 get the current node ready for the subsequent search for POIs.

FIGS. 6A and 6B search for POIs utilizing data structures depicted in FIG. 5 particularly the circle methodology sketched in FIG. 5A at 526. As depicted at 201 in the FIG. 2 block diagram, the present invention preferably works in relation to a geographic information system (GIS) or a mapping database system which manages massive amounts of cartographic or located information through use of tiles, quads, frames or grids. The grids comprise quadrangular units of geographic data stored, retrieved and processed relative to particular geographic coordinates. At step 612, a circle of radius R is drawn around the current node as a first step. Step 325 in FIG. 3, connector N and step 467 in FIG. 4 show procedures whereby the user adjusts or resizes the radius R. The parameter 563 in FIG. 5B indicates an analogous, adjustable parameter or criteria, namely the line buffer tangent T, which is also variable at the user's option in order to modify the size of the user-defined region searched for POIs. Next, in step 612 in FIG. 6A, all tiles touched by the circle are identified and listed in 614 for further processing in FIG. 6B. Step 616 does the housekeeping chore of setting up for further sessions of tile gathering around subsequent nodes.

FIGS. 6A and 6B connect through A2. In FIG. 6B, by way of step 620, the determination is made whether the subprogram now at work has processed all the tiles from the list at step 614 in FIG. 6A. If finished with processing a given set of tiles, as touched by a specific circle, then the train of software steps is looped back up through A1. If still more tiles around a node and on a list do need processing, then step 620 directs functioning to steps 622 and 624 in order to get the current tile. Items is the term used in FIG. 6B for individual POIs as found within first within tiles and then within circles. In effect, step 626 sorts the larger list of POIs found within intersecting tiles and extracts a short list of POIs found within the relevant circle of radius R centered on the current node. Said short list of items or POIs is then produced in step 628. Step 630 initializes this short list process. Step 632 determines whether work on the 628 item list is complete, in which case operations look back up through A2 to 620. Steps 634, 636, 638 and 640 function to place new items on the POI list and to avoid any duplication of items on POI lists such as can result from overlapping circles around close nodes.

Overview: FIGS. 7, 8A–8E

Figure 7C:
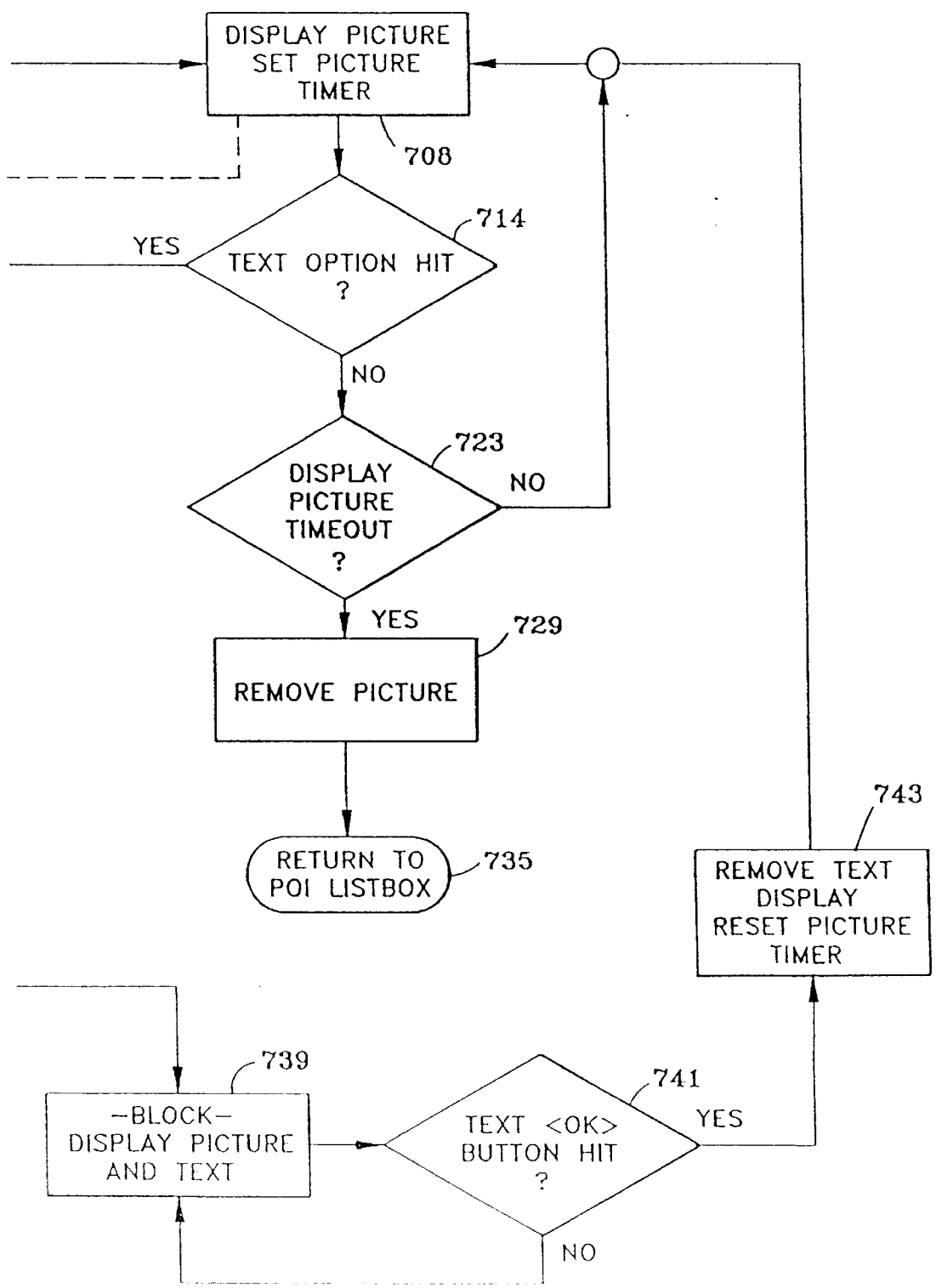

FIG. 7 assembled from FIGS. 7A–7C and FIGS. 8A–8E illustrate the flexibly organized suites of user controls and commands as procedurally structured and made available on the multimedia side of IRMIS. Consistent with the object of facilitating user friendly capabilities for combining routing computations and multimedia about locations, the multimedia mode of the present invention offers the user many selections and ways to interact with the overall technology. In relation to FIGS. 7, 8B, 8C and 8D the specification details how users are enabled to selectively play available information about locations and situated objects picking among available audio modes e.g. voice, music, natural, or created sounds, graphic and pictorial images or alphanumerical text. The user can shape his or her multimedia experience by isolating these various media and topics of interest. Users are also able to mix and integrate multimedia contents and formats.

This flexibility and selectivity within the multimedia mode facilitates and enhances two major groupings of user interactions with the inventive technology, combining multimedia and routing. The first relates to user responses to the multimedia, choosing or deleting places or waypoints for ensuing routing operations. The second group relates to responses to the multimedia wherein the user picks, composes, edits or removes information related to geographic locations in various media and formats which then is attached to travel plan output. These responses are implemented through steps 309 and 315 in FIG. 3, which transfer both data and operations from the multimedia mode to the routing mode. In turn, these responses are combined with routing through pathway 403 and step 465 in FIG. 4. Relative to FIGS. 3 and 4, more details are furnished elsewhere in this specification on how user interactivity with located multimedia gets combined with routing computations and travel plan output by waypoint input list modification or the attachment process.

In relation to the more general FIG. 2 block diagram, the software structures and operations detailed hereafter referring to FIGS. 7 and 8A–8E are concentrated in the multimedia subsystem at 209. FIGS. 7 and 8A–8E and 8C detail processes as accounted for more generally in relation to steps 219, 255, 265 and 273 in FIG. 2. Moreover, FIGS. 7 and 8A–8E depict procedures which deal both with pure multimedia, i.e., with no prior routing and combined multimedia operations, i.e., which follow and incorporate data from prior routing operations. As detailed in relation to FIG. 3, the user can start playing multimedia about locations using the structures and operations shown in FIGS. 7 and 8A–8E and then go to the routing mode in order to compute an optimal itinerary for a trip to selected locations.

But, the structures and operations depicted in FIGS. 7 and 8A–8E and detailed hereafter are equally suited to play multimedia place information after and in relation to locations or POIs found along an optimal route or set of waypoints as derived from a prior substantial routing operation. The data transformation process, for deriving POIs for potential multimedia presentation from prior routing outputs or waypoint input lists, is described in relation to FIGS. 5, 6A and 6B elsewhere in this specification. As disclosed in relation to FIGS. 2 and 3, multimedia presentations are often combined with both prior and ensuing routing operations in typical usages of the technology. The system is designed to facilitate more or less complicated mixed sequences of routing and multimedia in which the user engages in order to develop and refine custom or individualized travel plans.

FIG. 7

The operations illustrated in FIG. 7 commence through E at step 702. The connector E is also shown in FIG. 3, after step 305, which more generally represents the interface engaged by the user to prompt and manage Show/Tell One multimedia information about a single selected POI or location. In the initial release of MAP'N'GO (TM) 1.0 by DeLorme Mapping Company, Freeport, Me., this interface is accessed by pushing a button called Show/Tell One in the Points of Interest system dialog box a.k.a. the POI Listbox illustrated at 148 in FIG. 1J and at 162 in FIG. 1-O. For an example, typically the user points and clicks on one of the POIs as listed in this dialog box and then pushes the Show/Tell One button in order to prompt multimedia about that particular POI. Relative to FIGS. 2 and 3, other methods are detailed for users to locate and pick multimedia POI input.

In FIG. 7, operations proceed from step 702 to both steps 704 and 706, which are implemented concurrently. The system defaults to available audio or pictures through steps 704 and 706. Audio output is played at 710, with volume and other variables controlled at 716. As delineated in FIG. 7, for the July 1994 release of MAP'N'GO 1.0 each POI in the database of multimedia is associated with no more than one audio output. This is typically a short travelog narration with background music. Likewise, no more than one picture is associated with any given POI typically a digital photo of a museum, a unique natural site, an hotel or a restaurant found at the POI location. Other embodiments of the system include multiple still or moving pictures and additional, selectable audio outputs. Thus, if it is all that is available in a Show/Tell One episode, then a sound recording plays to its end whereupon, the user returns at 725 to the POI Listbox. But, if a picture is available, then step 708 shows it for a preset adjustable period of time. Alternate embodiments of the present invention include multiple audio or visual images related to individual POIs. The user can browse, edit and arrange flexible multimedia presentations about a single POI through routine manipulation of such multiple audio or visual materials.

At minimum, in the July 1994 release of MAP'N'GO 1.0 every POI, for which there is information in the database of located multimedia, has one related text message. Typically, such a POI text message literally transcribes the optional audio travelogue narration. Variant embodiments include multiple textual documents linked to individual POIs communicating a broad range of information about the POI location in diverse alphanumerical formats. Examples include comprehensive demographic, historical, or environmental information about locations, commercial or personal data about parties located at residential or business addresses, running inventories or data tabulations pertaining to particular sites, and references to or excerpts from works of fact or fiction citing the location. The first release of the system software does provide detailed text information about rooms, amenities, prices, phone numbers, nearby attractions, etc. for an extensive selection of hotels, campgrounds and other overnight accommodations as illustrated in FIGS. 1L and 1M. As released in July 1994, MAP'N'GO 1.0 provides the Show/Tell One multimedia user access to such text displays as an elective option at 714 in FIG. 7. Alternate embodiments default to text output and extend the user options to focus upon specific topics or textual content by means of routine state of the art software text search technologies. Audio and visual images are "played" to accompany or substitute for text in alternate embodiments. IRMIS displays such text at the user's option 714 in step 712.

In FIG. 7, steps 718 and 720 illustrate user options and controls which enhance flexibility and selectivity of play in the multimedia mode. Dotted line boxes and connecting lines, as in 718 and 720 and between 708 and 718, represent user commands, options, and controls made available throughout a series of steps. Thus, for example, step 718 options are available all during any sound 710 or picture 708 show and any text 712 display as well as any combinations thereof. As shown at 748, 749 and 750, the slide control options at step 718 are essentially buttons of the familiar rewind, stop and fast forward types which let the user replay, halt or advance any presentation in any medium. More detail is provided on these slide control options relative to FIG. 8D.

IRMIS displays pictures or optional text for a preset, adjustable time period. Steps 723 and 727 measure whether this time period has expired and maintain the display of pictures or text until expiration of said time period. Step 720 extends this time period whenever the user elects to call up a dialog box in order to change display settings on the fly or otherwise adjust format or output options for ongoing multimedia. Consistent with overall invention objectives, these features let the user browse or sample multimedia information about a certain location with flexibility to dwell upon or review information of particular interest, or fast-forward through less interesting parts of a presentation. Moreover, a presentation gets extended or prolonged while the user is adjusting the presentation format or proceeding to attach selected POI information to his or her travel plan, or to select or deselect a POI as a waypoint, for purposes of subsequent routing operations. These flexibility features not only enhance the user playing the multimedia in the first instance. Selectivity in the multimedia mode further enables the user to focus upon particular multimedia in order to pick POI locations for transformation into waypoints, or to edit pictorial, text or audio travel information for attachment to travel plans.

Steps 729 and 731 remove or end display of pictures or text when the preset time period for display has expired. In the Show/Tell One module, steps 737 and 735 return the user to the POI Listbox, i.e., to connector C in FIG. 3. The user is also returned to the POI Listbox or main multimedia menu at the end of available recorded audio, or if the user employs the 718 slide control in order to stop an ongoing multimedia presentation on a single POI, at step 725. Step 739 presents a modal dialog box routine, in effect, asking the user "Are you done?" whenever a text and picture presentation are complete. At this point, the user can opt to select or delete the pertinent POI or the nearest node as a waypoint or to edit and/or attach multimedia information about the POI to an emerging travel plan. The user hits an OK button in step 741 in order to return through step 743 to step 708 where the picture display clock is restarted. Unless the user opts for a replay of the text option at 714, steps 723, 729 and 735 time out the picture and return the user to the POI list box as shown in FIG. 3 and FIG. 1J at 148.

As released in July 1994, MAP'N'GO 1.0 enables the user to choose between Show/Tell One, as detailed relative to FIG. 7, and Show/Tell All, as detailed relative to FIGS. 8A–8E. Alternate embodiments facilitate filtering a short list of POIs from a larger list of POIs, according to a wide range of criteria and methodologies available in the art of computerized management of lists. In other words, given an array of 50 or 500 POIs found along a route or from a coarse multimedia database search or from a canned or prepackaged list of POIs, alternative embodiments of the present invention facilitate automated sorting of the long list by obvious state of the art software techniques. The user can then concentrate the subsequent multimedia presentations on POIs of particular interest with specific characteristics. Users of alternative embodiments can distill, condense and refine long POI lists for more efficient multimedia presentation, using well known obvious technologies.

FIGS. 8A–8E

Figure 8A:
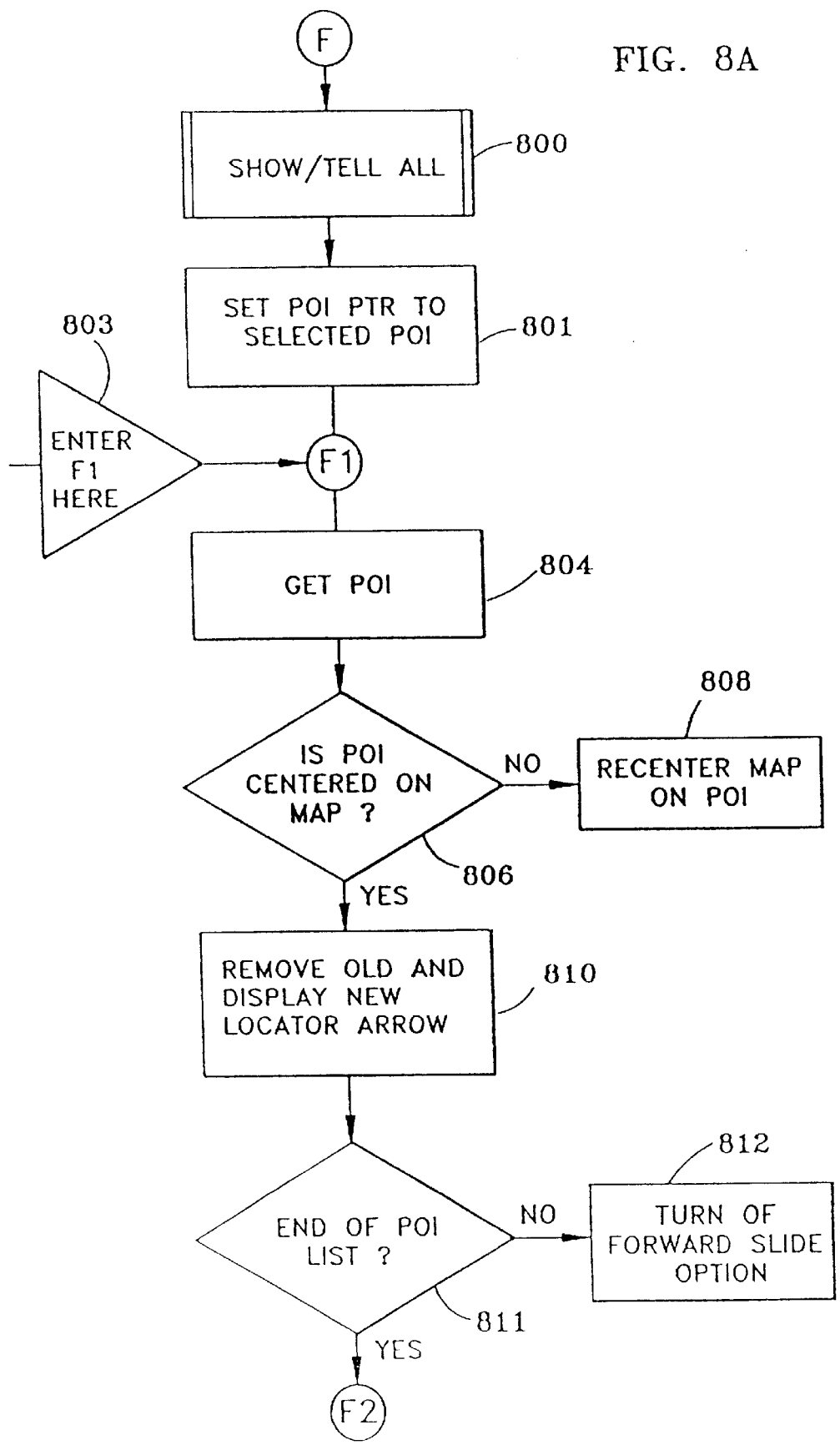
FIGS. 8A–8E further illustrate the flexible user controls and commands for multimedia related operations of IRMIS.
Figure 8B:
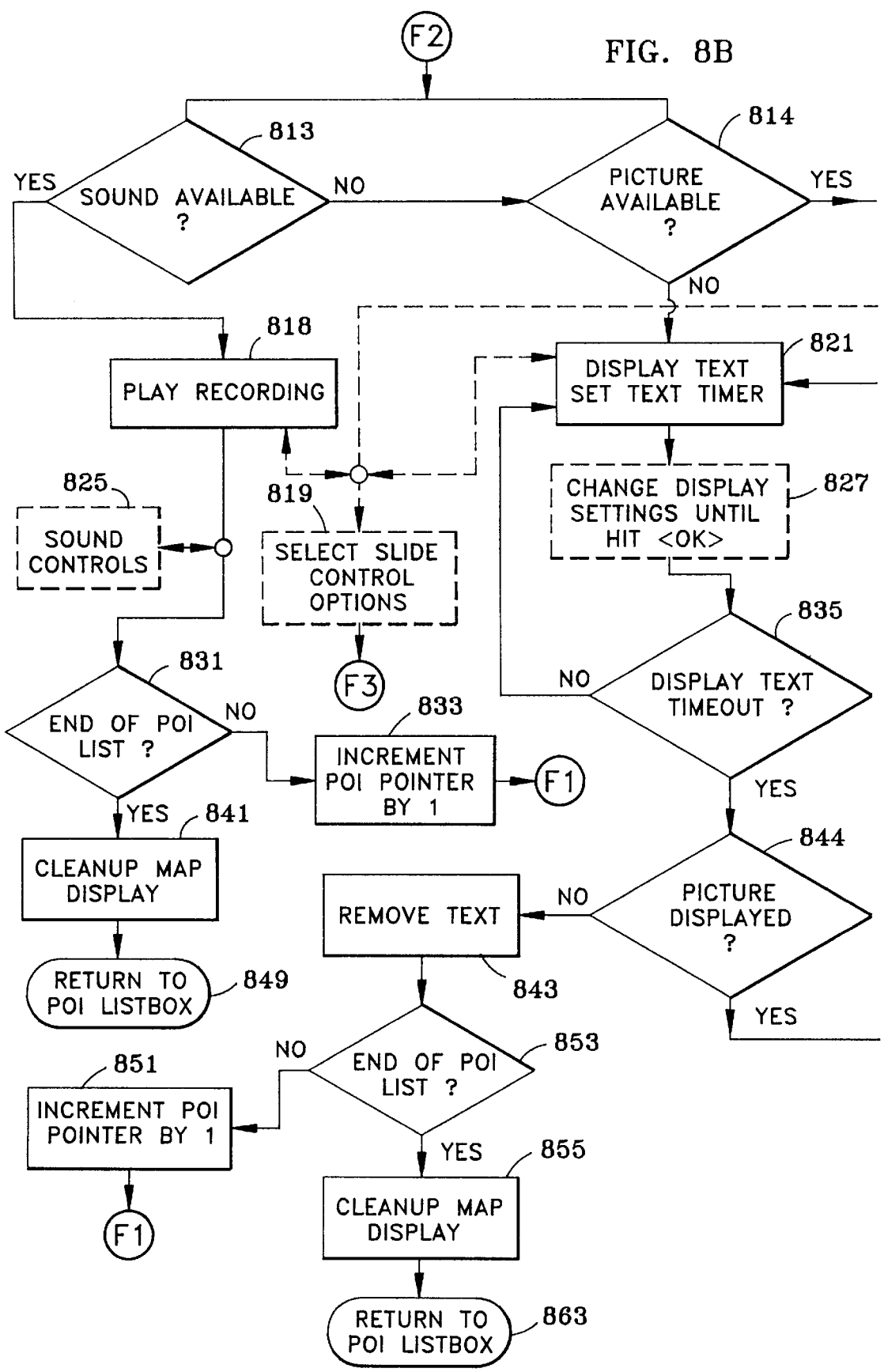
Figure 8C:
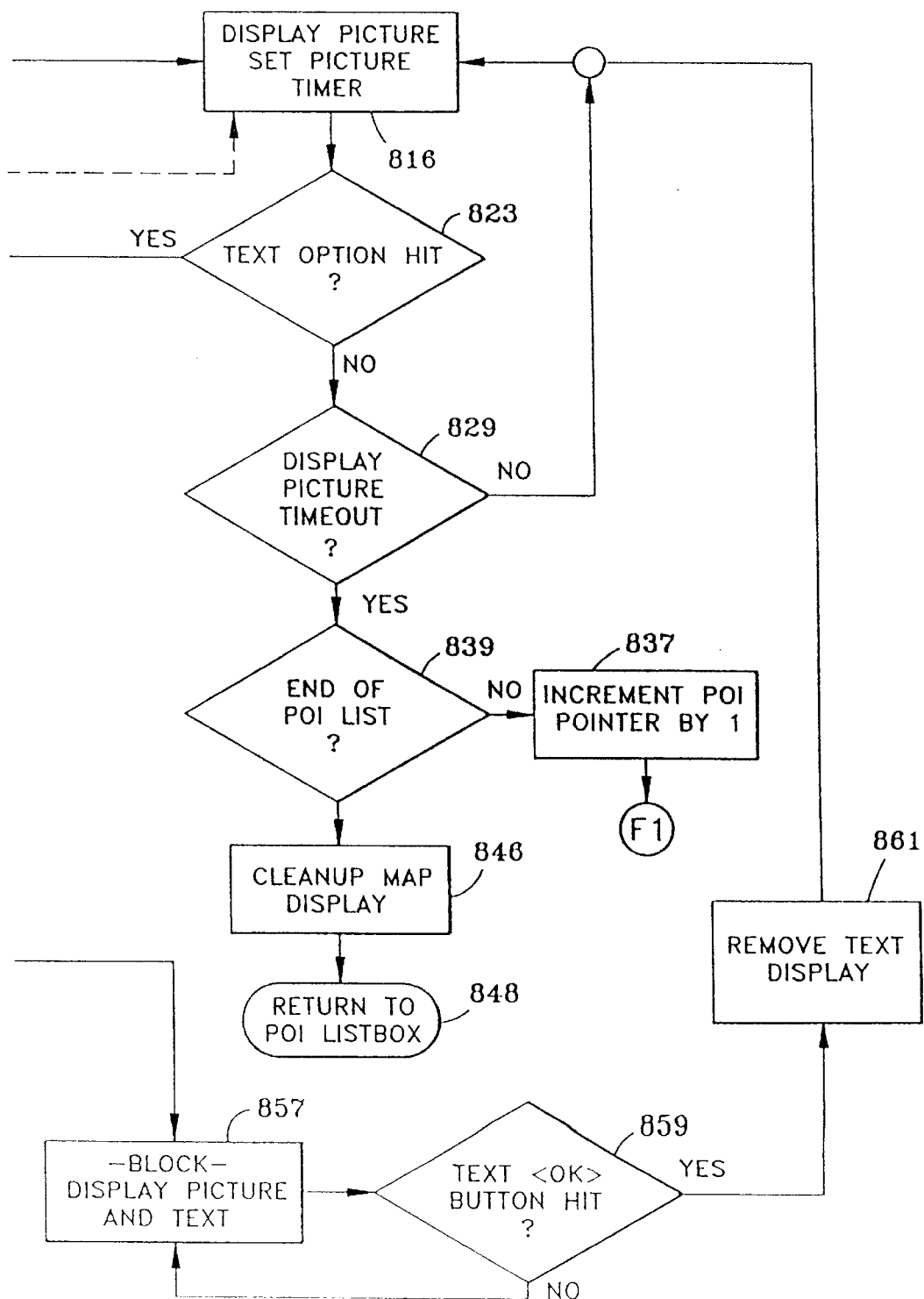

The Show/Tell All module illustrated in FIGS. 8A, 8B and 8C typically processes entire lists of POIs derived from substantial routing operations as detailed in relation to FIGS. 5, 6A and 6B. Alternatively, the Show/Tell All module processes POI lists as entered manually by the user or derived from a database search within the multimedia subsystem as detailed relative to FIG. 2. Show/Tell All handles entire lists of POIs from various sources such as: (1) lists of route-related POIs transferred from the routing subsystem at 205; (2) lists of pure multimedia POI input generated within the multimedia subsystem at 209; plus (3) lists of POIs derived from more or less complex prior sequences of combined routing and multimedia operations, as described with reference to FIG. 2.

FIG. 7 presumes the underlying map display encompasses or is centered upon the single pertinent POI. But, shown generally at step 307 in FIG. 3 and detailed in FIGS. 8B and 8C the Show/Tell All command prompts multimedia presentations about each item on an entire list of POIs. Depending on map scale and the distance between POIs, not all POIs on a given list necessarily appear on the map display serving as background and cartographic interface on the computer screen for practically all embodiments and uses of the present invention. FIG. 8A illustrates the process that automatically shifts or pans the map display, as required, to center upon the geographic coordinates of the POI currently the focal point of a Show/Tell All multimedia presentation.

The processes shown in FIG. 8A commence at connector F as also shown following step 307 in FIG. 3. Step 307 corresponds to step 800 in FIG. 8A. Step 800 presumes a current POI list of two or more POIs. Step 801 initializes the process depicted in FIG. 8A, setting a pointer on the first POI on the current list. This pointer is incremented in various contexts revealed in FIGS. 8B and 8C hereafter. In IRMIS embodiment, step 803 in FIG. 8A facilitates Show/Tell All operations looping back up and reentering at F1 for a new cycle of map centering operations each time the Show/Tell All module is ready to focus on the next POI on the current list. Step 803 serves further as entry point for series of multimedia presentations that commence at some user-selected point along a previously computed route or part way down a POI list in alternate embodiments of the present invention.

Step 804 fetches the next POI on the current list, i.e., the next POI which is about to become the focus or locus of a multimedia information presentation done in the Show/Tell All module. If the map display is not already centered upon or does not cover this next POI as determined in step 806, then at 808 the map display shifts or pans to re-center approximately on the geographic coordinates of said POI. For example, consider a POI list consisting of two items, namely offices located in Los Angeles and New York City. Assuming that Los Angeles is first on the list, step 808 redraws the map display to center on the New York City office just as the multimedia about the New York office is about to begin and right after multimedia about the Los Angeles site is completed or terminated by the user.

Even when the map display easily encompasses successive POIs on a given list, so there is no need to shift or re-center the map display, IRMIS indicates the current POI utilizing a characteristic graphic Locator Arrow on screen. Step 810 takes care of drawing such an arrow to the next or newly current POI. Step 810 further removes the Locator Arrow that pointed to the preceding or old POI.

Step 811 determines whether the current POI is the last item on the current POI list subject to a Show/Tell All command. If the process revealed in FIG. 8A has reached the last item on the current POI list, then the forward slide option or button is dimmed or turned off in step 812. Step 812 is a housekeeping matter. It makes no sense for the user to try and call for the next item on the POI list when the last item on the POI list has already been reached.

The process illustrated in FIG. 8A concludes at connector F2 where the Show/Tell All multimedia processes start as shown in FIG. 8B. With certain differences to accommodate processing of entire lists of POIs rather than singular POIs, the processes illustrated in FIG. 8B roughly parallel the software functions and structures revealed in FIG. 7. FIG. 8B depicts flexible user options and protocols for managing multimedia presentations about the current POI in an entire list of POIs.

From F2, the operations illustrated in FIGS. 8B and 8C proceed to steps 813 and 814 which are implemented concurrently. Although alternate embodiments of the invention might default to a text display of information about the current POI, the Show/Tell All command of the system prefers available sound or audio output and pictures or visual/graphic images. Available sounds, such as travelog narrations, are played at 818 from beginning to end subject to user control of audio volume, tone, etc. in step 825. In alternate embodiments, audio output calls for user interaction or responses. The audio output pauses and waits for an appropriate user response, proceeding apace if the user does not answer for a predetermined interval. IRMIS displays available pictures for a preset, adjustable time in step 816.

The MAP'N'GO (TM) July 1994 release automatically displays literal non-vocalized text as words printed typically in a window over the map display on screen only in the event that no sound or pictures are available relating to the current POI location. The interplay between steps 813, 814 and 821 demonstrate this logic. However, step 823 enables the user to opt for display of silent alphanumeric text information on screen, supplementing available pictures. This feature addresses the practical reality that, while audio-visual output is preferred for many consumer travel information embodiments, many users and installed systems lack sound cards and speakers. Moreover, though audio output is preferred as a rule for drivers alone who must keep their eyes on the road and instrument panel, under some circumstances, in vehicle users opt for having a passenger monitor literal text and pictures in windows on the map display, electing to turn the sound off to facilitate conversation or for enjoyment of silence or listening to music tapes or news on the car radio for example.

More important, like FIG. 7, FIGS. 8B and 8C illustrate interactive and articulated options and structures for multimedia output that are organized so the user can play, review, select, edit or merge location information in diverse media. Thus, the user can focus on informational content in accord with individual personal interests and preferences. In other words, unlike the background art, IRMIS is not limited to silent information in text format only. Nor is the system restricted to canned still digitized photos, related text or audio concerning sites in a general region, played from beginning to end without user interaction. The present invention facilitates the flexible play, selection, and manipulation of multimedia information focused upon individual POIs or specific user-selected lists of POIs.

Moreover, as depicted in FIGS. 7, 8B, and 8C within a multimedia presentation concerning a particular POI, the system embodiment enables the user to select, review and segregate portions of the available multimedia information with regard to both media and content. Thus, the user can concentrate on the available informational content that is of the most immediate interest, using the medium or media most convenient or useful under the circumstances. Otherwise stated, this capability for user-controlled, flexible and focused play of multimedia information about specified locations facilitates individualized, interactive user responses. For example, users can make individual choices about what POIs to add to, or remove from, their list of waypoints along a planned itinerary based on their own selection among available multimedia information about those POI locations. The first release of MAP'N'GO 1.0 further facilitates selective attachment of text information about POIs, picked by the user, to travel plan output generated by combined or sequenced routing and multimedia processes.

Alternate embodiments of the present invention additionally facilitate editing and amendment of text attachments, attachment of selected visual images or audio output, and the insertion or input of new or supplemental multimedia located information through obvious, routine state of the art programming techniques for storage, retrieval and modification of multimedia data. For example, as detailed in relation to FIG. 4 and illustrated in FIG. 1N, embodiments for sales, real estate or security agents attach digital photo images, or even video clips, of particular properties or people at the appropriate locations on specialized travel plan outputs. Available technology further permits attachment of audio messages to travel plan output at relevant locations. Emergency or delivery personnel can recall and hear crucial client messages or instructions in relation to the known or estimated location of an emergency or delivery event. Relative to specific geographic locations, personal snapshots or video, voice/audio experiences recorded on tape or text recollections can be input, stored and recalled, utilizing the present invention as a digital travel album. Such diverse contents and media can be modified, revised and composed selectively together employing obvious, state of the art techniques for the computerized manipulation of interrelated text, graphic imagery or audio data.

The present IRMIS invention further comprises information recorded on PDA or PDA/GPS devices at remote locations in the field. For example, users of portable IRMIS PDAs can make annotations about geographic locations and travel routes, and IRMIS PDA/GPS devices facilitate marking locations, tracking or logging "breadcrumbs" or series of points representing actual travel paths, plus date/time/lat-long stamping of user annotations and/or digital photos made in conjunction with the PDA/GPS. Thereafter, such information gathered on one or more portable IRMIS devices can be transferred into the IRMIS desktop or central dispatch system for further processing and display. For example, such information can be used to update real estate, security service, sales/delivery route, etc., databases; such information can be used to display a historical record or replay of part or all of an actual trip, and/or such information can be incorporated within the IRMIS desktop GIS database for use in future travel planning or multimedia/routing operations and presentations.

Particularly for the preferred embodiments of the present invention distributed on read only CD-ROMs, a Replace function facilitates or enhances usage as a digital travel album and the flexible manipulation of multimedia, as well as updating of the GIS database. The Replace function stores and manages added or updated information on the hard drive or other equivalent memory devices. By routine means for coordinating various databases or memory devices, taking into account the geographic coordinates or other prominent information attributes such as the time and date of data input, the Replace function further overwrites or amends fixed information on the CD-ROM with added, updated or corrected data, or deletions thereof, including cartography, text, audio or pictures. This facilitates for example correction of highway data reflecting new road construction, other updating and amendments of mapping, multimedia and routing data, addition of personalized annotations or images in the manner of a diary or photo album as well as the selective editing and recomposing of the multimedia substance and forms for presentations and attachments. In summary, the Replace function offers the advantages of cheap massive permanent CD-ROM storage in conjunction with the flexibility and modifiability of read/write storage devices such as hard drives and flash memory.

According to the present IRMIS invention, the CD-ROM data-updating or Replace functions are further supplemented and improved upon by automated data coordination between the desktop or central dispatch IRMIS home-base platform and the datasets or information transferred into and/or recorded on one or more portable IRMIS PDA or PDA/GPS devices. As detailed relative to FIG. 2B in this disclosure, this data coordination or integration between IRMIS home-base and IRMIS portable(s) comprises optional, controllable one-way or two-way synchronization of selected component databases, e.g., maps, text directions, address books, route depictions, POI or point information, digital photo data, and so forth. Thus, information recorded on portable IRMIS devices at remote locations can be automatically incorporated into corresponding databases on the IRMIS desktop or central dispatch computer; also, at the user's option, upon "docking" with the IRMIS "mothership" or desktop, portable IRMIS devices can be automatically updated and reset in preparation for further use.

In FIGS. 8B and 8C the flexibility and selectivity of information content and media are enhanced by steps 819 and 827. These steps correspond respectively to steps 718 and 720 in FIG. 7. In the FIG. 2 block diagram, the user can similarly access and adjust user options at steps 215 and 219 from the more generalized steps for combined and pure multimedia output at 265 and 273. Steps 819 and 827 facilitate interaction with and choice of information in relation to the temporal structure whereby audio, text or visual information are played as illustrated in FIGS. 8B and 8C.

While step 818 plays prerecorded audio to its conclusion, steps 816 and 829 work together to display available pictures for a preset, user adjustable period of time. Any text information displays are similarly clocked by means of steps 821 and 835. Unless the user intervenes, located information is heard for its duration, read and seen for a period of time. Once such information plays are over without the user taking action, Show/Tell All proceeds to present multimedia on the next POI. Available at any point in any Show/Tell All output operation, step 819,866 provides the user with slide controls of the rewind, stop and fast-forward type, revealed in more detail in FIG. 8D. Step 819,866 lets users discretely replay, extend or advance audio, visual and text outputs together or as individual media. The user can concentrate on, repeat or skip over particular information at will, electing a certain medium or combination of media as well.

This capability aids the user to interact with or respond to the multimedia information, for example: (1) to make decisions about which POIs or locations to include or delete as waypoint inputs; or (2) to pick, edit and compose location-related information for attachment to combined travel plan output. Likewise, step 827 stops the clock or blocks expiration of text information outputs or displays whenever the user opts to engage in manipulation or adjustment of the multimedia output/display. This means that the map display and related text information window remain in place focusing on the current POI while the user engages in activities such as resetting the time period for text or visual displays, or resizing or repositioning text or picture windows covering part or all of the map display, or modification of waypoint lists or the attachment of information to travel plans.

In FIGS. 8B and 8C steps 831 and 833, 837 and 839, 851 and 853 do essentially the same job for audio, text and visual presentations. These steps increment the POI pointer to the next POI left on the current POI list once a specific presentation is finished or terminated by the user. The user then returns to F1 in FIG. 8A to get the next POI, and re-center the map display if needed.

Presentations about the final POI on the current list are complete as determined in steps 831, 853 and 839 respectively for audio, text and pictures. Then the locator arrows for current POIs, see step 810, and other symbols or legends placed on the map display as part of any multimedia presentation, are erased or cleaned up in steps 841, 855 and 846. Then, steps 849, 848 and 863 return the user to the POI Listbox or main multimedia menu, as detailed relative to FIG. 3.

In the manner of a modal dialog box, at the end of a text and picture display, step 857 holds text and pictures on screen while asking the user "Are you done?" in effect. The user then can opt to select or delete the pertinent POI or the nearest node as a waypoint, or to edit and attach multimedia information about the POI to an emerging travel plan. Or if the user hits the 859 OK button, then the text display is removed in step 861, and the process returns to restart the picture display clock at step 816. Unless the user opts for a replay of the text option at 823, steps 829 times out the picture. If there still are more POIs on a Show/Tell All list, steps 839 and 837 return the user to connector F1 in FIG. 8A to get the next POI on the current list. At the end of the current POI list, as detected in step 839, step 846 cleans up the map display. At 848, operations are returned to the POI listbox that is detailed further relative to FIG. 3 and FIG. 1J at 148.

Figure 8D:
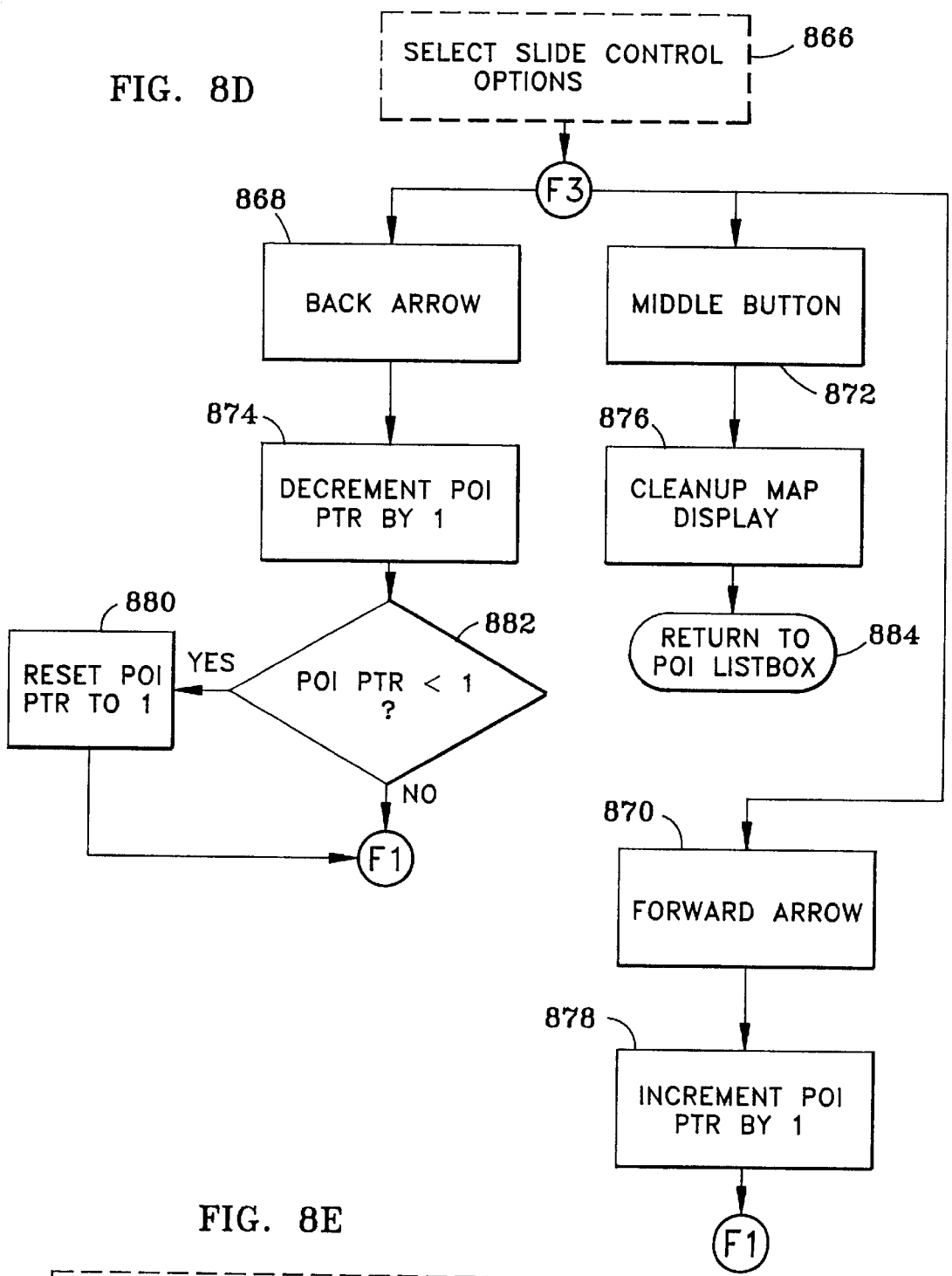
Figure 8E:
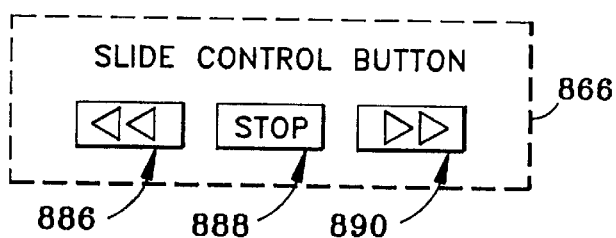

FIG. 8D details the working of the "stop", "rewind", and "fast-forward" style Slide Control shown at 718 in FIG. 7 and 819 and 866 in FIG. 8. At connector F3, the user is presented on the system interface with optional buttons to replay, halt or advance multimedia presentations. At 874 and 878, the forward and back arrow buttons effectively increment or decrement the POI pointer. Steps 880 and 882 reset the presentation on the beginning of the current list whenever the user backs up past the first item on a given POI list. Thus, full back and forward operations move the user to F2, which is the beginning of Show/Tell operations shown also in FIG. 8B. The Stop button brings multimedia operations to a halt at 872, cleaning up any text or pictures presented in windows on top of the map display in 876. The Stop button takes the user back to the POI listbox which is the startup multimedia mode described in relation to FIG. 3.

Figure 9:
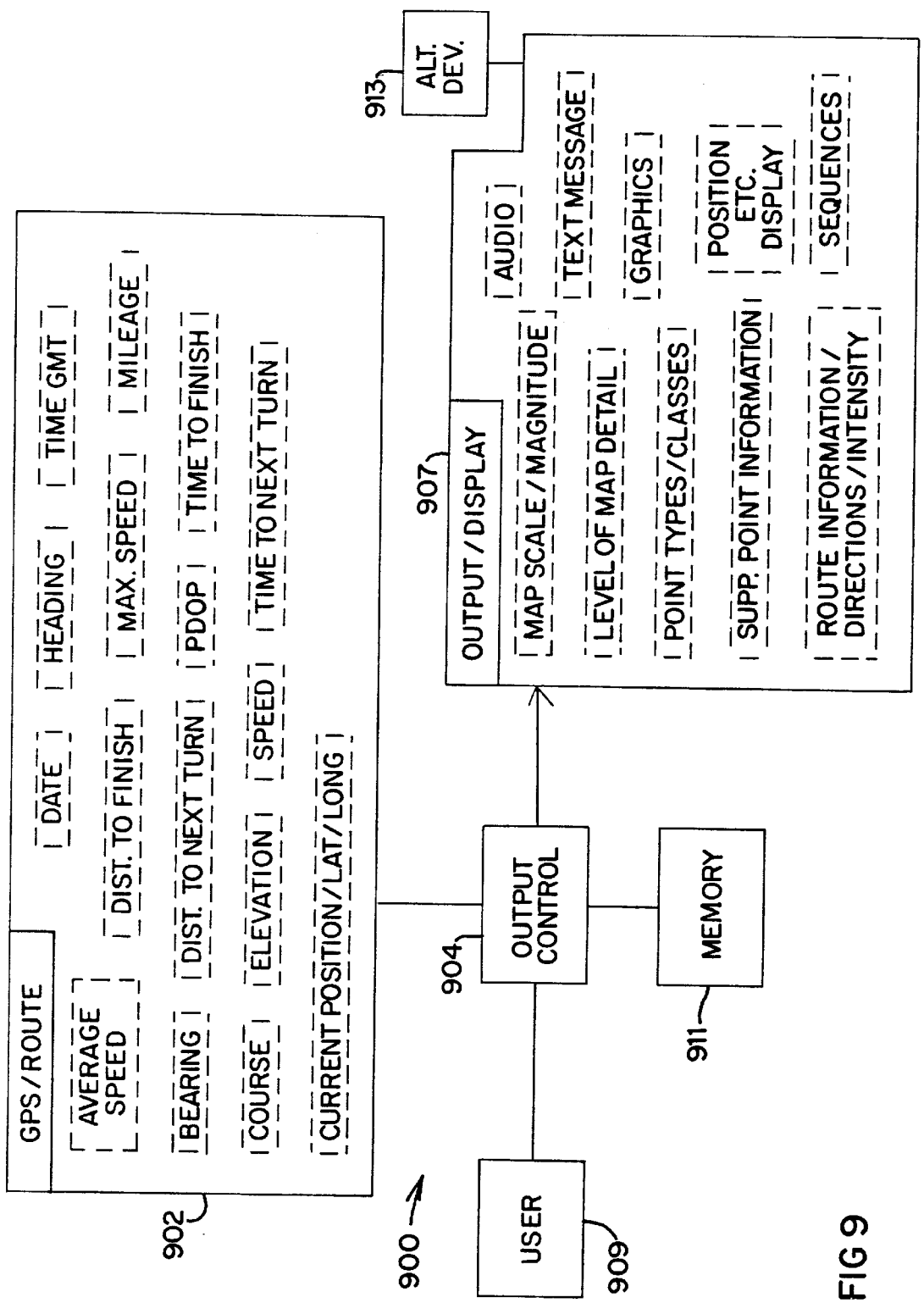
FIG. 9 illustrates GPS controls for PDA display variables.

FIG. 9 is a block diagram of a modular suite of software controls programmed to modify IRMIS PDA map display and output variables, in response to IRMIS GPS as processed in conjunction with the user's travel plans.

Preferred individual GPS/ROUTE parameters are itemized in 902. Preferred OUTPUT/DISPLAY variables are listed in 907. A cartographic programmer of ordinary skill will appreciate that algorithms can be fashioned using an array of plural GPS/ROUTE parameters, as well as any one parameter. The skilled artisan will further recognize that one or more or a sequence of IRMIS OUTPUT/DISPLAY variables can be controlled, or made contingent upon, one or more GPS/ROUTE parameters. Further definition of the GPS/ROUTE parameters is provided herein in the section titled "Configuring Solus Pro in a Palm Computing Organizer."

PDA OUTPUT CONTROL 904 is also impacted at least by user commands and pre-set preferences 909 as well as memory 911 and available data. For example, one IRMIS embodiment, SOLUS™ Pro implemented on 3COM™ Palm™ Computing platforms, automatically "zooms" shifting to greater detail, closer view maps or higher magnitude maps when such mapping information is to be found in the PDA memory for the PDA user's current geographic position indicated by the GPS. Thus, the OUTPUT CONTROL 904 software is programmed to query both the PDA memory for available maps at a closer scale and the GPS for current position information. The user can override this default shift in map scales by inputting his/her preferences at 909.

Another FIG. 9 scenario was described in the parent patent application "COMPUTING AIDED MAP LOCATION SYSTEM" (or CAMLS) Ser. No. 08/265,327 filed Jun. 24, 1994, and also assigned to DeLorme Publishing Co. Inc., now U.S. Pat. No. 5,848,373. CAMLS describes alternative or toggled map displays—ROAD EYES AND EARS and LOOK ABOUT. ROAD EYES AND EARS focuses on critical driving information along the road ahead of the user's current position—for example, speed, time to next turn, specific directions for next turn, and so on as provided on the IRMIS "Navigate" screen shown in FIG. 1A4b. The FIG. 9 OUTPUT CONTROL prompts ROAD EYES AND EARS variously as a function of time/distance to next turn and/or speed. A beep warns the driver one minute before the next turn. The map screen shifts to "Navigate" or alternatively the "Navigate" screen shows for 10 seconds then the corresponding map screen is displayed for 10 seconds. CAMLS details such sequenced displays.

As described in CAMLS, LOOK ABOUT is a map screen mode which focuses on more detailed information about points of interest, or attractions and facilities, around the user's current geographic position as detected by the GPS. LOOK ABOUT provides restaurant menus, describes motels, parks, museums, and other accommodations found within a radius of distance or travel time around a point. The FIG. 9 OUTPUT CONTROL implements LOOK ABOUT, for example, as a function of the GPS detecting that the user has slowed down below a preset speed and/or has stopped completely for a pre-set span of time. In other words, when driving instructions are not critical, and when the user is more likely to be interested in his/her surroundings, LOOK ABOUT de-emphasizes "Directions" and "Navigate" screens, and displays more detailed map screens and/or information about points of interest surrounding the PDA user's current location. Alternatively, while the user's vehicle is en route, even when approaching a next turn, the passenger who does not have to watch the road can manually prompt LOOK ABOUT at 909 in FIG. 9 to get added information about local attractions and facilities.

As shown at 913 in FIG. 9, the IRMIS invention also works to facilitate GPS controls for alternate devices, like a digital camera, connected to the user PDA/GPS, as illustrated in FIGS. 1A3 and 1A5(C) heretofore. For example, the digital camera might be programmed to take pictures at specified intervals of time and/or distance traveled—or at or near a specified position or set of geographic coordinates, proximity to which location is detectable by the GPS linked to the PDA.

While the invention has been described with reference to particular example embodiments it is intended to cover all modifications and equivalents within the scope of the following claims.

We claim:

1. An integrated routing/mapping information system (IRMIS) comprising:

a first digital computer having a first computer display;

a database including a set of electronic maps of varying and selectable magnitude for presentation on said first computer display, wherein said electronic maps have the capability of depicting transportation routes having identifiable waypoints including route intersections at geographical locations along said transportation routes, said identifiable waypoints on said electronic maps being identifiable in said first computer by coordinate locations of a selected geographical coordinate system;

software means permitting user travel planning using said electronic maps presented on said first computer display by providing user selection of selected waypoints that include at least a travel origin and a travel destination and can include intermediate waypoints, wherein said software means is capable of calculating, delineating, and displaying a travel route between said travel origin and said travel destination, wherein said travel origin and said travel destination are identifiable in said first computer by coordinate locations of said geographical coordinate system;

a second digital computer having a second display;

means for coupling said first digital computer to said second digital computer for the transfer of data therebetween;

IRMIS software for selectably transferring from said first digital computer to said second digital computer said travel route. one or more of said electronic maps, or a combination thereof, wherein said IRMIS software is constructed to present a view on said second computer display of said travel route, said one or more electronic maps, or said combination thereof.

2. The IRMIS of claim 1 wherein said database further includes information on points of interest along said travel route, wherein said IRMIS software provides for selectable transfer of said information on said points of interest along said travel route from said first digital computer to said second digital computer.

3. The IRMIS of claim 2 further comprising means for coupling said second digital computer to a geocoding device for recording location information associated with said travel route, wherein said IRMIS software provides for transfer of said location information from said second digital computer to said first digital computer.

4. The IRMIS of claim 3 wherein said selected geographical coordinate system is a standard latitude/longitude (lat/long) geographical coordinate system and wherein coordinate locations are stored in said second digital computer as lat/long coordinates, and said geocoding-capable device is a global positioning system (GPS) receiver.

5. The IRMIS of claim 4 wherein said GPS receiver is coupled to said second digital computer, and wherein said IRMIS software receives positioning information from said GPS receiver and adjusts an output of travel update information and electronic map displays on said second display as a function of said positioning information.

6. The IRMIS of claim 1 wherein said second digital computer is selected from the group consisting of handheld organizers, personal digital assistants, and palmtop devices.

7. The IRMIS of claim 1 wherein said database includes maps of selectable levels of detail, wherein said IRMIS software includes means for automatically increasing a level of detail for display on said second computer display of said electronic maps associated with said travel route at or near said travel origin and said travel destination, and means for automatically decreasing said level of detail for display on said second computer display of said electronic maps associated with said travel route in the area between said travel origin and said travel destination.

8. An integrated routing/mapping information system (IRMIS) comprising:

a digital computer having a computer display;

a database accessible by said digital computer, said database including a set of electronic maps of varying and selectable magnitude and capable of presentation on said computer display;

IRMIS software designed to enable user travel planning using said electronic maps presented on said computer display by providing user selection of selected waypoints that include a travel origin and a travel destination, wherein said IRMIS software is capable of calculating, delineating, and displaying on said computer display a travel route between said travel origin and said travel destination;

means for coupling said digital computer to one or more other computers for the exchange of data therebetween; and wherein said IRMIS software is designed to selectably transfer from said digital computer to said one or more other computers said travel route and one or more electronic maps of said database associated with said travel route.

9. The IRMIS of claim 8 wherein said means for coupling is a wireless exchange.

10. The IRMIS of claim 9 further comprising means for coupling one or more of said other computers to a geocoding device for recording location information associated with said travel route, wherein said IRMIS software provides for transfer of said location information from said one or more other computers to said digital computer.

11. The IRMIS of claim 10 wherein said database further includes identifiable waypoints associated with said travel route, wherein said waypoints are identifiable by coordinate means of a selected geographical coordinate system, wherein said selected geographical coordinate system is a standard latitude/longitude (lat/long) geographical coordinate system and wherein coordinate locations are storable in said one or more other computers as lat/long coordinates, and said geocoding-capable device is a global positioning system (GPS) receiver.

12. The IRMIS of claim 11 wherein said GPS receiver is coupled to said one or more other computers, and wherein said IRMIS software receives positioning information from said GPS receiver and adjusts an output of travel update information and electronic map displays on said one or more other computers as a function of said positioning information.

13. The IRMIS of claim 8 where said database further includes information on points of interest along said travel route, wherein said IRMIS software provides for selectable transfer of said information on said points of interest along said travel route from said digital computer to said one or other computers.

14. The IRMIS of claim 8 wherein said one or more other computers are selected from the group consisting of handheld organizers, personal digital assistants, and palmtop devices.

15. The IRMIS of claim 8 wherein said database includes maps of selectable levels of detail, wherein said IRMIS software includes means for increasing a level of detail for display on any of said one or more other computers of said electronic maps associated with said travel route at or near said travel origin and said travel destination, and means for decreasing said level of detail for display on said one or more other computers of said electronic maps associated with said travel route in the area between said travel origin and said travel destination.

16. A system for exchanging map-related information among two or more computer systems, the system comprising:
   a digital computer having a computer display;
   a database of geographical-coordinate-locatable objects (loc/objects) accessible by said digital computer, said database including a set of electronic maps of varying and selectable magnitude and capable of presentation on said computer display, wherein said electronic maps are associated with map grid quadrangles, wherein said loc/objects of said database are identified by geographical coordinate identifiers in a geographical coordinate system, and wherein said loc/objects may be displayed on said computer display;
   means for coupling said digital computer to one or more other digital computers for the exchange of data therebetween; and
   software means designed to enable display on said one or more other computers one or more electronic maps of said database with associated map grid quadrangles that correspond to said map grid quadrangles and that may further correspond to paper map grid quadrangles of one or more printed maps.

17. The system as claimed in claim 16 wherein said means for coupling is a wireless exchange.

18. A system for exchanging travel-related geographical information among two or more computer systems, the system comprising:
   a computer system including a computer display;
   a map database providing a set of electronic maps for presentation on the computer display;
   said electronic maps depicting one or more transportation routes having waypoints at geographical locations along the one or more transportation routes, wherein said waypoints may be depicted on the electronic maps and are identified by coordinate locations;
   a database of one or more geographically locatable points of interest (POIs) identified by coordinate locations, said POIs being organized into a plurality of types and for display on said computer display;
   software means designed to enable user travel planning using said electronic maps presented on the computer display, said software means permitting user selection of a travel origin and a travel destination from among said waypoints, wherein said software means is designed to calculate and display on said computer display a travel route between the travel origin and t he travel destination;
   said software means is also designed to enable the user to select a region of interest along the travel route and to display within said region of interest one or more of said POIs;
   said database comprising travel information selected from the group consisting of graphics, photos, videos, animations, audio information, text information, and combinations thereof about said POIs; and
   said software means is further designed to present on the computer display the travel route and said travel information associated with said POIs within said region of interest.

19. A system for exchanging travel-related geographical information among two or more computer systems, the system comprising:
   a computer system including a computer display;
   a map database providing a set of electronic maps for presentation on the computer display;
   said electronic maps depicting one or more transportation routes having waypoints at geographical locations along the one or more transportation routes, wherein said waypoints may be depicted on the electronic maps and are identified by coordinate locations;
   a database of one or more geographically locatable points of interest (POIs) identified by coordinate locations, said POIs being organized into a plurality of types and for display on said computer display;
   software means designed to enable user travel planning using said electronic maps presented on the computer display, said software means permitting user selection of a travel origin and a travel destination from among said waypoints, wherein said software means is designed to calculate and display on said computer display a travel route between the travel origin and the travel destination;
   said database comprising travel information selected from the group consisting of graphics, photos, videos, animations, audio information, text information, and combinations thereof about said POIs;
   said software means is further designed to present on the computer display the travel route and said travel information associated with said POIs within said region of interest;
   means for coupling said computer system to one or more other computer systems for the exchange of data therebetween; and
   wherein said software means is designed to selectably transfer from said computer system to said one or more other computer systems said travel route and said travel information associated with said POIs within said region of interest.

20. The system as claimed in claim 19 wherein said means for coupling is a wireless exchange.

21. An integrated routing/mapping information system (IRMIS) comprising:
   a digital computer having a computer display;
   a database accessible by said digital computer, said database including a set of electronic maps of varying and selectable magnitude and capable of presentation on said computer display;
   IRMIS software designed to enable user travel planning using said electronic maps presented on said computer display by providing user selection of selected waypoints that include a travel origin and a travel destination, wherein said IRMIS software is capable of calculating, delineating, and displaying on said computer display a travel route between said travel origin and said travel destination;
   means for coupling said digital computer to one or more other computers for the exchange of data therebetween;

wherein said IRMIS software is designed to selectably transfer from said digital computer to said one or more other computers said travel route and one or more electronic maps of said database associated with said travel route; and wherein said database includes maps of selectable levels of detail, wherein said IRMIS software includes means for increasing a level of detail for display on any of said one or more other computers of said electronic maps associated with said travel route at or near said travel origin and said travel destination, and means for decreasing said level of detail for display on said one or more other computers of said electronic maps associated with said travel route in the area between said travel origin and said travel destination.

22. A system to manipulate on a display of a computer device one or more maps or travel-related information in response to positioning information received by the computer device from a positioning device, the system comprising:

a map database providing a set of electronic maps for presentation on the computer display;

said electronic maps depicting one or more transportation routes having waypoints at geographical locations along the one or more travel routes, wherein said waypoints may be depicted on the electronic maps and are identified by coordinate locations;

a database of one or more geographically locatable points of interest (POIs) identified by coordinate locations, said POIs being organized for display on said computer display;

means for coupling the computer device to a global positioning system receiver that outputs one or more travel-route-related parameters; and software means for generating on the computer travel-related information associated with one or more of said electronic maps, one or more of said POIs, or any combination of both, wherein said travel-related information is associated said one or more travel-route-related parameters.

23. The system as claimed in claim 22 wherein the computer device is a personal digital assistant.

24. The system as claimed in claim 22 wherein said travel-route-related parameters are selected from the group consisting of: elevation, course, speed, heading, time, average speed, distance to finish, maximum speed, mileage, bearing, distance to next turn, and time to next turn.

25. The system as claimed in claim 22 wherein said travel-related information is selected from the group consisting of: map scale, map magnitude, map detail, text messages, audio messages, graphic representations, types of POIs, classes of POIs, supplemental POI information, route information, route directions, and position on map display.

26. The system as claimed in claim 22 wherein generation of said travel-related information may be selectably varied and is controllable by a user.

27. The system as claimed in claim 22 wherein generation of said travel-related information is controllable by output from the global positioning receiver.

28. The system as claimed in claim 22 further comprising means for coupling one or more secondary devices to the computer device, wherein said software means is designed to manipulate operation of one or more of said secondary devices as a function of said travel-route-related parameters from the global positioning receiver.

* * * * *